US009253319B1

(12) United States Patent
Kirchhoff et al.

(10) Patent No.: US 9,253,319 B1
(45) Date of Patent: Feb. 2, 2016

(54) METHODS AND SYSTEMS FOR CALL CONNECTING CALLS

(71) Applicant: CALLWAVE COMMUNICATIONS, LLC, Brookline, MA (US)

(72) Inventors: Leland W. Kirchhoff, Santa Barbara, CA (US); David S. Trandal, Santa Barbara, CA (US); Colin D. Kelley, Santa Barbara, CA (US)

(73) Assignee: Callwave Communications, LLC, Brookline, MA (US)

( * ) Notice: Subject to any disclaimer, the term of this patent is extended or adjusted under 35 U.S.C. 154(b) by 0 days.

(21) Appl. No.: 14/482,819

(22) Filed: Sep. 10, 2014

Related U.S. Application Data

(63) Continuation of application No. 13/353,278, filed on Jan. 18, 2012, now Pat. No. 8,855,107, which is a continuation of application No. 11/480,277, filed on Jun. 30, 2006, now abandoned.

(60) Provisional application No. 60/696,135, filed on Jul. 1, 2005, provisional application No. 60/752,521, filed on Dec. 20, 2005.

(51) Int. Cl.
*H04M 3/46* (2006.01)
*H04M 1/253* (2006.01)

(52) U.S. Cl.
CPC .............. *H04M 3/46* (2013.01); *H04M 1/2535* (2013.01)

(58) Field of Classification Search
CPC ....................................................... H04M 3/46
See application file for complete search history.

(56) References Cited

U.S. PATENT DOCUMENTS 3,936,613 A 2/1976 Nishigori et al.
3,956,595 A 5/1976 Sobanski
(Continued)

FOREIGN PATENT DOCUMENTS

CA 1329852 9/1989
CA 2 352 216 A1 6/2000
(Continued)

OTHER PUBLICATIONS

Defendants' Second Supplemental Invalidity Contentions, filed Apr. 7, 2015, in the matters (1) *Callwave Communications, LLC v. AT&T Mobility, LLC, and Google Inc.*, Case No. C.A. 12-1701-RGA; (2) *Callwave Communications, LLC v. Sprint Spectrum L.P., Sprint Communications Company L.P., and Google Inc.*, Case No. C.A. No. 12-1702-RGA; (3) *Callwave Communications, LLC v. Verizon Services Corp., Cellco Partnership, D.B.A. Verizon Wireless, and Google Inc.*, Case No. C.A. No. 12-1704-RGA; and (4) *Broadsoft, Inc. v. Callwave Communications, LLC*, Case No. C.A. No. 13-711-RGA (hereinafter collectively called the "Callwave/AT&T/Sprint/Verizon/Broadsoft cases"); all in the United States District Court for the District of Delaware; 7 pp.
(Continued)

*Primary Examiner* — Hassan Phillips
*Assistant Examiner* — Omeed D Rahgozar
(74) *Attorney, Agent, or Firm* — Knobbe, Martens, Olson & Bear LLP

(57) ABSTRACT

The present invention relates generally to telecommunications and in particular to systems and methods for routing telephone calls. By way of example, a first address, such as a first phone number, can be associated with a telephonic terminal, such as a mobile phone. Incoming calls to the first address can be routed to the telephonic terminal or to other destinations based on telephonic terminal status.

23 Claims, 12 Drawing Sheets

(56) References Cited

U.S. PATENT DOCUMENTS

| | | |
|---|---|---|
| 4,009,337 A | 2/1977 | Sakai et al. |
| 4,022,983 A | 5/1977 | Braun et al. |
| 4,485,470 A | 11/1984 | Reali |
| 4,723,273 A | 2/1988 | Diesel et al. |
| 4,736,405 A | 4/1988 | Akiyama |
| 4,809,321 A | 2/1989 | Morganstein et al. |
| 4,893,336 A | 1/1990 | Wuthnow |
| 4,901,340 A | 2/1990 | Parker et al. |
| 4,994,926 A | 2/1991 | Gordon et al. |
| 5,040,208 A | 8/1991 | Jolissaint |
| 5,046,087 A | 9/1991 | Sakai |
| 5,283,824 A | 2/1994 | Shaw |
| 5,291,302 A | 3/1994 | Gordon et al. |
| 5,339,076 A | 8/1994 | Jiang |
| 5,351,208 A | 9/1994 | Jiang |
| 5,353,331 A | 10/1994 | Emery et al. |
| 5,379,351 A | 1/1995 | Fandrianto et al. |
| 5,404,537 A | 4/1995 | Olnowich et al. |
| 5,420,594 A | 5/1995 | FitzGerald |
| 5,432,845 A | 7/1995 | Burd et al. |
| 5,434,908 A | 7/1995 | Klein |
| 5,459,584 A | 10/1995 | Gordon et al. |
| 5,467,388 A | 11/1995 | Redd, Jr. et al. |
| 5,471,519 A | 11/1995 | Howe et al. |
| 5,475,748 A | 12/1995 | Jones |
| 5,487,111 A | 1/1996 | Slusky |
| 5,502,762 A | 3/1996 | Andrew et al. |
| 5,515,043 A | 5/1996 | Berard |
| 5,526,524 A | 6/1996 | Madduri |
| 5,533,102 A | 7/1996 | Robinson et al. |
| 5,533,106 A | 7/1996 | Blumhardt |
| 5,577,111 A | 11/1996 | Iida et al. |
| 5,583,918 A | 12/1996 | Nakagawa |
| 5,594,813 A | 1/1997 | Fandrianto et al. |
| 5,602,739 A | 2/1997 | Haagenstad |
| 5,619,557 A | 4/1997 | Van Berkum |
| 5,640,677 A | 6/1997 | Karlsson |
| 5,651,054 A | 7/1997 | Dunn et al. |
| 5,668,861 A | 9/1997 | Watts |
| 5,703,930 A | 12/1997 | Miska et al. |
| 5,724,660 A | 3/1998 | Kauser |
| 5,745,556 A | 4/1998 | Ronen |
| 5,751,795 A | 5/1998 | Hassler et al. |
| 5,761,280 A | 6/1998 | Noonen et al. |
| 5,774,067 A | 6/1998 | Olnowich et al. |
| 5,784,444 A | 7/1998 | Snyder |
| 5,790,712 A | 8/1998 | Fandrianto et al. |
| 5,793,984 A | 8/1998 | Helman |
| 5,802,160 A | 9/1998 | Kugell et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,862,208 A | 1/1999 | MeLampy et al. |
| 5,864,612 A | 1/1999 | Strauss et al. |
| 5,870,459 A | 2/1999 | Phillips et al. |
| 5,894,504 A | 4/1999 | Alfred et al. |
| 5,894,595 A | 4/1999 | Foladare et al. |
| 5,898,898 A | 4/1999 | Kleck |
| 5,899,980 A | 5/1999 | Wilf et al. |
| 5,901,209 A | 5/1999 | Tannenbaum et al. |
| 5,901,248 A | 5/1999 | Fandrianto et al. |
| 5,903,636 A | 5/1999 | Malik |
| 5,909,671 A | 6/1999 | Byford et al. |
| 5,910,827 A | 6/1999 | Kwan et al. |
| 5,926,208 A | 7/1999 | Noonen et al. |
| 5,934,640 A | 8/1999 | Hall et al. |
| 5,946,381 A | 8/1999 | Danne |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,966,165 A | 10/1999 | Eddington |
| 5,966,435 A | 10/1999 | Pino |
| 5,978,014 A | 11/1999 | Martin et al. |
| 5,978,775 A | 11/1999 | Chen |
| 5,982,459 A | 11/1999 | Fandrianto et al. |
| 5,991,394 A | 11/1999 | Dezonno et al. |
| 5,995,594 A | 11/1999 | Shaffer et al. |
| 5,995,603 A | 11/1999 | Anderson |
| 6,014,436 A | 1/2000 | Florence et al. |
| 6,016,524 A | 1/2000 | Kleck |
| 6,026,097 A | 2/2000 | Voois et al. |
| 6,031,896 A | 2/2000 | Gardell et al. |
| 6,032,051 A | 2/2000 | Hall et al. |
| 6,034,956 A | 3/2000 | Olnowich et al. |
| 6,035,031 A | 3/2000 | Silverman |
| 6,038,291 A | 3/2000 | Cannon et al. |
| 6,041,103 A | 3/2000 | La Porta et al. |
| 6,044,059 A | 3/2000 | Olnowich |
| 6,047,268 A | 4/2000 | Bartoli et al. |
| 6,061,333 A | 5/2000 | Joe et al. |
| 6,075,554 A | 6/2000 | Andrews et al. |
| 6,078,350 A | 6/2000 | Davis |
| 6,078,581 A | 6/2000 | Shtivelman et al. |
| 6,091,808 A | 7/2000 | Wood |
| 6,100,806 A | 8/2000 | Gaukel |
| 6,100,873 A | 8/2000 | Bayless et al. |
| 6,104,800 A | 8/2000 | Benson |
| 6,104,836 A | 8/2000 | Buckley et al. |
| 6,104,931 A | 8/2000 | Havinis |
| 6,108,027 A | 8/2000 | Andrews et al. |
| 6,115,754 A | 9/2000 | Landgren |
| 6,119,178 A | 9/2000 | Martin et al. |
| 6,121,998 A | 9/2000 | Voois et al. |
| 6,122,347 A | 9/2000 | Borland |
| 6,124,882 A | 9/2000 | Voois et al. |
| 6,130,935 A | 10/2000 | Shaffer et al. |
| 6,133,940 A | 10/2000 | Noonen et al. |
| 6,134,315 A | 10/2000 | Galvin |
| 6,137,870 A | 10/2000 | Scherer |
| 6,144,644 A | 11/2000 | Bajzath et al. |
| 6,144,667 A | 11/2000 | Doshi et al. |
| 6,160,503 A | 12/2000 | Andrews et al. |
| 6,160,881 A | 12/2000 | Beyda et al. |
| 6,163,335 A | 12/2000 | Barraclough |
| 6,167,127 A | 12/2000 | Smith et al. |
| 6,169,497 B1 | 1/2001 | Robert |
| 6,169,795 B1 | 1/2001 | Dunn et al. |
| 6,169,796 B1 | 1/2001 | Bauer et al. |
| 6,175,622 B1 | 1/2001 | Chiniwala et al. |
| 6,178,183 B1 | 1/2001 | Buskirk, Jr. |
| 6,181,691 B1 | 1/2001 | Markgraf et al. |
| 6,188,429 B1 | 2/2001 | Martin et al. |
| 6,205,177 B1 | 3/2001 | Girod et al. |
| 6,208,372 B1 | 3/2001 | Barraclough |
| 6,208,378 B1 | 3/2001 | Barraclough et al. |
| 6,208,638 B1 | 3/2001 | Rieley et al. |
| 6,211,801 B1 | 4/2001 | Gird |
| 6,212,261 B1 | 4/2001 | Meubus et al. |
| 6,215,425 B1 | 4/2001 | Andrews et al. |
| 6,215,515 B1 | 4/2001 | Voois et al. |
| 6,225,923 B1 | 5/2001 | Andrews |
| 6,226,031 B1 | 5/2001 | Barraclough et al. |
| 6,230,009 B1 | 5/2001 | Holmes et al. |
| 6,236,358 B1 | 5/2001 | Durst |
| 6,239,847 B1 | 5/2001 | Deierling |
| 6,243,039 B1 | 6/2001 | Elliot |
| 6,243,129 B1 | 6/2001 | Deierling |
| 6,243,378 B1 | 6/2001 | Olnowich |
| 6,243,398 B1 | 6/2001 | Kahane et al. |
| 6,246,872 B1 | 6/2001 | Lee et al. |
| 6,249,318 B1 | 6/2001 | Girod et al. |
| 6,253,249 B1 | 6/2001 | Belzile |
| 6,266,400 B1 | 7/2001 | Castagna |
| 6,278,704 B1 | 8/2001 | Creamer et al. |
| 6,282,272 B1 | 8/2001 | Noonen et al. |
| 6,292,478 B1 | 9/2001 | Farris |
| 6,300,979 B1 | 10/2001 | Parkinson et al. |
| 6,301,607 B2 | 10/2001 | Barraclough et al. |
| 6,304,565 B1 | 10/2001 | Ramamurthy |
| 6,310,939 B1 | 10/2001 | Varney |

(56) References Cited

U.S. PATENT DOCUMENTS

| | | |
|---|---|---|
| 6,321,092 B1 | 11/2001 | Fitch |
| 6,337,858 B1 | 1/2002 | Petty et al. |
| 6,337,898 B1 | 1/2002 | Gordon |
| 6,350,066 B1 | 2/2002 | Bobo, II |
| 6,353,660 B1 | 3/2002 | Burger et al. |
| 6,353,663 B1 | 3/2002 | Stevens et al. |
| 6,356,294 B1 | 3/2002 | Martin et al. |
| 6,363,414 B1 | 3/2002 | Nicholls et al. |
| 6,366,659 B1 | 4/2002 | Koponen |
| 6,366,661 B1 | 4/2002 | Devillier et al. |
| 6,373,517 B1 | 4/2002 | Davis et al. |
| 6,374,102 B1 | 4/2002 | Brachman et al. |
| 6,381,282 B1 | 4/2002 | Kwan et al. |
| 6,381,459 B1 | 4/2002 | Gervens et al. |
| 6,389,117 B1 | 5/2002 | Gross et al. |
| 6,393,346 B1 | 5/2002 | Keith |
| 6,404,361 B2 | 6/2002 | Andrews et al. |
| 6,404,776 B1 | 6/2002 | Voois et al. |
| 6,404,860 B1 | 6/2002 | Casellini |
| 6,405,035 B1 | 6/2002 | Singh |
| 6,411,601 B1 | 6/2002 | Shaffer et al. |
| 6,411,692 B1 | 6/2002 | Scherer |
| 6,411,805 B1 | 6/2002 | Becker et al. |
| 6,430,282 B1 | 8/2002 | Bannister |
| 6,430,289 B1 | 8/2002 | Liffick |
| 6,438,216 B1 | 8/2002 | Aktas |
| 6,438,222 B1 | 8/2002 | Burg |
| 6,441,842 B1 | 8/2002 | Fandrianto et al. |
| 6,445,694 B1 | 9/2002 | Swartz |
| 6,456,852 B2 | 9/2002 | Bar |
| 6,477,246 B1 | 11/2002 | Dolan et al. |
| 6,477,581 B1 | 11/2002 | Carpenter et al. |
| 6,483,532 B1 | 11/2002 | Girod |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,529,587 B1 | 3/2003 | Cannon et al. |
| 6,535,726 B1 | 3/2003 | Johnson |
| 6,539,084 B1 | 3/2003 | Long |
| 6,542,596 B1 | 4/2003 | Hill et al. |
| 6,545,589 B1 | 4/2003 | Fuller et al. |
| 6,546,087 B2 | 4/2003 | Shaffer et al. |
| 6,549,612 B2 | 4/2003 | Gifford et al. |
| 6,553,222 B1 | 4/2003 | Weiss |
| 6,560,284 B1 | 5/2003 | Girod et al. |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,574,328 B1 | 6/2003 | Wood et al. |
| 6,603,846 B1 | 8/2003 | Cannon et al. |
| 6,621,892 B1 | 9/2003 | Banister et al. |
| 6,625,258 B1 | 9/2003 | Ram et al. |
| 6,643,034 B1 | 11/2003 | Gordon et al. |
| 6,658,100 B1 | 12/2003 | Lund |
| 6,661,785 B1 | 12/2003 | Zhang et al. |
| 6,661,886 B1 | 12/2003 | Huart et al. |
| 6,662,232 B1 | 12/2003 | Nicholls et al. |
| 6,677,987 B1 | 1/2004 | Girod |
| 6,678,735 B1 | 1/2004 | Orton et al. |
| 6,687,362 B1 | 2/2004 | Lindquist et al. |
| 6,690,672 B1 | 2/2004 | Klein |
| 6,690,785 B1 | 2/2004 | Stelter et al. |
| 6,693,897 B1 | 2/2004 | Huang |
| 6,697,478 B1 | 2/2004 | Meldrum et al. |
| 6,721,408 B1 | 4/2004 | Bain et al. |
| 6,738,461 B2 | 5/2004 | Trandal et al. |
| 6,748,058 B1 | 6/2004 | Schwend et al. |
| 6,751,299 B1 | 6/2004 | Brown et al. |
| 6,775,370 B2 | 8/2004 | Burg |
| 6,782,088 B1 | 8/2004 | Gabara |
| 6,785,021 B1 | 8/2004 | Gordon et al. |
| 6,792,082 B1 | 9/2004 | Levine |
| 6,792,094 B1 | 9/2004 | Kirkpatrick |
| 6,807,231 B1 | 10/2004 | Wiegand et al. |
| 6,813,498 B1 | 11/2004 | Durga et al. |
| 6,816,481 B1 | 11/2004 | Adams et al. |
| 6,838,998 B1 | 1/2005 | Brown |
| 6,857,074 B2 | 2/2005 | Bobo, II |
| 6,868,391 B1 | 3/2005 | Hultgren |
| 6,879,677 B2 | 4/2005 | Trandal et al. |
| 6,879,723 B1 | 4/2005 | Helman |
| 6,898,275 B2 | 5/2005 | Dolan et al. |
| 6,937,713 B1 | 8/2005 | Kung et al. |
| 6,965,644 B2 | 11/2005 | Fandrianto et al. |
| 6,968,174 B1 | 11/2005 | Trandal et al. |
| 6,999,572 B1 | 2/2006 | Shaffer et al. |
| 6,999,576 B2 | 2/2006 | Sacra |
| 6,999,779 B1 | 2/2006 | Hashimoto |
| 7,003,087 B2 | 2/2006 | Spencer et al. |
| 7,006,455 B1 | 2/2006 | Fandrianto et al. |
| 7,020,255 B2 | 3/2006 | Gruchala |
| 7,035,890 B2 | 4/2006 | Fandrianto et al. |
| 7,035,935 B1 | 4/2006 | Voois et al. |
| 7,089,107 B2 | 8/2006 | Jones |
| 7,092,379 B1 | 8/2006 | Singh et al. |
| 7,103,167 B2 | 9/2006 | Brahm et al. |
| 7,120,143 B1 | 10/2006 | Martin et al. |
| 7,120,238 B1 | 10/2006 | Bednarz et al. |
| 7,120,455 B1 | 10/2006 | Chen et al. |
| 7,124,165 B1 | 10/2006 | Barraclough et al. |
| 7,190,773 B1 | 3/2007 | D'Silva et al. |
| 7,194,080 B2 | 3/2007 | Worsham et al. |
| 7,202,884 B1 | 4/2007 | Barraclough |
| 7,209,964 B2 | 4/2007 | Dugan et al. |
| 7,213,073 B1 | 5/2007 | Slavin |
| 7,218,721 B1 | 5/2007 | Vincent et al. |
| 7,224,774 B1 | 5/2007 | Brown et al. |
| 7,231,029 B1 | 6/2007 | Kirkpatrick |
| 7,242,680 B2 | 7/2007 | Gallant |
| 7,245,612 B2 | 7/2007 | Petty et al. |
| 7,251,317 B1 | 7/2007 | Robbins et al. |
| 7,254,219 B1 | 8/2007 | Hansen et al. |
| 7,266,185 B2 | 9/2007 | Trandal et al. |
| 7,272,553 B1 | 9/2007 | Chrissan et al. |
| 7,292,841 B2 | 11/2007 | Trandal et al. |
| 7,308,081 B2 | 12/2007 | Trandal et al. |
| 7,339,604 B1 | 3/2008 | Barraclough et al. |
| 7,382,773 B2 | 6/2008 | Schoeneberger et al. |
| 7,388,949 B2 | 6/2008 | Contractor et al. |
| 7,394,803 B1 | 7/2008 | Petit-Huguenin et al. |
| 7,397,910 B2 | 7/2008 | Dolan et al. |
| 7,409,048 B2 | 8/2008 | Trandal et al. |
| 7,412,050 B2 | 8/2008 | Renner et al. |
| 7,426,267 B1 | 9/2008 | Caseau |
| 7,437,331 B1 | 10/2008 | Rosenberger |
| 7,460,653 B2 | 12/2008 | Brahm et al. |
| 7,490,062 B2 | 2/2009 | Hansmann et al. |
| 7,508,927 B1 | 3/2009 | Trandal et al. |
| 7,522,580 B2 | 4/2009 | Miller et al. |
| 7,526,076 B2 | 4/2009 | Koch |
| 7,548,756 B2 | 6/2009 | Velthuis et al. |
| 7,555,110 B2 | 6/2009 | Dolan et al. |
| 7,606,221 B2 | 10/2009 | Artru et al. |
| 7,606,355 B2 | 10/2009 | Hutchison et al. |
| 7,636,428 B2 | 12/2009 | Brahm et al. |
| 7,688,958 B2 | 3/2010 | Dolan et al. |
| 7,742,586 B1 | 6/2010 | Trandal et al. |
| 7,764,231 B1 | 7/2010 | Karr |
| 7,818,734 B2 | 10/2010 | Giannini et al. |
| 7,822,188 B1 | 10/2010 | Kirchhoff et al. |
| 7,839,987 B1 | 11/2010 | Kirchhoff et al. |
| 7,852,749 B2 | 12/2010 | Mickle et al. |
| 7,907,933 B1 | 3/2011 | Trandal et al. |
| 8,064,588 B2 | 11/2011 | Brahm et al. |
| 8,069,205 B1 | 11/2011 | Voois et al. |
| 8,351,591 B2 | 1/2013 | Kirchhoff et al. |
| 8,472,604 B2 | 6/2013 | Brahm et al. |
| 2001/0025273 A1 | 9/2001 | Walker et al. |

(56) References Cited

U.S. PATENT DOCUMENTS

| | | |
|---|---|---|
| 2001/0037254 A1 | 11/2001 | Glikman |
| 2001/0037264 A1 | 11/2001 | Husemann et al. |
| 2002/0009184 A1 | 1/2002 | Shnier |
| 2002/0010616 A1 | 1/2002 | Itzhaki |
| 2002/0035616 A1 | 3/2002 | Diamond et al. |
| 2002/0067816 A1 | 6/2002 | Bushnell |
| 2002/0085687 A1 | 7/2002 | Contractor et al. |
| 2002/0097710 A1 | 7/2002 | Burg |
| 2002/0136375 A1 | 9/2002 | Bouffard et al. |
| 2002/0176404 A1 | 11/2002 | Girard |
| 2003/0003915 A1 | 1/2003 | Foster et al. |
| 2003/0039339 A1 | 2/2003 | Luehrig et al. |
| 2003/0063731 A1 | 4/2003 | Woodring |
| 2003/0108172 A1 | 6/2003 | Petty et al. |
| 2003/0108178 A1 | 6/2003 | Nguyen et al. |
| 2003/0123629 A1 | 7/2003 | Hussain et al. |
| 2003/0128691 A1 | 7/2003 | Bergman et al. |
| 2003/0156700 A1 | 8/2003 | Brown et al. |
| 2003/0191823 A1 | 10/2003 | Bansal et al. |
| 2003/0215078 A1 | 11/2003 | Brahm et al. |
| 2004/0028203 A1 | 2/2004 | Wurster et al. |
| 2004/0066926 A1 | 4/2004 | Brockbank et al. |
| 2004/0073566 A1 | 4/2004 | Trivedi |
| 2004/0105536 A1 | 6/2004 | Williams |
| 2004/0141594 A1 | 7/2004 | Brunson et al. |
| 2004/0141598 A1 | 7/2004 | Moss et al. |
| 2004/0190706 A1 | 9/2004 | Fleischer, III et al. |
| 2004/0196867 A1 | 10/2004 | Ejzak et al. |
| 2004/0235509 A1 | 11/2004 | Burritt et al. |
| 2004/0240641 A1 | 12/2004 | Cohen et al. |
| 2004/0247105 A1 | 12/2004 | Mullis et al. |
| 2004/0248560 A1 | 12/2004 | Bedingfield et al. |
| 2004/0249650 A1 | 12/2004 | Freedman et al. |
| 2004/0258220 A1 | 12/2004 | Levine et al. |
| 2005/0010573 A1 | 1/2005 | Garg |
| 2005/0053216 A1 | 3/2005 | Spencer et al. |
| 2005/0063529 A1 | 3/2005 | Meldrum et al. |
| 2005/0078612 A1 | 4/2005 | Lang |
| 2005/0083851 A1 | 4/2005 | Fotsch |
| 2005/0123118 A1 | 6/2005 | Terry et al. |
| 2005/0152525 A1 | 7/2005 | Kent et al. |
| 2005/0154599 A1 | 7/2005 | Kopra et al. |
| 2005/0186950 A1 | 8/2005 | Jiang |
| 2005/0201534 A1 | 9/2005 | Ignatin |
| 2005/0207432 A1 | 9/2005 | Velez-Rivera et al. |
| 2005/0207556 A1 | 9/2005 | Gonzalez et al. |
| 2005/0265322 A1 | 12/2005 | Hester |
| 2005/0286498 A1 | 12/2005 | Rand et al. |
| 2005/0287993 A1 | 12/2005 | Gogic |
| 2006/0013374 A1 | 1/2006 | Fleischer, III et al. |
| 2006/0077957 A1 | 4/2006 | Reddy et al. |
| 2006/0195597 A1 | 8/2006 | Shaked et al. |
| 2006/0227957 A1 | 10/2006 | Dolan et al. |
| 2006/0268007 A1 | 11/2006 | Gopalakrishnan |
| 2006/0276193 A1 | 12/2006 | Itzkovitz et al. |
| 2007/0002077 A1 | 1/2007 | Gopalakrishnan |
| 2007/0067738 A1 | 3/2007 | Flynt et al. |
| 2007/0153999 A1 | 7/2007 | Daigle |
| 2007/0160188 A1 | 7/2007 | Sharpe et al. |
| 2007/0202898 A1 | 8/2007 | Bae et al. |
| 2009/0100027 A1 | 4/2009 | Malik |
| 2012/0294303 A1 | 11/2012 | Bossemeyer et al. |
| 2013/0097664 A1 | 4/2013 | Herz et al. |

FOREIGN PATENT DOCUMENTS

| | | |
|---|---|---|
| EP | 1 081 919 A1 | 3/2001 |
| EP | 1 120 954 | 8/2001 |
| EP | 1 235 171 A1 | 8/2002 |
| GB | 2 352 928 A | 2/2001 |
| JP | 10-107901 | 4/1998 |
| JP | 10-322462 | 12/1998 |
| JP | 10-322465 | 12/1998 |
| JP | 10-513632 | 12/1998 |
| JP | 11-506292 | 6/1999 |
| JP | 11258325 | 9/1999 |
| JP | 2001-168989 | 6/2001 |
| WO | WO 93/01576 | 1/1993 |
| WO | WO 97/14054 | 4/1997 |
| WO | WO 97/26749 | 7/1997 |
| WO | WO 98-36551 | 8/1998 |
| WO | WO 99-14924 | 3/1999 |
| WO | WO 99/30293 A2 | 6/1999 |
| WO | WO 99/57663 | 11/1999 |
| WO | WO 00/36810 A2 | 6/2000 |
| WO | WO 00 60840 | 10/2000 |
| WO | WO 00/77697 A1 | 12/2000 |
| WO | WO 01/06752 A1 | 1/2001 |
| WO | WO 01/76210 | 10/2001 |
| WO | WO 03/036416 A2 | 5/2003 |

OTHER PUBLICATIONS

Exhibit CCM8, White Paper— "Architecture for Voice, Video and Integrated Data", © 2000 Cisco Systems, Inc., filed Apr. 7, 2015, in the Callwave/AT&T/Sprint/Verizon/Broadsoft cases; 23 pp.

Clifford J. Weinstein, et al., Experience with Speech Communication in Packet Networks, IEEE Journal on Selected Areas in Communications, vol. SAC-1, No. 6 (Dec. 1983); 18 pp.

Martin P. Clark, Networks and Telecommunications—Design and Operation, Grand Metropolitan, UK, John Wiley & Sons (1991); 22 pp.

Tarek N. Saadawi, et al., Fundamentals of Telecommunication Networks, Wiley Series in Telecommunications and Signal Processing, John Wiley & Sons (1994); 497 pp.

Telecordia Technologies, Intelligent Internet—Convergence of Internet and Intelligent Network, Intelligent Network Workshop, Cape Town, South Africa (May 2000); 11 pp.

Defendants' Third Supplemental Invalidity Contentions, filed Apr. 27, 2015, in the matters (1) *Callwave Communications, LLC v. AT&T Mobility, LLC, and Google Inc.*, Case No. C.A. 12-1701-RGA; (2) *Callwave Communications, LLC v. Sprint Spectrum L.P., Sprint Communications Company L.P., and Google Inc.*, Case No. C.A. No. 12-1702-RGA; (3) *Callwave Communications, LLC v. Verizon Services Corp., Cellco Partnership, D.B.A. Verizon Wireless, and Google Inc.*, Case No. C.A. No. 12-1704-RGA; and (4)*Broadsoft, Inc. v. Callwave Communications, LLC*, Case No. C.A. No. 13-711-RGA (hereinafter collectively called the "Callwave/AT&T/Sprint/Verizon/ Broadsoft cases"); all in the United States District Court for the District of Delaware; 9 pp.

Exhibit A-09, Supplemental Invalidity Claim Chart for U.S. Pat. No. 7,822,188 Based on U.S. Pat. No. 6,144,667 ("Doshi"), to Defendants' Third Supplemental Invalidity Contentions, filed Apr. 27, 2015 in the Callwave/AT&T/Sprint/Verizon/Broadsoft cases; 32 pp.

Exhibit A-29, Supplemental Invalidity Claim Chart for U.S. Pat. No. 7,822,188 Based on U.S. Pat. No. 6,574,328 ("Wood '328"), to Defendants' Third Supplemental Invalidity Contentions, filed Apr. 27, 2015 in the Callwave/AT&T/Sprint/Verizon/Broadsoft cases; 30 pp.

Exhibit A-32, Initial Invalidity Claim Chart for U.S. Pat. No. 7,822,188 Based on U.S. Pat. No. 7,512,225 ("Borthwick"), to Defendants' Third Supplemental Invalidity Contentions, filed Apr. 27, 2015 in the Callwave/AT&T/Sprint/Verizon/Broadsoft cases; 26 pp.

Exhibit A-33, Initial Invalidity Claim Chart for U.S. Pat. No. 7,822,188 Based on the Session Initiation Protocol Service examples Memo (Feb. 2004), to Defendants' Third Supplemental Invalidity Contentions, filed Apr. 27, 2015 in the Callwave/AT&T/Sprint/ Verizon/Broadsoft cases; 56 pp.

Exhibit D-19, Initial Invalidity Claim Chart for U.S. Pat. No. 7,636,428 Based on U.S. Pat. No. 6,621,800 ("Klein '800"), to Defendants' Third Supplemental Invalidity Contentions, filed Apr. 27, 2015 in the Callwave/AT&T/Sprint/Verizon/Broadsoft cases; 45 pp.

Exhibit E-06, Initial Invalidity Claim Chart for U.S. Pat. No. 7,555,110 Based on U.S. Pat. No. 6,621,800 ("Klein '800"), to Defendants' Third Supplemental Invalidity Contentions, filed Apr. 27, 2015 in the Callwave/AT&T/Sprint/Verizon/Broadsoft cases; 16 pp.

(56) References Cited

OTHER PUBLICATIONS

Exhibit F-05, Initial Invalidity Claim Chart for U.S. Pat. No. 8,325,901 Based on U.S. Pat. No. 6,621,800 ("Klein '800"), to Defendants' Third Supplemental Invalidity Contentions, filed Apr. 27, 2015 in the Callwave/AT&T/Sprint/Verizon/Broadsoft cases; 19 pp.

Exhibit G-06, Initial Invalidity Claim Chart for U.S. Pat. No. 7,397,910 Based on U.S. Pat. No. 6,621,800 ("Klein '800"), to Defendants' Third Supplemental Invalidity Contentions, filed Apr. 27, 2015 in the Callwave/AT&T/Sprint/Verizon/Broadsoft cases; 42 pp.

Defendants' Initial Invalidity Contentions on the '933 Patent, mailed May 14, 2014, in the following cases pending in the United States District Court, for the District of Delaware: *Callwave Communications, LLC v. AT&T Mobility, LLC, and Google Inc.*, Case No. C.A. No. 12-1701-RGA; *Callwave Communications, LLC v. Spring Nextel Corp. and Google Inc.*, Case No. C.A. 12-1702-RGA; *Callwave Communications, LLC v. T-Mobile USA Inc. and Google Inc.*, Case No. C.A. No. 12-1703-RGA; *Callwave Communications, LLC v. Verizon Communications, Inc., Cellco Partnership, dba Verizon Wireless and Google Inc*, Case No. C.A. No. 12-1704-RGA; and *Callwave Communications, LLC v. AT&T Mobility, LLC, Blackberry Limited and Blackberry Corp.*, Case No. C.A. No. 12-1788-RGA (25 pages).

*AT&T eCharge: How Does It Work?*, printed Oct. 29, 1997, available at http://www.echarge.att.com/how_wk.html, Bates Nos. 933PA_000001 to 933PA_000014.

*BREW SDK Now Available for Download*, posted May 17, 2001, available at http://www.wirelessdevnet.com/newswire-less/may172001.html, Bates Nos. 933PA_000015 to 933PA_000017.

*Chargit, DSL Reports Forums*, printed Apr. 2, 2014, available at http://www.dslreports.com/forum/remark,2198601, Bates Nos. 933PA_000032 to 933PA_000034.

Press Release—Passcall.com ECTA Hamburg Competitive Dynamics Symposium & Exhibition, dated 2000, available at http://www.passcall.com/press_room/pr/ecta2000.htm, Bates Nos. 933PA_000035 to 933PA_000075.

Chargit, Total Telecom Network Management, *Billing firm smooths e-payment process*, dated May 8, 2000, available at http://www.totaltele.com/view.aspx?ID=421927, Bates Nos. 933PA_000076 to 933PA_000077.

Computer Weekly, *Developers embrace Qualcomm's Brew*, printed Apr. 9, 2014, available at http://www.computerweekly.com/news/2240042365/Developers-embrace-Qualcomms-Brew, Bates Nos. 933PA_000078 to 933PA_000099.

eCharge Corporation, *Consumer Frequently Asked Questions*, available at http://web.archive.org/web/20010210024749/http://echarge.com/phone/c . . . , dated 1997-2000, Bates Nos. 933PA_000100 to 933PA_000102.

eCharge Corporation, *Charge Online Purchase to Your Telephone Bill*, available at http://web.archive.org/web/20001119142100/http://www.echarge.com/p . . . , dated 1997-2000, Bates No. 933PA_000103.

eCharge Corporation, *Merchant Frequently Asked Questions*, available at http://web.archive.orq/web/20001017144349/http://www.echarge.com/p . . . , dated 1997-2000, Bates Nos. 933PA_000104 to 933PA_000105.

Puget Sound Business Journal, *eCharge gives you credit*, available at http://www.bizjournals.com/seattle/stories/1999/09/06/story4.html?page=a11, dated Sep. 6, 1999, Bates Nos. 933PA_000106 to 933PA_000110.

eCharge Corporation Press Release, *New eCHARGE™ Internet Billing System Charges Purchases to Telephone Bill with AT&T MultiQuest*, dated Nov. 21, 1997, available at http://web.archive.org/web/19991019004311/http://www.echarqe.com/si . . . , Bates No. 933PA_000111.

eCharge Corporation, *eCharge Q&A*, available at http://web.archive.org/web/19990129082842/http://www.echarqe.com/sit . . . , dated Sep. 3, 1998, Bates Nos. 933PA_000112 to 933PA_000117.

eTelcharge, Demonstration, available at https://web.archive.org/web/20010415025132/http://www.etelcharge.com/Demo.htm, dated 2000, Bates Nos. 933PA_000152 to 933PA_000153.

Google, *Shop online w/o a CC. Charge to your phone bill.*, dated Feb. 5, 2001, available at https://groups.qoogle.com/forum/, Bates Nos. 933PA_000154 to 933PA_000155.

Securities and Exchange Commission, Form SB-2 Registration Statement (Prospectus) for eTELCHARGE.com, Inc., available at http://www.nasdaq.com/markets/ipos/filing.ashx48 filingid=1545168, dated Sep. 5, 2001, Bates Nos. 933PA_000156 to 933PA_000250.

Deider, Clemens, *A new payment system for libraries: net-900*, available at http://translate.googleusercontent.com/translate_c?depth=1&hl=en&rurl=translate.google.com&sandbox=0&s1=de&t1=en&u=http://w . . ., dated Jan. 2000, Bates Nos. 933PA_000261 to 933PA_000264.

Deider, Clemens, *Ein neues Zahlungssystem für Bibliotheken: net-900*, available at http://www.b-i-t-online.de/archiv/2000-01/nach1.htm, dated Jan. 2000, Bates Nos. 933PA_000265 to 933PA_000270 (in German).

Computer World, *Net900 not working in LAN and via DSL*, dated Dec. 15, 2000, Munich, available at http://translate.googleusercontent.com/...1&hl=en&rurl=translate.google.com&sl=de&tl=en&u=http://www.computerwoche.de/a/net900-funktioniert-nun-auch-im-lan-und-via-dsl, 1079036 &usg=ALkJrhjkhbsm01xoZIZ7ainEf8Gy30aJPQ [Apr. 30, 2014 11:01:25 AM], Bates Nos. 933PA_000271 to 933PA_000273.

Computer World, *Net900 funktioniert nun auch im LAN und via DSL*, dated Dec. 5, 2000, Munich, available at http://www.computerwoche.de/a/net900-funktioniert-nun-auch-im-lan-und-via-dsl, 1079036m Bates Nos. 933PA_000274 to 933PA_000276 (in German).

Kompetenzzentrum Elektronischer Geschäftsverkehr KompEC Bonn/Rhein-Sieg, *E-Payment im Internet für kleine und mittlere Untemehmen*, dated Jun. 2001, Bates Nos. 933PA_000277 to 933PA_000379 (in German).

Deutsche Telekom, *net900™*, available at http://translate.googleusercontent.com/...lose- Kurse/eCommerce/5915-Click-Pay-net900.html&usg=ALkJrhh49ti989jz5_qNg_1g0-pHx6S3Rw [Apr. 4, 2014 3:24:38 PM], dated 2000-2009, Bates Nos. 933PA_000380 to 933PA_000381.

Deutsche Telekom, *net900™*, available at http://www.teialehrbuch.de/Kostenlose-Kurse/eCommerce/5915-Click-Pay-net900.html, dated 2000-2009, Bates Nos. 933PA_000382 to 933PA_000384.

Tam, Pui-Wing, *Qualcomm BREWs up a wireless storm*, dated Jan. 31, 2001, available at http://www.zdnet.com/news/qualcomm-brews-up-a-wireless-storm/113976, Bates Nos. 933PA_000385 to 933PA_000388.

Telecompaper, *Qualcomm unveils BREW software development platform*, dated Jan. 31, 2001, available at http://www.telecompaper.com/news/qualcomm-unveils-brew-software-development-platform-- 257829, Bates Nos. 933PA_000389 to 933PA_000393.

Trivnet Inc., *About Us*, available at https://web.archive.org/web/20010405013757/http://www.trivnet.com/ab . . . , dated 2000, Bates Nos. 933PA_000394 to 933PA_000395.

Trivnet Inc., *WiSP™ Benefits to End-Users*, available at https://web.archive.org/web/20010408201141/http://www.trivnet.com/en . . . , dated 2000, Bates Nos. 933PA_000396 to 933PA_000396.

Trivnet Inc., *Frequently Asked Question*, available at https://web.archive.org/web/20010411041110/http://www.trivnet.com/faq . . . , dated 2000, Bates Nos. 933PA_000397 to 933PA_000398.

Trivnet Inc., *Features*, available at https://web.archive.org/web/20010414034354/http://www.trivnet.com/fe . . . , dated 2000, Bates Nos. 933PA_000399 to 933PA_000400.

Trivnet Inc., *Mobile Operators/ISPs/Billing System Providers*, available at https://web.archive.org/web/20010413221647/http://www.trivnet.com/isp . . . , dated 2000, Bates Nos. 933PA_000401 to 933PA_000402.

Trivnet Inc., *WiSP™*, available at https://web.archive.org/web/20010408001207/http://www.trivnet.com/p . . . , dated 2000, Bates No. 933PA_000403.

Finn, Ruder, The Center for Corporate News—Press Release, *Trivnet's Payment Solution Goes Mobile*, dated Nov. 28, 2000, avail-

(56) References Cited

OTHER PUBLICATIONS able at http://www.bizwiz.com/bixwizwire/pressrelease/1793/84848878xjywf8 . . . , Bates Nos. 933PA__000404 to 933PA__000409.
Trivnet Inc., WiSP™ internet payment service, available at https://web.archive.org/web/20010406060859/http://www.trivnet.com/ in . . . , dated 2000, Bates No. 933PA__000706.
eCharge Corporation, *What is eCHARTE*, available at http://web.archive.org/web/19981206180436/http://www.echarge.com/si . . . , dated Nov. 26, 1998, Bates No. 933PA__000707.
Robben, Matthias, *Micropayment: Wer den Pfennig nicht ehrt . . .* , available at http://www.ecin.de/fachartikel/17149-micropayment-wer-den-pfennig-nicht-ehrt.html?tmp . . . , dated Aug. 24, 2000, Bates Nos. 922PA__001081 to 933PA__001085 (in German).
Seals, Matthias, *Micropayment: who does not honor the penny . . .* , dated Aug. 24, 2000, available at http://translate.googleusercontent.com/translate__c?depth=2&hl=en&rurl=translate.google.co . . . , Bates Nos. 933PA__001090 to 933PA __001093.
Die Welt, *Mit dem Handy an die Kasse*, available at http://www.welt.de/print-welt/article442139/Mit-dem-Handy-an-die-Kasse.html, dated Mar. 28, 2001, Bates Nos. 933PA__001086 to 933PA__001089 (in German).
Die Welt, *With the mobile phone to the cashier*, dated Mar. 28, 2001, available at http://translate.googleusercontent.com/translate__c?depth=2&hl=en&rurl=translate.google.co . . . , Bates Nos. 933PA__001105 to 933PA__001107.
X-PressPay, *Neues Zahlungstool X-PressPay*, available at http://www.golem.de/0006/8159.html, dated Jun. 13, 2000, Bates Nos. 933PA__001108 to 933PA__001110 (in German).
Ihlenfeld, Jens, *New Payment Tool X-PressPay*, available at http://translate.googleusercontent.com/translate__c?depth=2&hl=en&rurl=translate.google.co . . . , dated Jun. 13, 2000, Bates Nos. 933PA__001094 to 933PA__001096.
Bericht Datenschutz, *Payment: Datenschutzrechtliche Beurteilung von Zahlungsverfahren im Netz*, available at http://www.infin.de/homepage/payment/bericht-online/ratgeber3.htm, , printed Apr. 29, 2014, Bates Nos. 933PA__001099 to 933PA__001100 (in German).
Bericht Datenschutz, *Payment: Privacy Settlement of payment method on the net*, available at http://translate.googleusercontent.com/translate__c?depth=2&hl=en&ie=UTF8&prev=__t&rur . . . , printed Apr. 29, 2014, Bates Nos. 933PA__001097 to 933PA__001098.
X-PressPay, Press Release—*Neues Zahlungstool soll zum Standard für Internet-Payment we . . .* , available at http://www.pressrelations.de/NEW/standard/result__main.cfm?pfach=1&n__firmanr__=1074 . . . , dated May 17, 2000, Bates Nos. 933PA__001103 to 933PA__001104 (in German).
X-PressPay, Press Release—*New Payment tool will be the standard for Internet Payment*, dated May 17, 2000, Bonn, Germany, Bates Nos. 933PA__001101 to 933PA__001102.
Exhibit A-01, U.S. Pat. No. 5,745,556 ("Ronen"), Initial Invalidity Claim Chart for U.S. Pat. No. 7,907,933, dated May 14, 2014, 13 pages.
Exhibit A-02, U.S. Pat. No. 5,909,671 ("Byford"), Initial Invalidity Claim Chart for U.S. Pat. No. 7,907,933, dated May 14, 2014, 14 pages.
Exhibit A-03, U.S. Pat. No. 5,978,775 ("Chen"), Initial Invalidity Claim Chart for U.S. Pat. No. 7,907,933, dated May 14, 2014, 10 pages.
Exhibit A-03, U.S. Pat. No. 5,978,775 ("Chen"), Initial Invalidity Claim Chart for U.S. Pat. No. 7,907,933, dated May 14, 2014, 13 pages.
Exhibit A-05, U.S. Pat. No. 6,535,726, Initial Invalidity Claim Chart for U.S. Pat. No. 7,907,933, dated May 14, 2014, 7 pages.
Exhibit A-06, U.S. Pat. No. 6,868,391 ("Hultgren"), Initial Invalidity Claim Chart for U.S. Pat. No. 7,907,933, dated May 14, 2014, 15 pages.
Exhibit A-07, U.S. Pat. No. 7,437,331 ("Rosenberger"), Initial Invalidity Claim Chart for U.S. Pat. No. 7,907,933, dated May 14, 2014, 9 pages.
Exhibit A-08, U.S. Pat. No. 7,490,062 ("Hansmann"), Initial Invalidity Claim Chart for U.S. Pat. No. 7,907,933, dated May 14, 2014, 12 pages.
Exhibit A-09, U.S. Pat. No. 7,606,355 ("Hutchinson"), Initial Invalidity Claim Chart for U.S. Pat. No. 7,907,933, dated May 14, 2014, 13 pages.
Exhibit A-10, U. S. Patent App. Pub. No. 2001/0025273A1 ("Walker"), Initial Invalidity Claim Chart for U.S. Pat. No. 7,907,933, dated May 14, 2014, 12 pages.
Exhibit A-11, U. S. Patent App. Pub. No. 2001/0037254A1 ("Glikman"), Initial Invalidity Claim Chart for U.S. Pat. No. 7,907,933, dated May 14, 2014, 9 pages.
Exhibit A-12, U.S. Pat. Pub. No. 2001/0037264 ("Husemann"), Initial Invalidity Claim Chart for U.S. Pat. No. 7,907,933, dated May 14, 2014, 6 pages.
Exhibit A-13, U.K. Pat. Appl. No. GB2352928 ("Muzaffar"), Initial Invalidity Claim Chart for U.S. Pat. No. 7,907,933, dated May 14, 2014, 11 pages.
Exhibit A-14, EP 1 081 919 to ("Krauss"), Initial Invalidity Claim Chart for U.S. Pat. No. 7,907,933, dated May 14, 2014, 6 pages.
Exhibit A-15, Canadian Patent Application No. CA 2 352 216 A1, Initial Invalidity Claim Chart for U.S. Pat. No. 7,907,933, dated May 14, 2014, 18 pages.
Exhibit A-16, WO 1999/030293 ("Isotalo"), Initial Invalidity Claim Chart for U.S. Pat. No. 7,907,933, dated May 14, 2014, 6 pages.
Exhibit A-17, WO 00/36810 ("Isotalo"), Initial Invalidity Claim Chart for U.S. Pat. No. 7,907,933, dated May 14, 2014, 6 pages.
Exhibit A-18, WO 00/77697 ("Prisant"), Initial Invalidity Claim Chart for U.S. Pat. No. 7,907,933, dated May 14, 2014, 8 pages.
Exhibit A-19, PCT Application No. WO 01/06572, Initial Invalidity Claim Chart for U.S. Pat. No. 7,907,933, dated May 14, 2014, 9 pages.
Exhibit A-20, eCharge, Initial Invalidity Claim Chart for U.S. Pat. No. 7,907,933, dated May 14, 2014, dated May 14, 2014, 16 pages.
Exhibit A-21, Global Internet Billing Chargit Initial Invalidity Claim Chart for U.S. Pat. No. 7,907,933, dated May 14, 2014, 11 pages.
Exhibit A-22, eTelCharge.com, Initial Invalidity Claim Chart for U.S. Pat. No. 7,907,933, dated May 14, 2014, 9 pages.
Exhibit A-23, Bonn X-Press GmbH X-PressPay, Initial Invalidity Claim Chart for U.S. Pat. No. 7,907,933, dated May 14, 2014, 12 pages.
Exhibit A-24, AT&T eCharge, Initial Invalidity Claim Chart for U.S. Pat. No. 7,907,933, dated May 14, 2014, 10 pages.
Exhibit A-25, Trivnet WiSP ("WiSP"), Initial Invalidity Claim Chart for U.S. Pat. No. 7,907,933, dated May 14, 2014, 17 pages.
Exhibit A-26, Click&Pay net900 by In Media Res Initial Invalidity Claim Chart for U.S. Pat. No. 7,907,933, dated May 14, 2014, 14 pages.
Exhibit A-27, Qualcomm's BREW System Initial Invalidity Claim Chart for U.S. Pat. No. 7,907,933, dated May 14, 2014, 13 pages.
Joint Claim Construction Brief, filed Oct. 9, 2014, in the following five cases in the United States District Court for the District of Delaware: (1) *Callwave Communications, LLC* v. *AT&T Mobility, LLC and Google Inc.*, Proceeding No. C.A. No. 12-1701 (RGA); (2) *Callwave Communications, LLC* v. *Sprint Nextel Corp. and Google Inc.*, Proceeding No. C.A. No. 12-1702 (RGA); (3) *Callwave Communications, LLC* v. *T-Mobile USA Inc. and Google Inc.*, Proceeding No. C.A. No. 12-1703 (RGA); (4) *Callwave Communications, LLC* v. *Verizon Communications, Inc., Cellco Partnership d/b/a Verizon Wireless and Google Inc.*, Proceeding No. C.A. No. 12-1704 (RGA); and (5) *Callwave Communications, LLC* v. *AT&T Mobility, LLC, Blackberry Ltd. and Blackberry Corp.*, Proceeding No. C.A. No. 12-1788 (RGA).
Memorandum Opinion in Civil Action Nos. 12-1701-RGA, 12-1703-RGA, 12-1704-RGA, 12-1788-RGA, U.S. District Court for the District of Delaware, filed Dec. 17, 2014, 22 pages.
Joint Claim Construction Brief (Call Processing) filed Dec. 10, 2014, in the matters of: (1) *Callwave Communications, LLC* v. *AT&T Inc., AT&T Mobility, LLC and Google Inc.*, proceeding No. C.A. No. 12-1701-RGA; (2) *Callwave Communications, LLC* v. *Sprint Spectrum L.P., Sprint Communications Company L.P. and Google Inc.*, proceeding No. C.A. No. 12-1702-RGA; (3) *Callwave Communications, LLC* v. *Verizon Services Corp., Cellco Partnership D/B/A*

(56) References Cited

OTHER PUBLICATIONS

*Verizon Wireless and Google Inc.*, proceeding No. C.A. No. 12-1704-RGA; and (4) *Broadsoft, Inc. v. Callwave Communications, LLC*, proceeding No. C.A. No. 13-711-RGA; each filed in the United States District Court for The District of Delaware (the "Delaware Cases") (91 pp).

Callwave's claim construction letter re outcall from Pepper Hamilton LLP to The Honorable Richard G. Andrews of the United States District Court, dated Jan. 9, 2015, regarding the Delaware Cases (referenced above) (1 page).

Callwave's claim construction letter re switched network from Pepper Hamilton LLP to The Honorable Richard G. Andrews of the United States District Court, dated Jan. 12, 2015, regarding the Delaware Cases (referenced above) (3 pp).

Defendants' claim construction letter re switched network from Morris, Nichols, Arsht & Tunnell LLP to The Honorable Richard G. Andrews of the United States District Court, dated Jan. 12, 2015, regarding the Delaware Cases (referenced above) (3 pp).

Defendants' response to Callwave's claim construction letter re outcall from Morris, Nichols, Arsht & Tunnell LLP to The Honorable Richard G. Andrews of the United States District Court, dated Jan. 12, 2015, regarding the Delaware Cases (referenced above) (3 pp).

Harry Newton, *Newton's Telecom Dictionary*, Telecom Books/CMP Media Inc., 16th Ed., Expanded and Updated Feb. 2000, filed as Exhibit A on Jan. 12, 2015 in the Delaware Cases (referenced above) (6 pp).

Annabel Z. Dodd, *The Essential Guide to Telecommunications*, 2nd Ed., 2000, Prentice Hall PTR, Upper Saddle River, NJ, filed as Exhibit 1 on Dec. 10, 2014 in the Delaware Cases (referenced above) (5 pp).

File History of U.S. Appl. No. 60/719,635 for Methods and Systems for Call Forwarding, Call Screening, and Call Conferencing, compiled Mar. 15, 2013, and filed as Exhibit 2 on Dec. 10, 2014 in the Delaware Cases (referenced above) (45 pp).

Phil Hochmuth, *U.S. Robotics offers 56K VoIP modem, Network World*, Jan. 2, 2001, filed as Exhibit 3 on Dec. 10, 2014 in the Delaware Cases (reference above) (3 pp).

U.S. Appl. No. 60/127,434 for a Method for Providing Expanded Telecommunications Service, filed Apr. 1, 1999 in the U.S. Patent and Trademark Office, and filed as Exhibit 4 on Dec. 10, 2014 in the Delaware Cases (referenced above) (33 pp).

U.S. Appl. No. 10/439,601 for Systems and Methods for Call Screening, filed May 16, 2003 in the U.S. Patent and Trademark Office, and filed as Exhibit 5 on Dec. 10, 2014 in the Delaware Cases (referenced above) (44 pp).

Declaration of David Lucantoni, Ph.D. in Support of CallWave Communications, LLC's Opening Claim Construction Brief, filed as Exhibit 6 on Dec. 10, 2014 in the Delaware Cases (referenced above) (40 pp).

Supplemental Declaration of David Lucantoni, Ph.D. in Support of CallWave Communications, LLC's Claim Construction Brief, filed as Exhibit 7 on Dec, 10, 2014 in the Delaware Cases (referenced above) (17 pp).

Defendants' Supplemental Invalidity Contentions, filed Jan. 13, 2015, in the matters (1) *Callwave Communications, LLC v. AT&T Mobility, LLC, and Google Inc.*, Case No. C.A. 12-1701-RGA; (2) *Callwave Communications, LLC v. Sprint Spectrum L.P., Sprint Communications Company L.P., and Google Inc.*, Case No. C.A. No. 12-1702-RGA; (3) *Callwave Communications, LLC v. Verizon Services Corp., Cellco Partnership, D.B.A. Verizon Wireless, and Google Inc.*, Case No. C.A. No. 12- 1704-RGA; and (4) *Broadsoft, Inc. v. Callwave Communications, LLC*, Case No. C.A. No. 13-711-RGA (hereinafter collectively called the "Callwave/AT&T/Sprint/Verizon/Broadsoft cases"); all in the United States District Court for the District of Delaware; Bates Nos. CWF00041040-CWF0041047; 8 pp.

Exhibit DBS1, Supplemental Invalidity Claim Chart for U.S. Pat. No. 7,636,428 Based on Panasonic Digital Business System, filed Jan. 13, 2015, in the Callwave/AT&T/Sprint/Verizon/Broadsoft cases; Bates Nos. CWF00041048-CWF0041068; 21 pp.

Exhibit DBS2, Supplemental Invalidity Claim Chart for U.S. Pat. No. 8,064,588 Based on Panasonic Digital Business System, filed Jan. 13, 2015, in the Callwave/AT&T/Sprint/Verizon/Broadsoft cases; Bates Nos. CWF00041069-CWF0041097; 29 pp.

Exhibit Norris!, Supplemental Invalidity Claim Chart for U.S. Pat. No. 7,636,428 Based on U.S. Pat. No. 5,805,587 ("Norris"), filed Jan. 13, 2015, in the Callwave/AT&T/Sprint/Verizon/Broadsoft cases; Bates Nos. CWF00041098-CWF0041141; 44 pp.

Exhibit Norris2, Supplemental Invalidity Claim Chart for U.S. Pat. No. 8,064,588 Based on U.S. Pat. No. 5,805,587 ("Norris"), filed Jan. 13, 2015, in the Callwave/AT&T/Sprint/Verizon/Broadsoft cases; Bates Nos. CWF00041142-CWF0041176; 35 pp.

Fonality's Preliminary Invalidity Contentions, filed Jan. 16, 2015, in the matter of *Callwave Communications, LLC v. Fonality Inc.*, Case No. C.A. 14-398-RGA (hereinafter called the "Fonality case"); in the United States District Court for the District of Delaware; 30 pp.

Exhibit A1, Initial Invalidity Claim Chart for U.S. Pat. No. 7,822,188 Based on U.S. Pat. No. 6,430,282 ("Bannister"); Exhibit A2, Initial Invalidity Claim Chart for U.S. Pat. No. 7,822,188 Based on U.S. Pat. No. 7,224,774 ("Brown"); Exhibit A3, Initial Invalidity Claim Chart for U.S. Pat. No. 7,822,188 Based on "A Proposal for Internet Call Waiting Service using SIP" ("Brusilovsky"); Exhibit A4, Initial Invalidity Claim Chart for U.S. Pat. No. 7,822,188 Based on U.S. Pat. No. 5,432,845 ("Burd"); Exhibit A5, Initial Invalidity Claim Chart for U.S. Pat. No. 7,822,188 Based on U.S. Patent App. 2002/0067816 ("Bushnell"); Exhibit A6, Initial Invalidity Claim Chart for U.S. Pat. No. 7,822,188 Based on U.S. Pat. No. 7,190,773 ("D'Silva"); Exhibit A7, Initial Invalidity Claim Chart for U.S. Pat. No. 7,822,188 Based on U.S. Pat. No. 6,366,661 ("Devillier"); Exhibit A8, Initial Invalidity Claim Chart for U.S. Pat. No. 7,822,188 Based on U.S. Pat. No. 5,991,394 ("Dezonno"); Exhibit A9, Initial Invalidity Claim Chart for U.S. Pat. No. 7,822,188 Based on U.S. Pat. No. 6,155,667 ("Doshi"); Exhibit A10, Initial Invalidity Claim Chart for U.S. Pat. No. 7,822,188 Based on U.S. Pat. No. 7,242.680 ("Gallant"); Exhibit A11, Initial Invalidity Claim Chart for U.S. Pat. No. 7,822,188 Based on U.S. Patent Application Publication No. 2002/0176404 ("Girard"); Exhibit A12, Initial Invalidity Claim Chart for U.S. Pat. No. 7,822,188 Based on U.S. Pat. No. 6,389,117 ("Gross"); Exhibit A13, Initial Invalidity Claim Chart for U.S. Pat. No. 7,822,188 Based on U.S. Pat. No. 7,020,255 ("Gruchala"); Exhibit A14, Initial Invalidity Claim Chart for U.S. Pat. No. 7,822,188 Based on U.S. Pat. No. 6,693,897 ("Huang"); Exhibit A15, Initial Invalidity Claim Chart for U.S. Pat. No. 7,822,188 Based on U.S. Pat. No. 5,475,748 ("Jones"); Exhibit A16, Initial Invalidity Claim Chart for U.S. Pat. No. 7,822,188 Based on U.S. Pat. No. 6,690,672 ("Klein"); Exhibit A17, Initial Invalidity Claim Chart for U.S. Pat. No. 7,822,188 Based on U.S. Pat. No. 5,802,160 ("Kugell"); Exhibit A18, Initial Invalidity Claim Chart for U.S. Pat. No. 7,822,188 Based on U.S. Pat. No. 6,430,289 ("Liffick"); Exhibit A19, Initial Invalidity Claim Chart for U.S. Pat. No. 7,822,188 Based on U.S. Pat. No. 5,903,636 ("Malik"); Exhibit A20, Initial Invalidity Claim Chart for U.S. Pat. No. 7,822,188 Based on U.S. Pat. No. 7,246,612 ("Petty '612"); Exhibit A21, Initial Invalidity Claim Chart for U.S. Pat. No. 7,822,188 Based on U.S. Pat. No. 6,337,858 ("Petty '858"); Exhibit A22, Initial Invalidity Claim Chart for U.S. Pat. No. 7,822,188 Based on U.S. Pat. No. 6,137,870 ("Scherer"); Exhibit A23, Initial Invalidity Claim Chart for U.S. Pat. No. 7,822,188 Based on U.S. Pat. No. 6,130,935 ("Shaffer"); Exhibit A24, Initial Invalidity Claim Chart for U.S. Pat. No. 7,822,188 Based on U.S. Pat. No. 7,213,073 ("Slavin"); Exhibit A25, Initial Invalidity Claim Chart for U.S. Pat. No. 7,822,188 Based on U.S. Pat. No. 5,487,111 ("Slusky"); Exhibit A26, Initial Invalidity Claim Chart for U.S. Pat. No. 7,822,188 Based on U.S. Pat. No. 5,784,444 ("Snyder"); Exhibit A27, Initial Invalidity Claim Chart for U.S. Pat. No. 7,822,188 Based on U.S. Pat. No. 5,864,612 ("Strauss"); Exhibit A28, Initial Invalidity Claim Chart for U.S. Pat. No. 7,822,188 Based on U.S. Pat. No. 5,901,209 ("Tannenbaum"); Exhibit A29, Initial Invalidity Claim Chart for U.S. Pat. No. 7,822,188 Based on U.S. Pat. No. 6,091,808 ("Wood '808"); Exhibit A30, Initial Invalidity Claim Chart for U.S. Pat. No. 7,822,188 Based on U.S. Pat. No. 6,574,328 ("Wood '328"); Exhibit A31, Initial Invalidity Claim Chart for U.S. Pat. No. 7,822,188 Based on U.S. Pat. No. 7,194,080 ("Worsham"); all filed Jan. 6, 2015 in the Fonality case; 1007 pp.

(56) References Cited

OTHER PUBLICATIONS

Exhibit B1, Initial Invalidity Claim Chart for U.S. Pat. No. 8,064,588 Based on U.S. Pat. No. 6,816,481 ("Adams"); Exhibit B2, Initial Invalidity Claim Chart for U.S. Pat. No. 8,064,588 Based on U.S. Pat. No. 7,224,774 ("Brown"); Exhibit B3, Initial Invalidity Claim Chart for U.S. Pat. No. 8,064,588 Based on a Proposal for Internet Call Waiting Service using SIP ("Brusilovsky"); Exhibit B4, Initial Invalidity Claim Chart for U.S. Pat. No. 8,064,588 Based on U.S. Pat. No. 5,432,845 ("Burd"); Exhibit B5, Initial Invalidity Claim Chart for U.S. Pat. No. 8,064,588 Based on U.S. Pat. No. 6,404,860 ("Casellini"); Exhibit B6, Initial Invalidity Claim Chart for U.S. Pat. No. 8,064,588 Based on U.S. Pat. No. 7,190,773 ("D'Silva"); Exhibit B7, Initial Invalidity Claim Chart for U.S. Pat. No. 8,064,588 Based on U.S. Pat. No. 5,946,381 ("Danne"); Exhibit B8, Initial Invalidity Claim Chart for U.S. Pat. No. 8,064,588 Based on U.S. Pat. No. 6,366,661 ("Devillier"); Exhibit B9, Initial Invalidity Claim Chart for U.S. Pat. No. 8,064,588 Based on U.S. Pat. No. 4,723,273 ("Diesel"); Exhibit B10, Initial Invalidity Claim Chart for U.S. Pat. No. 8,064,588 Based on U.S. Pat. No. 6,477,246 ("Dolan"); Exhibit B11, Initial Invalidity Claim Chart for U.S. Pat. No. 8,064,588 Based on U.S. Pat. No. 6,031,896 ("Gardell"); Exhibit B12, Initial Invalidity Claim Chart for U.S. Pat. No. 8,064,588 Based on U.S. Patent Application Publication No. 2002/0176404 ("Girard"); Exhibit B13, Initial Invalidity Claim Chart for U.S. Pat. No. 8,064,588 Based on U.S. Pat. No. 5,471,519 ("Howe"); Exhibit B14, Initial Invalidity Claim Chart for U.S. Pat. No. 8,064,588 Based on U.S. Pat. No. 6,693,897 ("Huang"); Exhibit B15, Initial Invalidity Claim Chart for U.S. Pat. No. 8,064,588 Based on U.S. Pat. No. 5,475,748 ("Jones"); Exhibit B16, Initial Invalidity Claim Chart for U.S. Pat. No. 8,064,588 Based on U.S. Pat. No. 5,802,160 ("Kugell"); Exhibit B17, Initial Invalidity Claim Chart for U.S. Pat. No. 8,064,588 Based on U.S. Pat. No. 7,245,612 ("Petty '612"); Exhibit B18, Initial Invalidity Claim Chart for U.S. Pat. No. 8,064,588 Based on Daniele Rizzetto & Claudio Catania, *A Voice Over IP Service Architecture for Integrated Communications*, IEEE Internet Computing, May/Jun. 1999, at 53-62 ("Rizzetto & Catania"); Exhibit B19, Initial Invalidity Claim Chart for U.S. Pat. No. 8,064,588 Based on U.S. Pat. No. 6,574,328 ("Wood '328"); all filed Jan. 6, 2015 in the Fonality case; 670 pp.

Exhibit C1, Initial Invalidity Claim Chart for U.S. Pat. No. 8,351,591 Based on U.S. Patent App. 2002/0067816 ("Bushnell"); Exhibit C2, Initial Invalidity Claim Chart for U.S. Pat. No. 8,351,591 Based on U.S. Patent Application Publication No. 2002/0176404 ("Girard"); Exhibit C3, Initial Invalidity Claim Chart for U.S. Pat. No. 8,351,591 [based on U.S. Pat. No. 7,020,255 ("Gruchala")]; Exhibit C4, Initial Invalidity Claim Chart for U.S. Pat. No. 8,351,591 Based on U.S. Pat. No. 6,693,897 ("Huang"); Exhibit C5, Initial Invalidity Claim Chart for U.S. Pat. No. 8,351,591 Based on U.S. Pat. No. 5,475,748 ("Jones"); Exhibit C6, Initial Invalidity Claim Chart for U.S. Pat. No. 8,351,591 Based on U.S. Pat. No. 5,802,160 ("Kugell"); Exhibit C7, Initial Invalidity Claim Chart for U.S. Pat. No. 8,351,591 Based on U.S. Pat. No. 5,903,636 ("Malik"); Exhibit C8, Initial Invalidity Claim Chart for U.S. Pat. No. 8,351,591 Based on U.S. Pat. No. 7,245,612 ("Petty '612"); Exhibit C9, Initial Invalidity Claim Chart for U.S. Pat. No. 8,351,591 Based on U.S. Pat. No. 6,137,870 ("Scherer"); Exhibit C10, Initial Invalidity Claim Chart for U.S. Pat. No. 8,351,591 Based on U.S. Pat. No. 6,130,935 ("Shaffer"); Exhibit C11, Initial Invalidity Claim Chart for U.S. Pat. No. 8,351,591 Based on U.S. Pat. No. 5,784,444 ("Snyder"); Exhibit C12, Initial Invalidity Claim Chart for U.S. Pat. No. 8,351,591 Based on U.S. Pat. No. 5,864,612 ("Strauss"); Exhibit C13, Initial Invalidity Claim Chart for U.S. Pat. No. 8,351,591 Based on U.S. Pat. No. 5,901,209 ("Tannenbaum"); Exhibit C14, Initial Invalidity Claim Chart for U.S. Pat. No. 8,351,591 Based on U.S. Pat. No. 6,091,808 ("Wood '808"); all filed Jan. 6, 2015 in the Fonality case; 501 pp.

Exhibit D1, Initial Invalidity Claim Chart for U.S. Pat. No. 7,636,428 Based on U.S. Pat. No. 6,816,481 ("Adams"); Exhibit D2, Initial Invalidity Claim Chart for U.S. Pat. No. 7,636,428 Based on U.S. Pat. No. 7,224,774 ("Brown"); Exhibit D3, Initial Invalidity Claim Chart for U.S. Pat. No. 7,636,428 Based on "A Proposal for Internet Call Waiting Service using SIP" ("Brusilovsky"); Exhibit D4, Initial Invalidity Claim Chart for U.S. Pat. No. 7,636,428 Based on "The CallManager system: A platform for intelligent telecommunications services" ("CallManager"); Exhibit D5, Initial Invalidity Claim Chart for U.S. Pat. No. 7,636,428 Based on U.S. Pat. No. 6,404,860 ("Casellini"); Exhibit D6, Initial Invalidity Claim Chart for U.S. Pat. No. 7,636,428 Based on U.S. Pat. No. 7,190,773 ("D'Silva"); Exhibit D7, Initial Invalidity Claim Chart for U.S. Pat. No. 7,636,428 Based on U.S. Pat. No. 5,946,381 ("Danne"); Exhibit D8, Initial Invalidity Claim Chart for U.S. Pat. No. 7,636,428 Based on U.S. Pat. No. 6,366,661 ("Devillier"); Exhibit D9, Initial Invalidity Claim Chart for U.S. Pat. No. 7,636,428 Based on U.S. Pat. No. 6,477,246 ("Dolan"); Exhibit D10, Initial Invalidity Claim Chart for U.S. Pat. No. 7,636,428 Based on U.S. Pat. No. 6,031,896 ("Gardell"); Exhibit D11, Initial Invalidity Claim Chart for U.S. Pat. No. 7,636,428 Based on U.S. Patent Application Publication No. 2002/0176404 ("Girard"); Exhibit D12, Initial Invalidity Claim Chart for U.S. Pat. No. 7,636,428 Based on U.S. Pat. No. 5,471,519 ("Howe"); Exhibit D13, Initial Invalidity Claim Chart for U.S. Pat. No. 7,636,428 Based on U.S. Pat. No. 6,693,897 ("Huang"); Exhibit D14, Initial Invalidity Claim Chart for U.S. Pat. No. 7,636,428 Based on U.S. Pat. No. 5,862,208 ("MeLampy"); Exhibit D15, Initial Invalidity Claim Chart for U.S. Pat. No. 7,636,428 Based on U.S. Pat. No. 7,245,612 ("Petty"); Exhibit D16, Initial Invalidity Claim Chart for U.S. Pat. No. 7,636,428 Based on Daniele Rizzetto & Claudio Catania, *A Voice Over IP Service Architecture for Integrated Communications*, IEEE Internet Computing, May/Jun. 1999, at 53-62 ("Rizzetto & Catania"); Exhibit D17, Initial Invalidity Claim Chart for U.S. Pat. No. 7,636,428 Based on U.S. Pat. No. 6,574,328 ("Wood '328"); all filed Jan. 6, 2015 in the Fonality case; 1070 pp.

Exhibit E1, Initial Invalidity Claim Chart for U.S. Pat. No. 7,555,110 Based on U.S. Pat. No. 7,224,774 ("Brown"); Exhibit E2, Initial Invalidity Claim Chart for U.S. Pat. No. 7,555,110 Based on U.S. Pat. No. 6,031,896 ("Gardell"); Exhibit E3, Initial Invalidity Claim Chart for U.S. Pat. No. 7,555,110 Based on U.S. Pat. No. 5,475,748 ("Jones"); Exhibit E4, Initial Invalidity Claim Chart for U.S. Pat. No. 7,555,110 Based on U.S. Pat. No. 5,862,208 ("MeLampy"); Exhibit E5, Initial Invalidity Claim Chart for U.S. Pat. No. 7,555,110 Based on U.S. Pat. No. 7,245,612 ("Petty"); all filed Jan. 16, 2015 in the Fonality case; 90 pp.

Exhibit F1, Initial Invalidity Claim Chart for U.S. Pat. No. 8,325,901 Based on U.S. Pat. No. 7,224,774 ("Brown"); Exhibit F2, Initial Invalidity Claim Chart for U.S. Pat. No. 8,325,901 Based on U.S. Pat. No. 6,031,896 ("Gardell"); Exhibit F3, Initial Invalidity Claim Chart for U.S. Pat. No. 8,325,901 Based on U.S. Pat. No. 5,862,208 ("MeLampy"); Exhibit F4, Initial Invalidity Claim Chart for U.S. Pat. No. 8,325,901 Based on U.S. Pat. No. 7,245,612 ("Petty '612"); all filed Jan. 6, 2015 in the Fonality case; 71 pp.

Exhibit G1, Initial Invalidity Claim Chart for U.S. Pat. No. 7,397,910 Based on U.S. Pat. No. 6,122,347 ("Borland"); Exhibit G2, Initial Invalidity Claim Chart for U.S. Pat. No. 7,397,910 Based on U.S. Pat. No. 7,224,774 ("Brown"); Exhibit G3, Initial Invalidity Claim Chart for U.S. Pat. No. 7,397,910 Based on U.S. Pat. No. 6,031,896 ("Gardell"); Exhibit G4, Initial Invalidity Claim Chart for U.S. Pat. No. 7,397,910 Based on U.S. Pat. No. 5,862,208 ("MeLampy"); Exhibit G5, Initial Invalidity Claim Chart for U.S. Pat. No. 7,397,910 Based on U.S. Pat. No. 7,245,612 ("Petty"); all filed Jan. 6, 2015 in the Fonality case; 156 pp.

Brusilovsky, et al., "A Proposal for Internet Call Waiting Service using SIP", Nov. 1998, http://tools.ietf/org/id/draft-ietl-pint-icw-00.txt, downloaded Jun. 16, 2014, Bates Nos. DEF-CP-INV-00001285-DEF-CP-INV-00001296.

Pepper, David J. et al., "The CallManager system: A platform for intelligent telecommunications services", Speech Communication—Special issue on interactive voice technology for telecommunication applications (IVITA '96), vol. 23 Issue 1-2, Oct. 1997, pp. 129-139.

Rizzetto, Daniele & Catania, Claudio, A Voice Over IP Service Architecture for Integrated Communications, IEEE Internet Computing, May/Jun. 1999, at 53-62.

Annual Report to the Defense Communications Agency; Defense Switched Network Technology and Experiments Program, Massachusetts Institute of Technology, Lincoln Laboratory; for the period Oct. 1, 1982-Sep. 30, 1983; issued Feb. 29, 1984; 19 pp.; Bates Nos. DEF-CP-INV-00006151 to DEF-CP-INV-00006169.

(56) References Cited

OTHER PUBLICATIONS

Cohen, Danny; Specifications for the Network Voice Protocol (NVP) and Appendix 1: The Definition of Tables-Set-#1 (for LPC) and Appendix 2: Implementation Recommendations; DC Nov. 77; Jan. 29, 1976; 34 pp.; Bates Nos. DEF-CP-INV-00006170 to DEF-CP-INV-00006203.

Cohen, et al.; A Network Voice Protocol NVP-II; USC / ISI, Marina del Rey, CA and Lincoln Laboratory, Massachusetts Institute of Technology, Lexington, MA; Apr. 1, 1981; 75 pp.; Bates Nos. DEF-CP-INV-00006204 to DEF-CP-INV-00006278.

Forgie, James W.; ST—A Proposed Internet Stream Protocol; M.I.T. Lincoln Laboratory; Sep. 7, 1979; 36 pp.; Bates Nos. DEF-CP-INV-00006279 to DEF-CP-INV-00006314.

Casner, et al.; Experimental Internet Stream Protocol, Version 2 (ST-II); Network Working Group / CIP Working Group; Oct. 1990; 148 pp.; Bates Nos. DEF-CP-INV-00006315 to DEF-CP-INV-00006462.

Defendants' First Supplemental Invalidity Contentions on the '970 Patent, filed Feb. 12, 2015, in the matters (1) *Callwave Communications, LLC* v. *AT&T Mobility, LLC, and Google Inc.*, Case No. C.A. 12-1701-RGA; (2) *Callwave Communications, LLC* v. *Sprint Spectrum L.P., Sprint Communications Company L.P., and Google Inc.*, Case No. C.A. No. 12-1702-RGA; (3) *Callwave Communications, LLC* v. *T-Mobile USA Inc. and Google Inc.*, Case No. C.A. No. 12-1703-RGA; (4) *Callwave Communications, LLC* v. *Verizon Communications, Inc., Cellco Partnership, D.B.A. Verizon Wireless, and Google Inc.*, Case No. C.A. No. 12-1704-RGA; and (5) *Callwave Communications, LLC* v. *AT&T Mobility, LLC, Blackberry Limited, and Blackberry Corp.*, Case No. C.A. No. 12-1788-RGA (hereinafter collectively called the "Callwave/AT&T/Sprint/Verizon/Blackberry cases"); all in the United States District Court for the District of Delaware; 35 pp.

Exhibit A-30, U.S. Pat. No. 5,936,572 ("Loomis") Initial Invalidity Claim Chart for U.S. Pat. No. 6,771,970, filed Feb. 12, 2015 in the Callwave/AT&T/Sprint/Verizon/Blackberry cases; 19 pp.

Exhibit A-31, U.S. Pat. No. 5,999,126 ("Ito") Initial Invalidity Claim Chart for U.S. Pat. No. 6,771,970, filed Feb. 12, 2015 in the Callwave/AT&T/Sprint/Verizon/Blackberry cases; 22 pp.

Exhibit A-32, U.S. Pat. No. 5,552,772 ("Janky") Initial Invalidity Claim Chart for U.S. Pat. No. 6,771,970, filed Feb. 12, 2015 in the Callwave/AT&T/Sprint/Verizon/Blackberry cases; 20 pp.

Exhibit A-33, U.S. Pat. No. 6,677,894 ("Sheynblat") Initial Invalidity Claim Chart for U.S. Pat. No. 6,771,970, filed Feb. 12, 2015 in the Callwave/AT&T/Sprint/Verizon/Blackberry cases; 21 pp.

Exhibit A-34, "The Application of a Novel Two-Way Mobile Stellite Communications and Vehicle Tracking System to the Transportation Industry" ("Jacobs") Initial Invalidity Claim Chart for U.S. Pat. No. 6,771,970, filed Feb. 12, 2015 in the Callwave/AT&T/Sprint/Verizon/Blackberry cases; 26 pp.

Leonhardt, et al.; Multi-Sensor Location Tracking; Imperial College, Department of Computing, London, UK; undated; Proceeding MobiCom '98 Proceedings of the 4th annual ACM/IEEE international conference on Mobile computing and networking, pp. 203-214, © 1998, 12 pp.; Bates Nos. 970PA_000983 to 970PA_000993.

Shaw, et al.; Perspectives on an Emerging Discipline; *Software Architecture*; Carnegie Mellon University; © 1996, Prentice Hall, Upper Saddle River, New Jersey; 261 pp.; Bates Nos. 970PA_001307 to 970PA_001567.

Memorandum Opinion (Document 393) filed Jun. 3, 2015 in the United States District Court, for the District of Delaware, in the following cases: (1) *CallWave Communications, LLC* v. *AT&T Mobility, LLC, et al.*, Civil Action No. 12-1701-RGA; (2) *CallWave Communications, LLC* v. *Sprint spectrum L.P., et al.*, Civil Action No. 12-1702-RGA; (3) *CallWave communications, LLC* v. *Verizon Services Corp., et al.*, Civil Action No. 12-1704-RGA; and (4) *Broadsoft, Inc.* v. *CallWave Communications, LLC*, Civil Action No. 13-711-RGA; p. ID #s 9603-9621; 19 pp.

Exhibit A-1 U.S. Pat. No. 7,764,231 ("Karr"), Initial Invalidity Claim Chart for U.S. Pat. No. 6,771,970, dated May 14, 2014, 36 pp.

Exhibit A-2 U.S. Pat. No. 6,104,931 ("Havinis"), Initial Invalidity Claim Chart for U.S. Pat. No. 6,771,970, dated May 14, 2014, 31 pp.

Exhibit A-3 U.S. Pat. No. 6,999,779 ("Hashimoto"), Initial Invalidity Claim Chart for U.S. Pat. No. 6,771,970, dated May 14, 2014, 32 pp.

Exhibit A-4 U.S. Pat. No. 6,115,754 ("Landgren"), Initial Invalidity Claim Chart for U.S. Pat. No. 6,771,970, dated May 14, 2014, 21 pp.

Exhibit A-5 U.S. Pat. No. 6,243,039 ("Elliot"), Initial Invalidity Claim Chart for U.S. Pat. No. 6,771,970, dated May 14, 2014, 25 pp.

Exhibit A-6 U.S. Pat. No. 6,321,092 ("Fitch"), Initial Invalidity Claim Chart for U.S. Pat. No. 6,771,970, dated May 14, 2014, 43 pp.

Exhibit A-7 U.S. Pat. No. 6,838,998 ("Brown"), Initial Invalidity Claim Chart for U.S. Pat. No. 6,771,970, dated May 14, 2014, 46 pp.

Exhibit A-8 U.S. Pat. No. 6,169,497 ("Robert"), Initial Invalidity Claim Chart for U.S. Pat. No. 6,771,970, dated May 14, 2014, 44 pp.

Exhibit A-9 U.S. Pat. No. 6,100,806 ("Gaukel"), Initial Invalidity Claim Chart for U.S. Pat. No. 6,771,970, dated May 14, 2014, 40 pp.

Exhibit A-10 U.S. Pat. No. 6,393,346 ("Keith"), Initial Invalidity Claim Chart for U.S. Pat. No. 6,771,970, dated May 14, 2014, 59 pp.

Exhibit A-11 U.S. Pat. No. 6,236,358 ("Durst"), Initial Invalidity Claim Chart for U.S. Pat. No. 6,771,970, dated May 14, 2014, 69 pp.

Exhibit A-12 U.S. Pat. No. 5,724,660 ("Kauser"), Initial Invalidity Claim Chart for U.S. Pat. No. 6,771,970, dated May 14, 2014, 14 pp.

Exhibit A-13 U.S. Pat. No. 5,515,043 ("Berard"), Initial Invalidity Claim Chart for U.S. Pat. No. 6,771,970, dated May 14, 2014, 15 pp.

Exhibit A-14 U.S. Pat. No. 5,420,594 ("FitzGerald"), Initial Invalidity Claim Chart for U.S. Pat. No. 6,771,970, dated May 14, 2014, 15 pp.

Exhibit A-15 U.S. Pat. No. 5,602,739 ("Haagenstad"), Initial Invalidity Claim Chart for U.S. Pat. No. 6,771,970, dated May 14, 2014, 15 pp.

Exhibit A-16 U.S. Pat. No. 6,456,852 ("Bar"), Initial Invalidity Claim Chart for U.S. Pat. No. 6,771,970, dated May 14, 2014, 16 pp.

Exhibit A-17 U.S. Pat. No. 7,089,107 ("Jones"), Initial Invalidity Claim Chart for U.S. Pat. No. 6,771,970, dated May 14, 2014, 17 pp.

Exhibit A-18 Japan Pat. Appl. Pub. No. 11258325 ("Mitsuru"), Initial Invalidity Claim Chart for U.S. Pat. No. 6,771,970, dated May 14, 2014, 16 pp.

Exhibit A-19 International Application WO 97/14054 ("Girerd"), Initial Invalidity Claim Chart for U.S. Pat. No. 6,771,970, dated May 14, 2014, 18 pp.

Exhibit A-20 International Application WO 93/01576 ("Hakan"), Initial Invalidity Claim Chart for U.S. Pat. No. 6,771,970, dated May 14, 2014, 66 pp.

Exhibit A-21 "Location-Aware Mobile Applications Based on Directory Services", Mobile Networks and Applications 3.2 (1998): 157-73 ("Location-Aware"), Initial Invalidity Claim Chart for U.S. Pat. No. 6,771,970, dated May 14, 2014, 17 pp.

Exhibit A-22 "Providing Universal Location Services Using a Wireless E911 Location Network" ("E911"), Initial Invalidity Claim Chart for U.S. Pat. No. 6,771,970, dated May 14, 2014, 50 pp.

Exhibit A-23 "DATAMAN project: Towards a Mosaic-like Location Dependant Information Service for Mobile Clients" ("Dataman"), Initial Invalidity Claim Chart for U.S. Pat. No. 6,771,970, dated May 14, 2014, 24 pp.

Exhibit A-24 "A Modular Location-Aware Service and Application Platform" ("Pfeifer"), Initial Invalidity Claim Chart for U.S. Pat. No. 6,771,970, dated May 14, 2014, 37 pp.

Exhibit A-25 *A System Architecture for Context-Aware Mobile Computing* ("Schilit"), Initial Invalidity Claim Chart for U.S. Pat. No. 6,771,970, dated May 14, 2014, 18 pp.

Exhibit A-26 U.S. Patent No. Cyberguide: A Mobile Context-Aware Tour Guide ("Cyberguide"), Initial Invalidity Claim Chart for U.S. Pat. No. 6,771,970, dated May 14, 2014, 17 pp.

Exhibit A-27 *Disseminating Active Map Information to Mobile Hosts* ("Active Map Information"), Initial Invalidity Claim Chart for U.S. Pat. No. 6,771,970, dated May 14, 2014, 15 pp.

Exhibit A-28 *Supporting Location-Awareness in Open Distributed Systems* ("Leonhardt"), Initial Invalidity Claim Chart for U.S. Pat. No. 6,771,970, dated May 14, 2014, 18 pp.

Exhibit A-29 *Providing Location Information in a Ubiquitous Computing Environment* ("ParcTab"), Initial Invalidity Claim Chart for U.S. Pat. No. 6,771,970, dated May 14, 2014, 16 pp.

(56) References Cited

OTHER PUBLICATIONS

Defendant 8X8's Initial Invalidity Contentions filed Dec. 23, 2014 in the United States District Court for the District of Delaware, Case No. C.A. No. 14-397-RGA (the "8X8 case"); 16 pp.
Exhibit A to Defendant 8X8's Initial Invalidity Contentions filed Dec. 23, 2014 in the 8X8 case; 6 pp.
Exhibit B to Defendant 8X8's Initial Invalidity Contentions filed Dec. 23, 2014 in the 8X8 case; 6 pp.
Exhibit C to Defendant 8X8's Initial Invalidity Contentions filed Dec. 23, 2014 in the 8X8 case; 6 pp.
Exhibit D to Defendant 8X8's Initial Invalidity Contentions filed Dec. 23, 2014 in the 8X8 case; 6 pp.
Exhibit E to Defendant 8X8's Initial Invalidity Contentions filed Dec. 23, 2014 in the 8X8 case; 6 pp.
Defendant 8X8's First Supplementation to its Initial Invalidity Contentions filed Jan. 6, 2015 in the 8X8 case; 4 pp.
Exhibit G-3, Initial Invalidity Claim Chart for U.S. Pat. No. 7,397,910 Based on U.S. Pat. No. 6,031,896 ("Gardell") to Defendant 8X8's First Supplementation to its Initial Invalidity Contentions filed Jan. 6, 2015 in the 8X8 case; 28 pp.
Exhibit S-1, Supplemental Invalidity Claim Chart for U.S. Pat. No. 7,636,428 Based on "The CallManager system: A platform for intelligent telecommunications services" ("CallManager"), to Defendant 8X8's First Supplementation to its Initial Invalidity Contentions filed Jan. 6, 2015 in the 8X8 case; 28 pp.
Exhibit S-2, Supplemental Invalidity Claim Chart for U.S. Pat. No. 7,636,428 Based on "A Proposal for Internet Call Waiting Service using SIP" ("Brusilovsky"), to Defendant 8X8's First Supplementation to its Initial Invalidity Contentions filed Jan. 6, 2015 in the 8X8 case; 32 pp.
Exhibit S-3, Supplemental Invalidity Claim Chart for U.S. Pat. No. 7,636,428 Based on Daniele Rizzetto & Claudio Catania, *A Voice Over IP Service Architecture for Integrated Communications*, IEEE Internet Computing, May/Jun. 1999, at 53-62 ("Rizzetto & Catania"), to Defendant 8X8's First Supplementation to its Initial Invalidity Contentions filed Jan. 6, 2015 in the 8X8 case; 32 pp.
Exhibit S-4, Supplemental Invalidity Claim Chart for U.S. Pat. No. 8,351,591 Based on U.S. Pat. No. 7,283,625, to Defendant 8X8's First Supplementation to its Initial Invalidity Contentions filed Jan. 6, 2015 in the 8X8 case; 9 pp.
Exhibit S-5, Supplemental Invalidity Claim Chart for U.S. Pat. No. 7,822,188 Based on U.S. Pat. No. 7,283,625, to Defendant 8X8's First Supplementation to its Initial Invalidity Contentions filed Jan. 6, 2015 in the 8X8 case; 13 pp.
Exhibit S-6, Supplemental Invalidity Claim Chart for U.S. Pat. No. 8,351,591 Based on U.S. Pat. No. 5,901,209, to Defendant 8X8's First Supplementation to its Initial Invalidity Contentions filed Jan. 6, 2015 in the 8X8 case; 14 pp.
Exhibit S-7, Supplemental Invalidity Claim Chart for U.S. Pat. No. 7,822,188 Based on U.S. Pat. No. 5,901,209, to Defendant 8X8's First Supplementation to its Initial Invalidity Contentions filed Jan. 6, 2015 in the 8X8 case; 15 pp.
Exhibit S-8, Supplemental Invalidity Claim Chart for U.S. Pat. No. 7,636,428 Based on U.S. Pat. No. 6,853,714 ("714" and/or "Liljestrand"), to Defendant 8X8's First Supplementation to its Initial Invalidity Contentions filed Jan. 6, 2015 in the 8X8 case; 12 pp.
Exhibit S-9, Supplemental Invalidity Claim Chart for U.S. Pat. No. 8,064,588 Based on U.S. Pat. No. 6,853,714 ("714" and/or "Liljestrand"), to Defendant 8X8's First Supplementation to its Initial Invalidity Contentions filed Jan. 6, 2015 in the 8X8 case; 8 pp.
Exhibit S-10, Supplemental Invalidity Claim Chart for U.S. Pat. No. 7,397,910 Based on U.S. Pat. No. 6,853,714, to Defendant 8X8's First Supplementation to its Initial Invalidity Contentions filed Jan. 6, 2015 in the 8X8 case; 3 pp.
Exhibit S-12, Supplemental Invalidity Claim Chart for U.S. Pat. No. 7,636,428 Based on U.S. Pat. No. 7,408,919 ("919" and/or "McMullin"), to Defendant 8X8's First Supplementation to its Initial Invalidity Contentions filed Jan. 6, 2015 in the 8X8 case; 14 pp.
Exhibit S-13, Supplemental Invalidity Claim Chart for U.S. Pat. No. 8,064,588 Based on U.S. Pat. No. 7,408,919, to Defendant 8X8's First Supplementation to its Initial Invalidity Contentions filed Jan. 6, 2015 in the 8X8 case; 5 pp.
Exhibit S-14, Supplemental Invalidity Claim Chart for U.S. Pat. No. 7,397,910 Based on U.S. Pat. No. 7,408,919, to Defendant 8X8's First Supplementation to its Initial Invalidity Contentions filed Jan. 6, 2015 in the 8X8 case; 3 pp.
Defendant 8X8's Supplemental Invalidity Contentions Exemplified Using the Asserted Claims in the '910 Patent-In-Suit, filed Jan. 13, 2015 in the 8X8 case; 4 pp.
Exhibit S-15, Supplemental Invalidity Claim Chart for U.S. Pat. No. 7,397,910 Based on U.S. Pat. No. 6,373,517 ("Davis") (1997), to Defendant 8X8's Supplemental Invalidity Contentions Exemplified Using the Asserted Claims in the '910 Patent-In-Suit, filed Jan. 13, 2015 in the 8X8 case; 4 pp.
Exhibit S-16, Supplemental Invalidity Claim Chart for U.S. Pat. No. 7,397,910 Based on U.S. Pat. No. 6,124,882 ("Voois") (1998), to Defendant 8X8's Supplemental Invalidity Contentions Exemplified Using the Asserted Claims in the '910 Patent-In-Suit, filed Jan. 13, 2015 in the 8X8 case; 4 pp.
Exhibit S-17, Supplemental Invalidity Claim Chart for U.S. Pat. No. 7,397,910 Based on U.S. Pat. No. 6,226,031 ("Barraclough") (1998), to Defendant 8X8's Supplemental Invalidity Contentions Exemplified Using the Asserted Claims in the '910 Patent-In-Suit, filed Jan. 13, 2015 in the 8X8 case; 4 pp.
Defendant 8X8's Supplemental Invalidity Contentions Exemplified Using the Asserted Claims of the '428 and '588 (& '910) Patents, filed Jan. 15, 2015 in the 8X8 case; 5 pp.
Exhibit S-18, Supplemental Invalidity Claim Chart for U.S. Pat. No. 7,636,428 Based on U.S. Pat. No. 6,373,517 ("Davis") (filed Apr. 12, 2000), to Defendant 8X8's Supplemental Invalidity Contentions Exemplified Using the Asserted Claims of the '428 and '588 (& '910) Patents, filed Jan. 15, 2015 in the 8X8 case; 11 pp.
Exhibit S-19, Supplemental Invalidity Claim Chart for U.S. Pat. No. 7,636,428 Based on U.S. Pat. No. 6,124,882 ("Voois") (filed Jan. 9, 1998), to Defendant 8X8's Supplemental Invalidity Contentions Exemplified Using the Asserted Claims of the '428 and '588 (& '910) Patents, filed Jan. 15, 2015 in the 8X8 case; 9 pp.
Exhibit S-20, Supplemental Invalidity Claim Chart for U.S. Pat. No. 7,636,428 Based on U.S. Pat. No. 6,226,031 ("Barraclough") (filed Oct. 22, 1998), to Defendant 8X8's Supplemental Invalidity Contentions Exemplified Using the Asserted Claims of the '428 and '588 (& '910) Patents, filed Jan. 15, 2015 in the 8X8 case; 8 pp.
Exhibit S-21, Supplemental Invalidity Claim Chart for U.S. Pat. No. 7,636,428 Based on U.S. Pat. No. 7,218,721 "Vincent" (including its underlying U.S. Appl. No. 61/345,258, filed Jan. 2, 2002), to Defendant 8X8's Supplemental Invalidity Contentions Exemplified Using the Asserted Claims of the '428 and '588 (& '910) Patents, filed Jan. 15, 2015 in the 8X8 case; 7 pp.
Exhibit S-22, Supplemental Invalidity Claim Chart for U.S. Pat. No. 7,636,428 Based on U.S. Pat. No. 7,394,803 ("Petit-Huguenin") (filed Sep. 28, 2001), to Defendant 8X8's Supplemental Invalidity Contentions Exemplified Using the Asserted Claims of the '428 and '588 (& '910) Patents, filed Jan. 15, 2015 in the 8X8 case; 8 pp.
Exhibit S-23, Supplemental Invalidity Claim Chart for U.S. Pat. No. 7,636,428 Based on U.S. Pat. No. 7,202,884 ("Barraclough") (filed Jun. 20, 2001) (including its underlying U.S. Appl. No. 60/213,048, filed Jun. 21, 2000), to Defendant 8X8's Supplemental Invalidity Contentions Exemplified Using the Asserted Claims of the '428 and '588 (& '910) Patents, filed Jan. 15, 2015 in the 8X8 case; 7 pp.
Exhibit S-24, Supplemental Invalidity Claim Chart for U.S. Pat. No. 7,636,428 Based on U.S. Pat. No. 8,069,205 ("Voois") (filed Jun. 16, 2000), to Defendant 8X8's Supplemental Invalidity Contentions Exemplified Using the Asserted Claims of the '428 and '588 (& '910) Patents, filed Jan. 15, 2015 in the 8X8 case; 9 pp.
Exhibit S-25, Supplemental Invalidity Claim Chart for U.S. Pat. No. 8,064,588 Based on U.S. Pat. No. 6,373,517 ("Davis") (filed Apr. 12, 2000), to Defendant 8X8's Supplemental Invalidity Contentions Exemplified Using the Asserted Claims of the '428 and '588 (& '910) Patents, filed Jan. 15, 2015 in the 8X8 case; 7 pp.
Exhibit S-26, Supplemental Invalidity Claim Chart for U.S. Pat. No. 8,064,588 Based on U.S. Pat. No. 6,124,882 ("Voois") (filed Jan. 9,

(56) References Cited

OTHER PUBLICATIONS

1998), to Defendant 8X8's Supplemental Invalidity Contentions Exemplified Using the Asserted Claims of the '428 and '588 (& '910) Patents, filed Jan. 15, 2015 in the 8X8 case; 7 pp.
Exhibit S-27, Supplemental Invalidity Claim Chart for U.S. Pat. No. 8,064,588 Based on U.S. Pat. No. 6,226,031 ("Barraclough") (filed Oct. 22, 1998), to Defendant 8X8's Supplemental Invalidity Contentions Exemplified Using the Asserted Claims of the '428 and '588 (& '910) Patents, filed Jan. 15, 2015 in the 8X8 case; 6 pp.
Exhibit S-28, Supplemental Invalidity Claim Chart for U.S. Pat. No. 8,064,588 Based on U.S. Pat. No. 7,218,721 "Vincent" (including its underlying U.S. Appl. No. 61/345,258, filed Jan. 2, 2002), to Defendant 8X8's Supplemental Invalidity Contentions Exemplified Using the Asserted Claims of the '428 and '588 (& '910) Patents, filed Jan. 15, 2015 in the 8X8 case; 6 pp.
Exhibit S-29, Supplemental Invalidity Claim Chart for U.S. Pat. No. 8,064,588 Based on U.S. Pat. No. 7,394,803 ("Petit-Huguenin") (filed Sep. 28, 2001), to Defendant 8X8's Supplemental Invalidity Contentions Exemplified Using the Asserted Claims of the '428 and '588 (& '910) Patents, filed Jan. 15, 2015 in the 8X8 case; 6 pp.
Exhibit S-30, Supplemental Invalidity Claim Chart for U.S. Pat. No. 8,064,588 Based on U.S. Pat. No. 7,202,884 ("Barraclough") (filed Jun. 20, 2001) (including its underlying U.S. Appl. No. 60/213,048, filed Jun. 21, 2000), to Defendant 8X8's Supplemental Invalidity Contentions Exemplified Using the Asserted Claims of the '428 and '588 (& '910) Patents, filed Jan. 15, 2015 in the 8X8 case; 5 pp.
Exhibit S-31, Supplemental Invalidity Claim Chart for U.S. Pat. No. 8,064,588 Based on U.S. Pat. No. 8,069,205 ("Voois") (filed Jun. 16, 2000), to Defendant 8X8's Supplemental Invalidity Contentions Exemplified Using the Asserted Claims of the '428 and '588 (& '910) Patents, filed Jan. 15, 2015 in the 8X8 case; 8 pp.
Exhibit S-50, Supplemental Invalidity Claim Chart for U.S. Pat. No. 7,397,910 Based on U.S. Pat. No. 7,092,379 ("Singh") (filed Oct. 30, 1996), to Defendant 8X8's Supplemental Invalidity Contentions Exemplified Using the Asserted Claims of the '428 and '588 (& '910) Patents, filed Jan. 15, 2015 in the 8X8 case; 5 pp.
Defendant 8X8's Supplemental Invalidity Contentions Exemplified Using the Asserted Claims of the '591 and '188 Patents, filed Jan. 20, 2015 in the 8X8 case; 5 pp.
Exhibit S-35, Supplemental Invalidity Claim Chart for U.S. Pat. No. 8,351,591 Based on U.S. Pat. No. 7,218,721 "Vincent" (including its underlying U.S. Appl. No. 61/345,258, filed Jan. 2, 2002), to Defendant 8X8's Supplemental Invalidity Contentions Exemplified Using the Asserted Claims of the '591 and '188 Patents, filed Jan. 20, 2015 in the 8X8 case; 8 pp.
Exhibit S-36, Supplemental Invalidity Claim Chart for U.S. Pat. No. 8,351,591 Based on U.S. Pat. No. 7,394,803 ("Petit-Huguenin") (filed Sep. 28, 2001), to Defendant 8X8's Supplemental Invalidity Contentions Exemplified Using the Asserted Claims of the '591 and '188 Patents, filed Jan. 20, 2015 in the 8X8 case; 9 pp.
Exhibit S-37, Supplemental Invalidity Claim Chart for U.S. Pat. No. 8,351,591 Based on U.S. Pat. No. 7,202,884 ("Barraclough") (filed Jun. 20, 2001) (including its underlying U.S. Appl. No. 61/213,048, filed Jun. 21, 2000), to Defendant 8X8's Supplemental Invalidity Contentions Exemplified Using the Asserted Claims of the '591 and '188 Patents, filed Jan. 20, 2015 in the 8X8 case; 8 pp.
Exhibit S-38, Supplemental Invalidity Claim Chart for U.S. Pat. No. 8,351,591 Based on U.S. Pat. No. 8,069,205 ("Voois") (filed Jun. 16, 2000), to Defendant 8X8's Supplemental Invalidity Contentions Exemplified Using the Asserted Claims of the '591 and '188 Patents, filed Jan. 20, 2015 in the 8X8 case; 9 pp.
Exhibit S-42, Supplemental Invalidity Claim Chart for U.S. Pat. No. 7,822,188 Based on U.S. Pat. No. 7,218,721 "Vincent" (including its underlying U.S. Appl. No. 61/345,258, filed Jan. 2, 2002), to Defendant 8X8's Supplemental Invalidity Contentions Exemplified Using the Asserted Claims of the '591 and '188 Patents, filed Jan. 20, 2015 in the 8X8 case; 13 pp.
Exhibit S-43, Supplemental Invalidity Claim Chart for U.S. Pat. No. 7,822,188 Based on U.S. Pat. No. 7,394,803 ("Petit-Huguenin") (filed Sep. 28, 2001), to Defendant 8X8's Supplemental Invalidity Contentions Exemplified Using the Asserted Claims of the '591 and '188 Patents, filed Jan. 20, 2015 in the 8X8 case; 13 pp.
Exhibit S-44, Supplemental Invalidity Claim Chart for U.S. Pat. No. 7,822,188 Based on U.S. Pat. No. 7,202,884 ("Barraclough") (filed Jun. 20, 2001) (including its underlying U.S. Appl. No. 61/213,048, filed Jun. 21, 2000), to Defendant 8X8's Supplemental Invalidity Contentions Exemplified Using the Asserted Claims of the '591 and '188 Patents, filed Jan. 20, 2015 in the 8X8 case; 8 pp.
Exhibit S-45, Supplemental Invalidity Claim Chart for U.S. Pat. No. 7,822,188 Based on U.S. Pat. No. 8,069,205 ("Voois") (filed Jun. 16, 2000), to Defendant 8X8's Supplemental Invalidity Contentions Exemplified Using the Asserted Claims of the '591 and '188 Patents, filed Jan. 20, 2015 in the 8X8 case; 13 pp.
Defendant 8X8's Supplemental Invalidity Contentions (Feb. 11, 2015) Relative to Callwave's Current Assertions of the Patents-In-Suit, filed Feb. 11, 2015 in the 8X8 case; 6 pp.
Defendant 8X8's Supplemental Invalidity Contentions With Supplemental Basis Under 35 U.S.C. § 112, filed Feb. 25, 2015 in the 8X8 case; 16 pp.
Defendant 8X8's Further Supplemental Invalidity Contentions Against Callwave's Patents-In-Suit Based on 8X8's Pat. 7,035,935, filed Mar. 11, 2015 in the 8X8 case; 6 pp.
Exhibit S-60, Supplemental Invalidity Claim Chart for U.S. Pat. No. 7,397,910, Based on U.S. Pat. No. 7,035,935 ("Voois") (filed Jun. 13, 2001) and based on U.S. Appl. No. 60/212,159 (filed Jun. 16, 2000), to Defendant 8X8's Further Supplemental Invalidity Contentions Against Callwave's Patents-In-Suit Based on 8X8's U.S. Pat. No. 7,035,935, filed Mar. 11, 2015 in the 8X8 case; 5 pp.
Exhibit S-61, Supplemental Invalidity Claim Chart for U.S. Pat. No. 7,822,188, Based on U.S. Pat. No. 7,035,935 ("Voois" or "Voois-2") (filed Jun. 13, 2001), U.S. Appl. No. 60/212,159 (filed Jun. 16, 2000), to Defendant 8X8's Further Supplemental Invalidity Contentions Against Callwave's Patents-In-Suit Based on 8X8's U.S. Pat. No. 7,035,935, filed Mar. 11, 2015 in the 8X8 case; 13 pp.
Exhibit S-62, Supplemental Invalidity Claim Chart for U.S. Pat. No. 8,351,591, Based on U.S. Pat. No. 7,035,935 ("Voois") (filed Jun. 13, 2001), U.S. Appl. No. 60/212,159 (filed Jun. 16, 2000), to Defendant 8X8's Further Supplemental Invalidity Contentions Against Callwave's Patents-In-Suit Based on 8X8's U.S. Pat. No. 7,035,935, filed Mar. 11, 2015 in the 8X8 case; 9 pp.
Exhibit S-63, Supplemental Invalidity Claim Chart for U.S. Pat. No. 7,636,428, Based on U.S. Pat. No. 7,035,935 ("Voois" or "Voois-2") (filed Jun. 13, 2001) and based on U.S. Appl. No. 60/212,159 (filed Jun. 16, 2000), to Defendant 8X8's Further Supplemental Invalidity Contentions Against Callwave's Patents-In-Suit Based on 8X8's U.S. Pat. No. 7,035,935, filed Mar. 11, 2015 in the 8X8 case; 9 pp.
Exhibit S-64, Supplemental Invalidity Claim Chart for U.S. Pat. No. 8,064,588, Based on U.S. Pat. No. 7,035,935 ("Voois" or "Voois-2") (filed Jun. 13, 2001) and based on U.S. Appl. No. 60/212,159 (filed Jun. 16, 2000), to Defendant 8X8's Further Supplemental Invalidity Contentions Against Callwave's Patents-In-Suit Based on 8X8's U.S. Pat. No. 7,035,935, filed Mar. 11, 2015 in the 8X8 case; 7 pp.
Defendant 8X8's Further Supplemental Invalidity Contentions Against Each of the Prosecuted Patents-In-Suit Based on Callwave's Belatedly-Produced Prior Art, filed Mar. 12, 2015 in the 8X8 case; 6 pp.
Hansson, A., Phone Doubler-A step towards integrated Internet and telephone communities (1997).
M.I.T. Lincoln Laboratory Network Speech Systems Technology Program, Annual Report to the Defense Communications Agency, Feb. 1982.
Witkowsky, IP Telephone Design and Implementation Issues (1998).
U.S. Appl. No. 11/433,061, filed May 12, 2006, Trandal et al.
U.S. Appl. No. 11/480,277, filed Jun. 30, 2006, Kirchhoff et al.
U.S. Appl. No. 11/697,219, filed Apr. 5, 2007, Trandal et al.
"Integrated Services Digital Network (ISDN); Call Waiting (CW) Supplementary Service, Supplementary Service," ETS 300 056, Oct. 1991, Bates Nos. DEF-CP-INV-00004075-DEF-CP-INV-00004090.
"Integrated Services Digital Network (ISDN); Call Waiting (CW) Supplementary Service, Functional Capabilities and Information Flows," ETS 300 057, May 1992, Bates Nos. DEF-CP-INV-00004091-DEF-CP-INV-00004113.

(56) References Cited

OTHER PUBLICATIONS

"Integrated Services Digital Network (ISDN); Call Waiting (CW) Supplementary Service, Digital Subscriber Signalling System No. one (DSS1) Protocol; Part 1: Protocol specification," ETS 300 058-1, Oct. 1991, Bates Nos. DEF-CP-INV-00004114-DEF-CP-INV-00004132.

"Integrated Services Digital Network (ISDN); Call Waiting (CW) Supplementary Service, Digital Subscriber Signalling System No. one (DSS1) Protocol; Part 2: Protocol Implementation Conformance Statement (PICS) proforma specification," ETS 300 058-2, Sep. 1995, Bates Nos. DEF-CP-INV-00004133-DEF-CP-INV-00004152.

"Integrated Services Digital Network (ISDN); Call Waiting (CW) Supplementary Service, Digital Subscriber Signalling System No. one (DSS1) Protocol; Part 3: Test suite structure and Test Purposes (TSS&TP) specification for the user," ETS 300 058-3, Sep. 1996, Bates Nos. DEF-CP-INV-00004153- DEF-CP-INV-00004166.

"Integrated Services Digital Network (ISDN); Call Waiting (CW) Supplementary Service, Digital Subscriber Signalling System No. one (DSS1) Protocol; Part 4: Abstract Test Suite (ATS) and Partial Protocol Implementation eXtra Information for Testing (PIXIT) Proforma Specification for the User," ETS 300 058-4, May 1997, Bates Nos. DEF-CP-INV-00004167-DEF-CP-INV-00004189.

"Integrated Services Digital Network (ISDN); Call Waiting (CW) Supplementary Service, Digital Subscriber Signalling System No. one (DSS1) Protocol; Part 5: Test Suite Structure and Test Purposes (TSS&TP) specification for the network," ETS 300 058-5, May 1997, Bates Nos. DEF-CP-INV-00004190-DEF-CP-INV-00004204.

"Integrated Services Digital Network (ISDN); Call Waiting (CW) Supplementary Service, Digital Subscriber Signalling System No. one (DSS1) Protocol; Part 6: Abstract Test Suite (ASTS) and partial Protocol Implementation eXtra Information to Testing (PIXIT) proforma specification for the network," ETS 300 058-6, May 1997, Bates Nos. DEF-CP-INV-00004205-DEF-CP-INV-00004234.

"Integrated Services Digital Network (ISDN); Calling Line Identification Presentation (CLIP) supplementary service; Digital Subscriber Signalling System No. one (DSS1) protocol; Part 1: Protocol specification," ETS 300 092-1, Mar. 1992, Bates Nos. DEF-CP-INV-00004235-DEF-CP-INV-00004258.

"Integrated Services Digital Network (ISDN); Explicit Call Transfer (ECT) supplementary service, Digital Subscriber Signalling System No. one (DSS1) protocol Part 1: Protocol specification" ETS 300 369-1, May 1995, DEF-CP-INV-00004546-DEF-CP-INV-00004588.

"Integrated Services Digital Network (ISDN); User-network Interface layer 3, Specifications for basic call control," ETS 300 102-1, Dec. 1990, Bates Nos. DEF-CP-INV-00004259-DEF-CP-INV-00004471.

"Integrated Services Digital Network (ISDN); User-network Interface layer 3, Specifications for basic call control, Specification Description Language (SDL) diagrams" ETS 300 102-2, Dec. 1990, Bates Nos. DEF-CP-INV-00004472-DEF-CP-INV-00004545.

"Intelligent Networks," edited by Jarmo Harju et al., Chapman & Hall, 1995, Proceedings of the IFIP Workshop on Intelligent Networks 1994, Bates Nos. DEF-CP-INV-00002318-DEF-CP-INV-00002620.

Ambrosch et al., "The Intelligent Network", A Joint Study by Bell Atlantic, IBM and Siemens, 1989, Bates Nos. DEF-CP-INV-00001308-DEF-CP-INV-00001611.

Article: "Widget MySpace Widget"; posted by 4INFO Bob; http://4info.typepad.com/blog/2006/09/widget_myspace_.html; Sep. 15, 2006; 3 pages.

Article: Communications-SMS, Dashboard Widgets—Showcase; http://www.dashboardwidgets.com/showcase/details.php?wid=1082; Oct. 14, 2005; 2 pages.

Arup Acharya, et al., *DATAMAN project: Towards a Mosaic-like Location-Dependant [sic] Information Service for Mobile Clients*, Journal of Mobile Computing (1995), Bates Nos. 970PA_000570 to 970PA_000575.

Bellamy, John, "Digital Telephony, Second Edition", Wiley Series in Telecommunications, John Wiley, & Sons, Inc., 1991, Bates Nos. DEF-CP-INV-00001699-DEF-CP-INV-00002289.

Biggs et al., "The SIP Replaces Header," Jul. 12, 2001, Bates Nos. DEF-CP-IMV-00004589-DEF-CP-INV-00004594.

Bill N. Schilit and Marvin M. Theimer, *Disseminating Active Map Information to Mobile Hosts*, IEEE Network (Oct. 1994): 22-32, Bates Nos. 970PA_000762 to 970PA_000772.

Brusilovsky et al., "A Proposal for Internet Call Waiting Service using SIP", Nov. 1998, http://tools.ietf.org/id/draft-ietf-pint-icw-00.txt, downloaded Jun. 16, 2014, Bates Nos. DEF-CP-INV-00001285-DEF-CP-INV-00001296.

Cameron et al., "A Feature Interaction Benchmark for IN and Beyond", Mar. 1993, Bates Nos. DEF-CP-INV-00002295-DEF-CP-INV-00002317.

Communication pursuant to Article 94(3) EPC; EP Application 03731252.7, dated Jun. 3, 2009; 6 pages.

Dalgic et al, "True Number Portability and Advanced Call-Screening in a SIP-Based IP-Telephony System," Jul. 1999, Bates Nos. DEF-CP-INV-00004044-DEF-CP-INV-00004062.

Defendants' Initial Invalidity Contentions on the '970 Patent, mailed May 14, 2014, in the following cases pending in the United States District Court, for the District of Delaware: *Callwave Communications, LLC* v. *AT&T Mobility, LLC, and Google Inc.*, Case No. C.A. No. 12-1701-RGA; *Callwave Communications, LLC* v. *Spring Nextel Corp. and Google Inc.*, Case No. C.A. 12-1702-RGA; *Callwave Communications, LLC* v. *T-Mobile USA Inc. and Google Inc.*, Case No. C.A. No. 12-1703-RGA; *Callwave Communications, LLC* v. *Verizon Communications, Inc., Cellco Partnership, dba Verizon Wireless and Google Inc.*, Case No. C.A. No. 12-1704-RGA; and *Callwave Communications, LLC* v. *AT&T Mobility, LLC, Blackberry Limited and Blackberry Corp.*, Case No. C.A. No. 12-1788-RGA.

Defendants' Preliminary Invalidity Contentions Relating to the Call Processing Track, In The United States District Court, for The District of Delaware, *Callwave Communicates, Inc.*, v. *AT&T Mobility, LLC, and Google, Inc.*, C.A. No. 12-1701-RGA, *Callwave Communications, LLC*, v. *Sprint Spectrum L.P., Sprint Communications Co., L.P., and Google, Inc.*, C.A. No. 12-1702-RGA, *Callwave Communications, LLC*, v. *Verizon Services Corp., Cellco Partnership, d.b.A. Verizon Wireless, and Google, Inc.*, C.A. No. 12-1704-RGA, and *Broadsoft, Inc.*, v. *Callwave Communications, Inc.*, Case No. 1:13-cv-00711-RGA, dated Jun. 23, 2014.

Del Pozo, Inmaculada Espigares "An Implementation of the Internet Call Waiting Service using SIP," Helsinki University of Technology, Dec. 1999, Bates Nos. DEF-CP-INV-00001612-DEF-CP-INV-00001698.

Exhibit A-1, Initial Invalidity Claim Chart for U.S. Pat. No. 7,822,188 Based on U.S. Pat. No. 6,430,282 ("Bannister") dated Jun. 23, 2014.

Exhibit A-2, Initial Invalidity. Claim Chart for U.S. Pat. No. 7,822,188 Based on U.S. Pat. No. 7,224,774 ("Brown") dated Jun. 23, 2014.

Exhibit A-3, Initial Invalidity Claim Chart for U.S. Pat. No. 7,822,188 Based on "A Proposal for Internet Call Waiting Service using SIP" ("Brusilovsky") dated Jun. 23, 2014.

Exhibit A-4, Initial Invalidity Claim Chart for U.S. Pat. No. 7,822,188 Based on U.S. Pat. No. 5,432,845 ("Burd") dated Jun. 23, 2014.

Exhibit A-5, Initial Invalidity Claim Chart for U.S. Pat. No. 7,822,188 Based on U.S. Patent App. 2002/0067816 ("Bushnell") dated Jun. 23, 2014.

Exhibit A-6, Initial Invalidity Claim Chart for U.S. Pat. No. 7,822,188 Based on U.S. Pat. No. 7,190,773 ("D'Silva") dated Jun. 23, 2014.

Exhibit A-7, Initial Invalidity Claim Chart for U.S. Pat. No. 7,822,188 Based on U.S. Pat. No. 6,366,661 ("Devillier") dated Jun. 23, 2014.

Exhibit A-8, Initial Invalidity Claim Chart for U.S. Pat. No. 7,822,188 Based on U.S. Pat. No. 5,991,394 ("Dezonno") dated Jun. 23, 2014.

Exhibit A-9, Initial Invalidity Claim Chart for U.S. Pat. No. 7,822,188 Based on U.S. Pat. No. 6,144,667 ("Doshi") dated Jun. 23, 2014.

Exhibit A-10, Initial Invalidity Claim Chart for U.S. Pat. No. 7,822,188 Based on U.S. Pat. No. 7,242,680 ("Gallant") dated Jun. 23, 2014.

(56) References Cited

OTHER PUBLICATIONS

Exhibit A-11, Initial Invalidity Claim Chart for U.S. Pat. No. 7,822,188 Based on U.S. Patent Application Publication No. 2002/0176404 ("Girard") dated Jun. 23, 2014.
Exhibit A-12, Initial Invalidity Claim Chart for U.S. Pat. No. 7,822,188 Based on U.S. Pat. No. 6,389,117 ("Gross") dated Jun. 23, 2014.
Exhibit A-13, Initial Invalidity Claim Chart for U.S. Pat. No. 7,822,188 Based on U.S. Pat. No. 7,020,255 ("Gruchala") dated Jun. 23, 2014.
Exhibit A-14, Initial Invalidity Claim Chart for U.S. Pat. No. 7,822,188 Based on U.S. Pat. No. 6,693,897 ("Huang") dated Jun. 23, 2014.
Exhibit A-15 Initial Invalidity Claim Chart for U.S. Pat. No. 7,822,188 Based on U.S. Pat. No. 5,475,748 ("Jones") dated Jun. 23, 2014.
Exhibit A-16, Initial Invalidity Claim Chart for U.S. Pat. No. 7,822,188 Based on U.S. Pat. No. 6,690,672 ("Klein") dated Jun. 23, 2014.
Exhibit A-17, Initial Invalidity Claim Chart for U.S. Pat. No. 7,822,188 Based on U.S. Pat. No. 5,802,160 ("Kugell") dated Jun. 23, 2014.
Exhibit A-18, Initial Invalidity Claim Chart for U.S. Pat. No. 7,822,188 Based on U.S. Pat. No. 6,430,289 ("Liffick") dated Jun. 23, 2014.
Exhibit A-19, Initial Invalidity Claim Chart for U.S. Pat. No. 7,822,188 Based on U.S. Pat. No. 5,903,636 ("Malik") dated Jun. 23, 2014.
Exhibit A-20, Initial Invalidity Claim Chart for U.S. Pat. No. 7,822,188 Based on U.S. Pat. No. 7,245,612 ("Petty '612") dated Jun. 23, 2014.
Exhibit A-21, Initial Invalidity Claim Chart for U.S. Pat. No. 7,822,188 Based on U.S. Pat. No. 6,337,858 ("Petty '858") dated Jun. 23, 2014.
Exhibit A-22, Initial Invalidity Claim Chart for U.S. Pat. No. 7,822,188 Based on U.S. Pat. No. 6,137,870 ("Scherer") dated Jun. 23, 2014.
Exhibit A-23, Initial Invalidity Claim Chart for U.S. Pat. No. 7,822,188 Based on U.S. Pat. No. 6,130,935 ("Shaffer") dated Jun. 23, 2014.
Exhibit A-24, Initial Invalidity Claim Chart for U.S. Pat. No. 7,822,188 Based on U.S. Pat. No. 7,213,073 ("Slavin") dated Jun. 23, 2014.
Exhibit A-25, Initial Invalidity Claim Chart for U.S. Pat. No. 7,822,188 Based on U.S. Pat. No. 5,487,111 ("Slusky") dated Jun. 23, 2014.
Exhibit A-26, Initial Invalidity Claim Chart for U.S. Pat. No. 7,822,188 Based on U.S. Pat. No. 5,784,444 ("Snyder") dated Jun. 23, 2014.
Exhibit A-27, Initial Invalidity Claim Chart for U.S. Pat. No. 7,822,188 Based on U.S. Pat. No. 5,864,612 ("Strauss") dated Jun. 23, 2014.
Exhibit A-28, Initial Invalidity Claim Chart for U.S. Pat. No. 7,822,188 Based on U.S. Pat. No. 5,901,209 ("Tannenbaum") dated Jun. 23, 2014.
Exhibit A-29, Initial Invalidity Claim Chart for U.S. Pat. No. 7,822,188 Based on U.S. Pat. No. 6,574,328 ("Wood '328") dated Jun. 23, 2014.
Exhibit A-30, Initial Invalidity Claim Chart for U.S. Pat. No. 7,822,188 Based on U.S. Pat. No. 6,091,808 ("Wood '808") dated Jun. 23, 2014.
Exhibit A-31, Initial Invalidity Claim Chart for U.S. Pat. No. 7,822,188 Based on U.S. Pat. No. 7,194,080 ("Worsham") dated Jun. 23, 2014.
Exhibit B-1, Initial Invalidity Claim Chart for U.S. Pat. No. 8,064,588 Based on U.S. Pat. No. 6,816,481 (Adams) dated Jun. 23, 2014.
Exhibit B-2, Initial Invalidity Claim Chart for U.S. Pat. No. 8,064,588 Based on U.S. Pat. No. 7,224,774 ("Brown") dated Jun. 23, 2014.
Exhibit B-3, Initial Invalidity Claim Chart for U.S. Pat. No. 8,064,588 Based on "A Proposal for Internet Call Waiting Service using SIP" ("Brusilovsky") dated Jun. 23, 2014.
Exhibit B-4, Initial Invalidity Claim Chart for U.S. Pat. No. 8,064,588 Based on U.S. Pat. No. 5,432,845 ("Burd") dated Jun. 23, 2014.
Exhibit B-5, Initial Invalidity Claim Chart for U.S. Pat. No. 8,064,588 Based on U.S. Pat. No. 6,404,860 ("Casellini") dated Jun. 23, 2014.
Exhibit B-6, Initial Invalidity Claim Chart for U.S. Pat. No. 8,064,588 Based on U.S. Pat. No. 7,190,773 ("D'Silva") dated Jun. 23, 2014.
Exhibit B-7, Initial Invalidity Claim Chart for U.S. Pat. No. 8,064,588 Based on U.S. Pat. No. 5,946,381 ("Danne") dated Jun. 23, 2014.
Exhibit B-8, Initial Invalidity Claim Chart for U.S. Pat. No. 8,064,588 Based on U.S. Pat. No. 6,366,661 ("Devillier") dated Jun. 23, 2014.
Exhibit B-9, Initial Invalidity Claim Chart for U.S. Pat. No. 8,064,588 Based on U.S. Pat. No. 4,723,273 ("Diesel") dated Jun. 23, 2014.
Exhibit B-10, Initial Invalidity Claim Chart for U.S. Pat. No. 8,064,588 Based on U.S. Pat. No. 6,477,246 ("Dolan") dated Jun. 23, 2014.
Exhibit B-11, Initial Invalidity Claim Chart for U.S. Pat. No. 8,064,588 Based on U.S. Pat. No. 6,031,896 ("Gardell") dated Jun. 23, 2014.
Exhibit B-12, Initial Invalidity Claim Chart for U.S. Pat. No. 8,064,588 Based on U.S. Patent Application Publication No. 2002/0176404 ("Girard") dated Jun. 23, 2014.
Exhibit B-13, Initial Invalidity Claim Chart for U.S. Pat. No. 8,064,588 Based on U.S. Pat. No. 5,471,519 ("Howe") dated Jun. 23, 2014.
Exhibit B-14, Initial Invalidity Claim Chart for U.S. Pat. No. 8,064,588 Based on U.S. Pat. No. 6,693,897 ("Huang") dated Jun. 23, 2014.
Exhibit B-15, Initial Invalidity Claim Chart for U.S. Pat. No. 8,064,588 Based on U.S. Pat. No. 5,475,748 ("Jones") dated Jun. 23, 2014.
Exhibit B-16, Initial Invalidity Claim Chart for U.S. Pat. No. 8,064,588 Based on U.S. Pat. No. 5,802,160 ("Kugell") dated Jun. 23, 2014.
Exhibit B-17, Initial Invalidity Claim Chart for U.S. Pat. No. 8,064,588 Based on U.S. Pat. No. 7,245,612 ("Petty '612") dated Jun. 23, 2014.
Exhibit B-18, Initial Invalidity Claim Chart for U.S. Pat. No. 8,064,588 Based on Daniele Rizzetto & Claudio Catania, A Voice Over IP Service Architecture for Integrated Communications, IEEE Internet Computing, May/Jun. 1999, at 53-62 ("Rizzetto & Catania") dated Jun. 23, 2014.
Exhibit B-19, Initial Invalidity Claim Chart for U.S. Pat. No. 8,064,588 Based on U.S. Pat. No. 6,574,328 ("Wood '328") dated Jun. 23, 2014.
Exhibit C-1, Initial Invalidity Claim Chart for U.S. Pat. No. 8,351,591 Based on U.S. Patent App. 2002/0067816 ("Bushnell") dated Jun. 23, 2014.
Exhibit C-2, Initial Invalidity Claim Chart for U.S. Pat. No. 8,351,591 Based on U.S. Patent Application Publication No. 2002/0176404 ("Girard") dated Jun. 23, 2014.
Exhibit C-3, Initial Invalidity Claim Chart for U.S. Pat. No. 8,351,591 Based on U.S. Pat. No. 7,020,255 ("Gruchala") dated Jun. 23, 2014.
Exhibit C-4, Initial Invalidity Claim Chart for U.S. Pat. No. 8,351,591 Based on U.S. Pat. No. 6,693,897 ("Huang") dated Jun. 23, 2014.
Exhibit C-5, Initial Invalidity Claim Chart for U.S. Pat. No. 8,351,591 Based on U.S. Pat. No. 5,475,748 ("Jones") dated Jun. 23, 2014.
Exhibit C-6, Initial Invalidity Claim Chart for U.S. Pat. No. 8,351,591 Based on U.S. Pat. No. 5,802,160 ("Kugell") dated Jun. 23, 2014.
Exhibit C-7, Initial Invalidity Claim Chart for U.S. Pat. No. 8,351,591 Based on U.S. Pat. No. 5,903,636 ("Malik") dated Jun. 23, 2014.
Exhibit C-8, Initial Invalidity Claim Chart for U.S. Pat. No. 8,351,591 Based on U.S. Pat. No. 7,245,612 ("Petty '612") dated Jun. 23, 2014.
Exhibit C-9, Initial Invalidity Claim Chart for U.S. Pat. No. 8,351,591 Based on U.S. Pat. No. 6,137,870 ("Scherer") dated Jun. 23, 2014.
Exhibit C-10, Initial Invalidity Claim Chart for U.S. Pat. No. 8,351,591 Based on U.S. Pat. No. 6,130,935 ("Shaffer") dated Jun. 23, 2014.
Exhibit C-11, Initial Invalidity Claim Chart for U.S. Pat. No. 8,351,591 Based on U.S. Pat. No. 5,784,444 ("Snyder") dated Jun. 23, 2014.

(56) References Cited

OTHER PUBLICATIONS

Exhibit C-12, Initial Invalidity Claim Chart for U.S. Pat. No. 8,351,591 Based on U.S. Pat. No. 5,864,612 ("Strauss") dated Jun. 23, 2014.
Exhibit C-13, Initial Invalidity Claim Chart for U.S. Pat. No. 8,351,591 Based on U.S. Pat. No. 5,901,209 ("Tannenbaum") dated Jun. 23, 2014.
Exhibit C-14, Initial Invalidity Claim Chart for U.S. Pat. No. 8,351,591 Based on U.S. Pat. No. 6,091,808 ("Wood '808") dated Jun. 23, 2014.
Exhibit D-1, Initial Invalidity Claim Chart for U.S. Pat. No. 7,636,428 Based on U.S. Pat. No. 6,816,481 (Adams) dated Jun. 23, 2014.
Exhibit D-2, Initial Invalidity Claim Chart for U.S. Pat. No. 7,636,428 Based on U.S. Pat. No. 6,122,347 ("Borland") dated Jun. 23, 2014.
Exhibit D-3, Initial Invalidity Claim Chart for U.S. Pat. No. 7,636,428 Based on U.S. Pat. No. 7,224,774 ("Brown") dated Jun. 23, 2014.
Exhibit D-4, Initial Invalidity Claim Chart for U.S. Pat. No. 7,636,428 Based on "A Proposal for Internet Call Waiting Service using SIP" ("Brusilovsky") dated Jun. 23, 2014.
Exhibit D-5, Initial Invalidity Claim Chart for U.S. Pat. No. 7,636,428 Based on "The CallManager system: A platform for intelligent telecommunications services" ("CallManager") dated Jun. 23, 2014.
Exhibit D-6, Initial Invalidity Claim Chart for U.S. Pat. No. 7,636,428 Based on U.S. Pat. No. 6,404,860 ("Casellini") dated Jun. 23, 2014.
Exhibit D-7, Initial Invalidity Claim Chart for U.S. Pat. No. 7,636,428 Based on U.S. Pat. No. 7,190,773 ("D'Silva") dated Jun. 23, 2014.
Exhibit D-8, Initial Invalidity Claim Chart for U.S. Pat. No. 7,636,428 Based on U.S. Pat. No. 5,946,381 ("Danne") dated Jun. 23, 2014.
Exhibit D-9, Initial Invalidity Claim Chart for U.S. Pat. No. 7,636,428 Based on U.S. Pat. No. 6,366,661 ("Devillier") dated Jun. 23, 2014.
Exhibit D-10 Initial Invalidity Claim Chart for U.S. Pat. No. 7,636,428 Based on U.S. Pat. No. 6,477,246 ("Dolan") dated Jun. 23, 2014.
Exhibit D-11, Initial Invalidity Claim Chart for U.S. Pat. No. 7,636,428 Based on U.S. Pat. No. 6,031,896 ("Gardell") dated Jun. 23, 2014.
Exhibit D-12, Initial Invalidity Claim Chart for U.S. Pat. No. 7,636,428 Based on U.S. Patent Application Publication No. 2002/0176404 ("Girard") dated Jun. 23, 2014.
Exhibit D-13, Initial Invalidity Claim Chart for U.S. Pat. No. 7,636,428 Based on U.S. Pat. No. 5,471,519 ("Howe") dated Jun. 23, 2014.
Exhibit D-14, Initial Invalidity Claim Chart for U.S. Pat. No. 7,636,428 Based on U.S. Pat. No. 6,693,897 ("Huang") dated Jun. 23, 2014.
Exhibit D-15, Initial Invalidity Claim Chart for U.S. Pat. No. 7,636,428 Based on U.S. Pat. No. 5,862,208 ("MeLampy") dated Jun. 23, 2014.
Exhibit D-16, Initial Invalidity Claim Chart for U.S. Pat. No. 7,636,428 Based on U.S. Pat. No. 7,245,612 ("Petty '612") dated Jun. 23, 2014.
Exhibit D-17, Initial Invalidity Claim Chart for U.S. Pat. No. 7,636,428 Based on Daniele Rizzetto & Claudio Catania, A Voice Over IP Service Architecture for Integrated Communications, IEEE Internet Computing, May/Jun. 1999, at 53-62 ("Rizzetto & Catania") dated Jun. 23, 2014.
Exhibit D-18, Initial Invalidity Claim Chart for U.S. Pat. No. 7,636,428 Based on U.S. Pat. No. 6,574,328 ("Wood '328") dated Jun. 23, 2014.
Exhibit E-1, Initial Invalidity Claim Chart for U.S. Pat. No. 7,555,110 Based on U.S. Pat. No. 7,224,774 ("Brown") dated Jun. 23, 2014.
Exhibit E-2, Initial Invalidity Claim Chart for U.S. Pat. No. 7,555,110 Based on U.S. Pat. No. 6,031,896 ("Gardell") dated Jun. 23, 2014.
Exhibit E-3, Initial Invalidity Claim Chart for U.S. Pat. No. 7,555,110 Based on U.S. Pat. No. 5,475,748 ("Jones") dated Jun. 23, 2014.
Exhibit E-4, Initial Invalidity Claim Chart for U.S. Pat. No. 7,555,110 Based on U.S. Pat. No. 5,862,208 ("MeLampy") dated Jun. 23, 2014.
Exhibit E-5, Initial Invalidity Claim Chart for U.S. Pat. No. 7,555,110 Based on U.S. Pat. No. 7,245,612 ("Petty '612") dated Jun. 23, 2014.
Exhibit F-1, Initial Invalidity Claim Chart for U.S. Pat. No. 8,325,901 Based on U.S. Pat. No. 7,224,774 ("Brown") dated Jun. 23, 2014.
Exhibit F-2, Initial Invalidity Claim Chart for U.S. Pat. No. 8,325,901 Based on U.S. Pat. No. 6,031,896 ("Gardell") dated Jun. 23, 2014.
Exhibit F-3, Initial Invalidity Claim Chart for U.S. Pat. No. 8,325,901 Based on U.S. Pat. No. 5,862,208 ("MeLampy") dated Jun. 23, 2014.
Exhibit F-4, Initial Invalidity Claim Chart for U.S. Pat. No. 8,325,901 Based on U.S. Pat. No. 7,245,612 ("Petty '612") dated Jun. 23, 2014.
Exhibit G-1, Initial Invalidity Claim Chart for U.S. Pat. No. 7,397,910 Based on U.S. Pat. No. 6,122,347 ("Borland") dated Jun. 23, 2014.
Exhibit G-2, Initial Invalidity Claim Chart for U.S. Pat. No. 7,397,910 Based on U.S. Pat. No. 7,224,774 ("Brown") dated Jun. 23, 2014.
Exhibit G-3, Initial Invalidity Claim Chart for U.S. Pat. No. 7,397,910 Based on U.S. Pat. No. 6,031,896 ("Gardell") dated Jun. 23, 2014.
Exhibit G-4, Initial Invalidity Claim Chart for U.S. Pat. No. 7,397,910 Based on U.S. Pat. No. 5,862,208 ("MeLampy") dated Jun. 23, 2014.
Exhibit G-5, Initial Invalidity Claim Chart for U.S. Pat. No. 7,397,910 Based on U.S. Pat. No. 7,245,612 ("Petty '612") dated Jun. 23, 2014.
Final Office Action dated Jun. 18, 2010 from U.S. Appl. No. 11/433,061.
Gregory D. Abowd, et al., *Cyberguide: A Mobile Context-Aware Tour Guide*, Baltzer Journals (Sep. 23, 1996): 1-21. Georgia Institute of Technology, Bates Nos. 970PA_000741 to 970PA_000761.
Handley et al., "SIP: Session Initiation Protocol," Dec. 2, 1996, www.cs.columbia.edu/sip/drafts/mmusic/draft-ietf-mmusic-sip-01.txt, Bates Nos. DEF-CP-INV-00002839-DEF-CP-INV-00002868.
Handley et al., "SIP: Session Initiation Protocol," Mar. 1999, http://www.ietf.org/rfc/rfc2543.txt, Bates Nos. DEF-CP-INV-00002869-DEF-CP-INV-00003019.
Henning Maass, *Location-Aware Mobile Applications Based on Directory Services*, Mobile Networks and Applications 3 (Jan. 1, 1998): 157-73, Bates Nos. 970PA_000547 to 970PA_000563.
International Search Report dated May 19, 2003, PCT/US03/15807.
Jain, Raj "Voice over IP: Issues and Challenges," The Ohio State University, Aug. 14, 1998, Bates Nos. DEF-CP-INV-00002681-DEF-CP-INV-00002722.
James M. Zagami, et al., *Providing Universal Location Services Using a Wireless E911 Location Network*, IEEE Communications Magazine, pp. 66-71 (Apr. 1998): 1-6, Bates Nos. 970PA_000564 to 970PA_000569.
Johnson, Dave; Article; "Now You're Talking—voice—response systems for home offices—Product Information"; http://www.findarticles.com; Feb. 1999.
Kahane et al. "Call Management Agent system requirements function architecture and protocol," dated Jan. 15, 1997, DEF-CP-INV-00004667-DEF-CP-INV-00004710.
Kahane et al., "Call Management Agent System Specification," VoIP Forum Technical Committee Contribution, Aug. 15, 1996, Bates Nos. DEF-CP-INV-00004617-DEF-CP-INV-00004652.
Mark Spreitzer and Marvin Theimer, *Providing Location Information in a Ubiquitous Computing Environment*, Xerox Palo Alto Research Center (Dec. 1993): 270-283, Bates Nos. 970PA_000959 to 970PA_000972.
Office Action dated Jan. 8, 2010 from U.S. Appl. No. 11/433,061.
Office Action mailed Dec. 22, 2010 from U.S. Appl. No. 11/697,219, in 18 pages.
Pepper et al., "Bellcore's CallManager System", Proceedings Third IEEE Workshop on Interactive Voice Technology for Telecommunications Applications, Sep. 1-Oct. 1, 1996, Bates Nos. DEF-CP-INV-00002290-DEF-CP-INV-00002294.

(56) References Cited

OTHER PUBLICATIONS

Rheinart, C., "WEB-Based Enhanced Services," Intelligent Networks and Intelligence in Networks, D. Gaiti (Ed.), Chapman & Hall, 1997, Bates Nos. DEF-CP-INV-00004063-DEF-CP-INV-00004074.
Rizzetto et al., "A Voice Over IP Service Architecture for Integrated Communications", *IEEE Internet Computing*, pp. 53-62, May/Jun. 1999, Bates Nos. DEF-CP-INV-00001297-DEF-CP-INV-00001307.
Rosenberg et al., "Third Party Call Control in SIP," Nov. 21, 2001, Bates Nos. DEF-CP-INV-00004595-DEF-CP-INV-00004616.
Schulzrinne et al., "Internet Telephony: architecture and protocols— an IETF perspective," *Computer Networks* 31 pp. 237-255 (1999), Bates Nos. DEF-CP-INV-00002621-DEF-CP-INV-00002639.
Schulzrinne et al., "Signaling for Internet Telephony," Jan. 31, 1998, Bates Nos. DEF-CP-INV-00002723-DEF-CP-INV-00002749.
Schulzrinne et al., "The Session Initiation Protocol: Providing Advanced Telephone Services Across the Internet," Sep. 13, 1998, Bates Nos. DEF-CP-INV-00002816-DEF-CP-INV-00002838.
Schulzrinne, Henning, "SIP—Signaling for Internet Telephony and Conferencing," Berkeley Multimedia, Interfaces and Graphics Seminar, Nov. 25, 1998, Bates Nos. DEF-CP-INV-00002750-DEF-CP-INV-00002798.
Schulzrinne, Henning, "Voice Communication Across the Internet: A Network Voice Terminal," Jul. 29, 1992, Bates Nos. DEF-CP-INV-00002647-DEF-CP-INV-00002680.
Sparks, R., "SIP Call Control—Transfer," Jul. 18, 2001, Bates Nos. DEF-CP-INV-00002799-DEF-CP-INV-00002815.
Sparks, R., "The Refer Method," Jul. 18, 2001, Bates Nos. DEF-CP-INV-00004030-DEF-CP-INV-00004043.
Stallings, William, "ISDN and Broadband," $2^{nd}$ Edition, Macmillan Publishing Co., 1992, Bates Nos. DEF-CP-INV-00003020-DEF-CP-INV-00003195.
Supplemental European Search Report, EP Application 03731252.7, dated Jun. 6, 2006.
Tanenbaum, Andrew S., "Computer Networks," $3^{rd}$ Edition, Prentice Hall PTR, 1996, Bates Nos. DEF-CP-INV-00003196-DEF-CP-INV-00004029.
Tom Pfeifer and Radu Popescu-Zeletin, *A Modular Location-Aware Service and Application Platform*, The Fourth IEEE Symposium on Computers and Communications (ISCC'99), Jul. 6-8, 1999, pp. 1-12, Bates Nos. 970PA_000576 to 970PA_000587.
Ulf Leonhardt and Jeff Magee, *Multi-Sensor Location Tracking*, Imperial College, 12 pp., dated 1998, Bates Nos. 970PA_000982 to 970PA_000993.
Ulf Leonhardt, *Supporting Location-Awareness in Open Distributed Systems*, University of London (May 1998): 186 pp., Bates Nos. 970PA_000773 to 970PA_000958.
Wedlund Ericsson et al., "Mobility Support Using SIP," 1999, Bats Nos. DEF-CP-INV-00002640-DEF-CP-INV-00002646.
William Noah Schilit, *A System Architecture for Context-Aware Mobile Computing, (1995): 153 pp, Columbia University, Bates Nos. 970PA_000588 to 970PA_000740*.
Defendant Fonality, Inc.'s Second Supplemental Invalidity Contentions filed Jun. 10, 2015 in the case of *CallWave Communications, LLC v. Fonality, Inc.*, in the United States District Court for the District of Delaware, C.A. No. 14-cv-398-RGA; 9 pp.
Exhibit B37, Initial Invalidity Claim Chart for U.S. Pat. No. 8,064,588 Based on U.S. Pat. No. 6,404,860 (Casellini), filed Jun. 10, 2015 in the case of *CallWave Communications, LLC v. Fonality, Inc.*, in the United States District Court for the District of Delaware, C.A. No. 14-cv-398-RGA; 30 pp.
Defendant's (Google Inc.) Fifth Supplemental Invalidity Contentions, dated Jun. 22, 2015, in the following cases pending in the United States District Court, for the District of Delaware: *CallWave Communications, LLC v. AT&T Mobility, LLC, and Google Inc.*, Case No. C.A. No. 12-1701-RGA; *CallWave Communications, LLC v. Google Inc.*, Case No. C.A. 12-1702-RGA; and *CallWave Communications, LLC, v. Verizon Services Corp., et al.*, Case No. C.A. No. 12-1704-RGA (hereinafter referred to as "Defendant's Fifth Supplemental Invalidity Contentions"); 8 pp.

Exhibit Burger '660 filed on Jun. 22, 2015 with Defendant's Fifth Supplemental Invalidity Contentions, Invalidity Claim Charts for U.S. Pat. No. 7,397,901; 8,325,901; and 7,555,110 Based on U.S. Pat. No. 6,353,660 ("Burger"); 94 pp.
Exhibit E-11 filed on Jun. 22, 2015 with Defendant's Fifth Supplemental Invalidity Contentions, Invalidity Chart for U.S. Pat. No. 7,555,110 Based on Panasonic Cordless Telephone Answering System KX-T4400; 19 pp.
Exhibit F-10 filed on Jun. 22, 2015 with Defendant's Fifth Supplemental Invalidity Contentions, Invalidity Chart for U.S. Pat. No. 8,325,901 Based on Panasonic Cordless Telephone Answering System KX-T4400; 24 pp.
Exhibit G-11 filed on Jun. 22, 2015 with Defendant's Fifth Supplemental Invalidity Contentions, Invalidity Chart for U.S. Pat. No. 7,397,910 Based on Panasonic Cordless Telephone Answering System KX-T4400; 67 pp.
Exhibit A-35 filed on Jun. 22, 2015 with Defendant's Fifth Supplemental Invalidity Contentions, Invalidity of U.S. Pat. No. 7,822,188 Based on Session Initiation Protocol Specifications; 19 pp.
Schulzrinne, Henning; *SIP for Mobile Applications*; Dept. of Computer Science, Columbia University, New York, NY; VON Developer's Conference Summer 2000 (Boston); Jul. 18, 2000—The Road Ahead; Bates Nos. DEF-CP-INV-00008088-8104; 17 pp.
Rosenberg, et al.; *Best Current Practices for Third Party Call Control (3pcc) in the Session Initiation Protocol (SIP)*; Network Working Group, © The Internet Society (2004); Bates Nos. DEF-CP-INV-00007109-7139; 31 pp.
Johnston, et al.; *Session Initiation Protocol Service Examples, draft-ietf-sipping-service-examples-05*, SIPPING Working Group, © The Internet Society (2003); Bates Nos. DEF-CP-INV-00007140-7305; 166 pp.
Boulton, et al.; *Best Current Practices for NAT Traversal for SIP*, draft-ietf-sipping-nat-scenarios-02, SIPPING Working Group, © The Internet Society (2004); Bates Nos. DEF-CP-INV-00007306-7345; 40 pp.
Rosenberg, J.; *Interactive Connectivity Establishment (ICE) : A Methodology for Network Address Translator (NAT) Traversal for Offer/Answer Protocols*, draft-ietf-mmusic-ice-05; MMUSIC, © The Internet Society (2005); Bates Nos. DEF-CP-INV-00007346-7393; 48 pp.
Operating Instructions Manual for the Panasonic Cordless Telephone Answering System, Model No. KX-T4400; Panasonic Company; may be 1994 or earlier, Bates Nos. DEF-CP-INV-00007394-7471; 78 pp.
Magazine Article/Advertisement, *Tapeless Two-Step New Dance in Cordless Game; Twice* Magazine, Jan. 4, 1993, p. 74; Bates Nos. DEF-CP-INV-00007472-7473; 2 pp.
Lennox, et al.; *Call Processing Language (CPL): A Language for User Control of Internet Telephony Services*; Network Working Group, © The Internet Society (2004); Bates Nos. DEF-CP-INV-00007474-7542; 69 pp.
Rosenberg, et al.; *SIP: Session Initiation Protocol*; Network Working Group, © The Internet Society (2002); Bates Nos. DEF-CP-INV-00007543-7811; 269 pp.
Rosenberg, et al.; *STUN—Simple Traverrsal of User Datagram Protocol (UDP) Through Network Address Translators (NATs)*; Network Working Group, © The Internet Society (2003); Bates Nos. DEF-CP-INV-00007812-7858; 47 pp.
Rosenberg, et al.; *Traversal Using Relay (NAT (TURN), draft-rosenberg-midcom-turn-05*; MIDCOM, © The Internet Society (2004); Bates Nos. DEF-CP-INV-00007859-7897; 39 pp.
Technical Specification Booklet ETSI TS 123 228, V5.4.1 (Apr. 2002), Universal Mobile Telecommunications System (UMTS); IP Multimedia Subsystem (IMS); Stage 2 (3GPP TS 23.228 version 5.4.1 Release 5); ETSI © European Telecommunications Standards Institute 2002; Bates Nos. DEF-CP-INV-00007899-8047; 150 pp.
*Popular Photography* Magazine; Jun. 1993, vol. 57, No, 2; cover page; pp. 5, 6, 109; Bates Nos. DEF-CP-INV-00008080-8083; 4 pp.
*Popular Photography* Magazine; Sep. 1993, vol. 57, No. 5; cover page; pp. 1, 2, 125; Bates Nos. DEF-CP-IMV-00008084-8087; 4 pp.
Defendants' (Google Inc. and Broadsoft, Inc.) Fourth Supplemental Invalidity Contentions, dated May 22, 2015, in the following cases pending in the United States District Court, for the District of Dela-

(56) References Cited

OTHER PUBLICATIONS ware: *Callwave Communications, LLC v. AT&T Mobility, LLC, and Google Inc.*, Case No. C.A. No. 12-1701-RGA; *Callwave Communications, LLC v. Spring Nextel Corp. and Google Inc.*, Case No. C.A. 12-1702-RGA; and *Broadsoft, Inc. v. Callwave Communications, LLC*, Case No. C.A. No. 13-711-RGA (hereinafter referred to as "Defendants' Fourth Supplemental Invalidity Contentions"); 10 pp.
Corrected Exhibit A-33 filed on May 22, 2015 with Defendants' Fourth Supplemental Invalidity Contentions, Invalidity Claim Chart for U.S. Pat. No. 7,822,188 Based on the Session Initiation Protocol Service examples Memo (Feb. 2004); 70 pp.
Exhibit A-34 filed on May 22, 2015 with Defendants' Fourth Supplemental Invalidity Contentions, Initial Invalidity Claim Chart for U.S. Pat. No. 7,822,188 Based on U.S. Pat. No. 6,445,694 ("Swartz"); 32 pp.
Exhibit B-20 filed on May 22, 2015 with Defendants' Fourth Supplemental Invalidity Contentions, Initial Invalidity Claim Chart for U.S. Pat. No. 8,064,588 Based on U.S. Pat. No. 6,445,694 ("Swartz"); 19 pp.
Exhibit D-11 filed on May 22, 2015 with Defendants' Fourth Supplemental Invalidity Contentions, Initial Invalidity Claim Chart for U.S. Pat. No. 7,636,428 Based on U.S. Pat. No. 6,445,694 ("Swartz"); 11 pp.
Exhibit D-12 filed on May 22, 2015 with Defendants' Fourth Supplemental Invalidity Contentions, Initial Invalidity Claim Chart for U.S. Pat. No. 7,636,428 Based on U.S. Pat. No. 6,041,103 ("La Porta"); 36 pp.
Exhibit D-13 filed on May 22, 2015 with Defendants' Fourth Supplemental Invalidity Contentions, Initial Invalidity Claim Chart for U.S. Pat. No. 7,636,428 Based on U.S. Pat. No. 6,266,524 ("Dee"); 26 pp.
Exhibit D-14 filed on May 22, 2015 with Defendants' Fourth Supplemental Invalidity Contentions, Initial Invalidity Claim Chart for U.S. Pat. No. 7,636,428 Based on U.S. Pat. No. 6,310,939 ("Varney"); 23 pp.
Exhibit E-07 filed on May 22, 2015 with Defendants' Fourth Supplemental Invalidity Contentions, Initial Invalidity Claim Chart for U.S. Pat. No. 7,555,110 Based on U.S. Pat. No. 6,041,103 ("La Porta"); 14 pp.
Exhibit E-08 filed on May 22, 2015 with Defendants' Fourth Supplemental Invalidity Contentions, Initial Invalidity Claim Chart for U.S. Pat. No. 7,555,110 Based on U.S. Pat. No. 6,266,524 ("Dee"); 12 pp.
Exhibit E-09 filed on May 22, 2015 with Defendants' Fourth Supplemental Invalidity Contentions, Initial Invalidity Claim Chart for U.S. Pat. No. 7,555,110 Based on U.S. Pat. No. 6,310,939 ("Varney"); 10 pp.
Exhibit F-06 filed on May 22, 2015 with Defendants' Fourth Supplemental Invalidity Contentions, Initial Invalidity Claim Chart for U.S. Pat. No. 8,325,901 Based on U.S. Pat. No. 6,041,103 ("La Porta"); 17 pp.
Exhibit F-07 filed on May 22, 2015 with Defendants' Fourth Supplemental Invalidity Contentions, Initial Invalidity Claim Chart for U.S. Pat. No. 8,325,901 Based on U.S. Pat. No. 6,266,524 ("Dee"); 18 pp.
Exhibit F-08 filed on May 22, 2015 with Defendants' Fourth Supplemental Invalidity Contentions, Initial Invalidity Claim Chart for U.S. Pat. No. 8,325,901 Based on U.S. Pat. No. 6,310,939 ("Varney"); 17 pp.
Exhibit G-07 filed on May 22, 2015 with Defendants' Fourth Supplemental Invalidity Contentions, Initial Invalidity Claim Chart for U.S. Pat. No. 7,397,910 Based on U.S. Pat. No. 6,041,103 ("La Porta"); 36 pp.
Exhibit G-08 filed on May 22, 2015 with Defendants' Fourth Supplemental Invalidity Contentions, Initial Invalidity Claim Chart for U.S. Pat. No. 7,397,910 Based on U.S. Pat. No. 6,266,524 ("Dee"); 30 pp.
Exhibit G-09 filed on May 22, 2015 with Defendants' Fourth Supplemental Invalidity Contentions, Initial Invalidity Claim Chart for U.S. Pat. No. 7,397,910 Based on U.S. Pat. No. 6,310,939 ("Varney"); 24 pp.
Exhibit NBX1 filed on May 22, 2015 with Defendants' Fourth Supplemental Invalidity Contentions, Initial Invalidity Claim Chart for U.S. Pat. No. 7,555,110 Based on the NBX System; 25 pp.
Exhibit NBX2 filed on May 22, 2015 with Defendants' Fourth Supplemental Invalidity Contentions, Initial Invalidity Claim Chart for U.S. Pat. No. 7,822,188 Based on the NBX System; 47 pp.
Exhibit NBX3 filed on May 22, 2015 with Defendants' Fourth Supplemental Invalidity Contentions, Initial Invalidity Claim Chart for U.S. Pat. No. 7,636,428 Based on the NBX System; 54 pp.
Exhibit NBX4 filed on May 22, 2015 with Defendants' Fourth Supplemental Invalidity Contentions, Initial Invalidity Claim Chart for U.S. Pat. No. 8,064,588 Based on the NBX System; 21 pp.
Exhibit NBX5 filed on May 22, 2015 with Defendants' Fourth Supplemental Invalidity Contentions, Initial Invalidity Claim Chart for U.S. Pat. No. 8,325,901 Based on the NBX System; 31 pp.
Exhibit NBX6 filed on May 22, 2015 with Defendants' Fourth Supplemental Invalidity Contentions, Initial Invalidity Claim Chart for U.S. Pat. No. 7,397,910 Based on the NBX System; 67 pp.

METHODS AND SYSTEMS FOR CALL CONNECTING CALLS

PRIORITY CLAIM

This is a continuation of U.S. patent application Ser. No. 13/353,278, filed Jan. 18, 2012, which is a continuation of U.S. patent application Ser. No. 11/480,277, filed Jun. 30, 2006, now abandoned, which claims priority from U.S. Patent Application No. 60/696,135, filed Jul. 1, 2005, and U.S. Patent Application No. 60/752,521, filed Dec. 20, 2005, the contents of which are incorporated herein by reference in their entirety.

BACKGROUND OF THE INVENTION

1. Field of the Invention

The present invention relates generally to telecommunications and in particular to systems and methods for routing telephone calls.

2. Description of the Related Art

People are increasingly associated with more phone numbers and phone types. For example, a person may be associated with a cell phone number, a work phone number, a home phone number, and a Voice Over IP (VoIP) phone number. It has thus become more difficult for a caller attempting to reach someone to decide which phone number to call.

SUMMARY OF THE INVENTION

The present invention relates generally to telecommunications and in particular to systems and methods for routing telephone calls.

By way of example, a first address, such as a first phone number, can be associated with a telephonic terminal, such as a mobile phone. Incoming calls to the first address can be routed to the telephonic terminal or to other destinations based on telephonic terminal status. Outgoing calls from that telephonic terminal optionally have the first address as the associated caller ID. Similarly, messages, such as Short Messaging Service (SMS) messages, can be routed to the first address. Optionally, the first address has the standard behavior associated with a mobile phone number, but is associated with additional call handling features offered by a service provider, such as call screening, call transfer, call conferencing, and/or distinctive ring-back.

A method of processing calls, the method comprising: receiving over a network at a call processing system a first call from a calling party directed to a called party's phone address, wherein signaling information associated with the first call includes the calling party's phone address; querying a wireless network system for status of a wireless telephonic destination associated with the called party's phone address; receiving status for the wireless telephonic destination; originating a second call from the call processing system to the wireless telephonic destination associated with the called party; transmitting, while the first call is in progress, a call alert notification regarding the first call, including at least a portion of the signaling information, to a networked computer associated with the called party via a communication channel; bridging the first call with the second call and the communication channel associated with the networked computer; providing a greeting to the calling party via the call processing system; receiving a voice communication from the calling party at the processing system; streaming at least a first portion of the voice communication via the call processing system in substantially real time to the telephonic device and/or the networked computer while ensuring that sound does not travel back to the calling party from the telephonic device or networked computer associated with the called party to thereby allow the called party to screen the caller call from the telephonic device or networked computer while the calling party is unaware that the call screening is being performed; providing a first user interface via the telephonic device or networked computer that when a first input is provided by the called party, causes duplex communication to be provided to the telephonic device or networked computer so that the called party can converse with the calling party; and providing a second user interface via the telephonic device or networked computer that, when a second input is provided by the called party, causes a third call to be originated from the call processing system to one of another telephonic device or networked computer.

Another example embodiment provides a method of processing calls, the method comprising: receiving over a network at a call processing system a first call from a caller directed to a phone address of the called party, wherein signaling information associated with the first call includes the phone address of the caller; querying a wireless network system for the status and phone address of a wireless telephonic destination associated with the called party phone address; originating a second call from the call processing system to a wireless telephonic destination associated with the called party, wherein signaling information associated with the second call includes an identifier associated with the caller so that the second call appears to be originating from the caller; and bridging the first call with the second call.

Another example embodiment provides a method of processing calls, the method comprising: receiving over a network at a call processing system a first call from a caller directed to a called party's phone address, wherein signaling information associated with the first call includes the caller's phone address; querying a wireless network system for the status and phone address of a wireless telephonic destination associated with the called party's phone address; originating a second call from the call processing system to a wireless telephonic destination associated with the called party; transmitting, while the first call is in progress, a call alert notification of the first call including at least a portion of the signaling information to the networked computer associated with the called party; and bridging the first call with the second call.

Another example embodiment provides a method of processing calls, the method comprising: receiving over a network at a call processing system a first call from a caller directed to a called party's phone address; querying a wireless network system for the status and phone address of a wireless telephonic destination associated with the called party's phone address; providing a greeting to the caller via the call processing system; receiving a voice communication from the caller at the processing system; streaming at least a first portion of the voice communication via the call processing system in substantially real time to a telephonic device associated with the called party while ensuring that sound does not travel back to the caller from the telephonic device to thereby allow the called party to screen the call from the telephonic device while the caller is unaware that their call is being screened; and, providing a first user interface via the telephonic device, wherein the called party provides a first input, full duplex communication is provided to the telephonic device.

Another example embodiment provides a method of processing calls, the method comprising: receiving over a network at a call processing system a first call from a caller directed to a called party's phone address, wherein signaling information associated with the first call includes the caller's phone address; querying a wireless network system for the status and phone address of a wireless telephonic destination associated with the called party's phone address; originating a second call from the call processing system to a wireless telephonic destination associated with the called party; providing a greeting to the caller via the call processing system; receiving a voice communication from the caller at the processing system; streaming at least a first portion of the voice communication via the call processing system in substantially real time to a destination associated with the called party while ensuring that sound does not travel back to the caller from the telephonic device associated with the called party to thereby allow the called party to screen the call from the telephonic device while the caller is unaware that their call is being screened; providing a first user interface via the telephonic device that when a first input is provided by the called party, causes duplex communication to be provided to the telephonic device from which the first input was provided so that the called party can converse with the caller; and providing a second user interface via the telephonic device that when a second input is provided by the called party, causes a third call to be originated from the call processing system to another destination.

BRIEF DESCRIPTION OF THE DRAWINGS

Embodiments of the present invention will now be described with reference to the drawings summarized below. These drawings and the associated description are provided to illustrate example embodiments of the invention, and not to limit the scope of the invention.

Throughout the drawings, like reference numbers are used to refer to items that are identical or functionally similar.

DETAILED DESCRIPTION OF PREFERRED EMBODIMENTS

Figure 1:
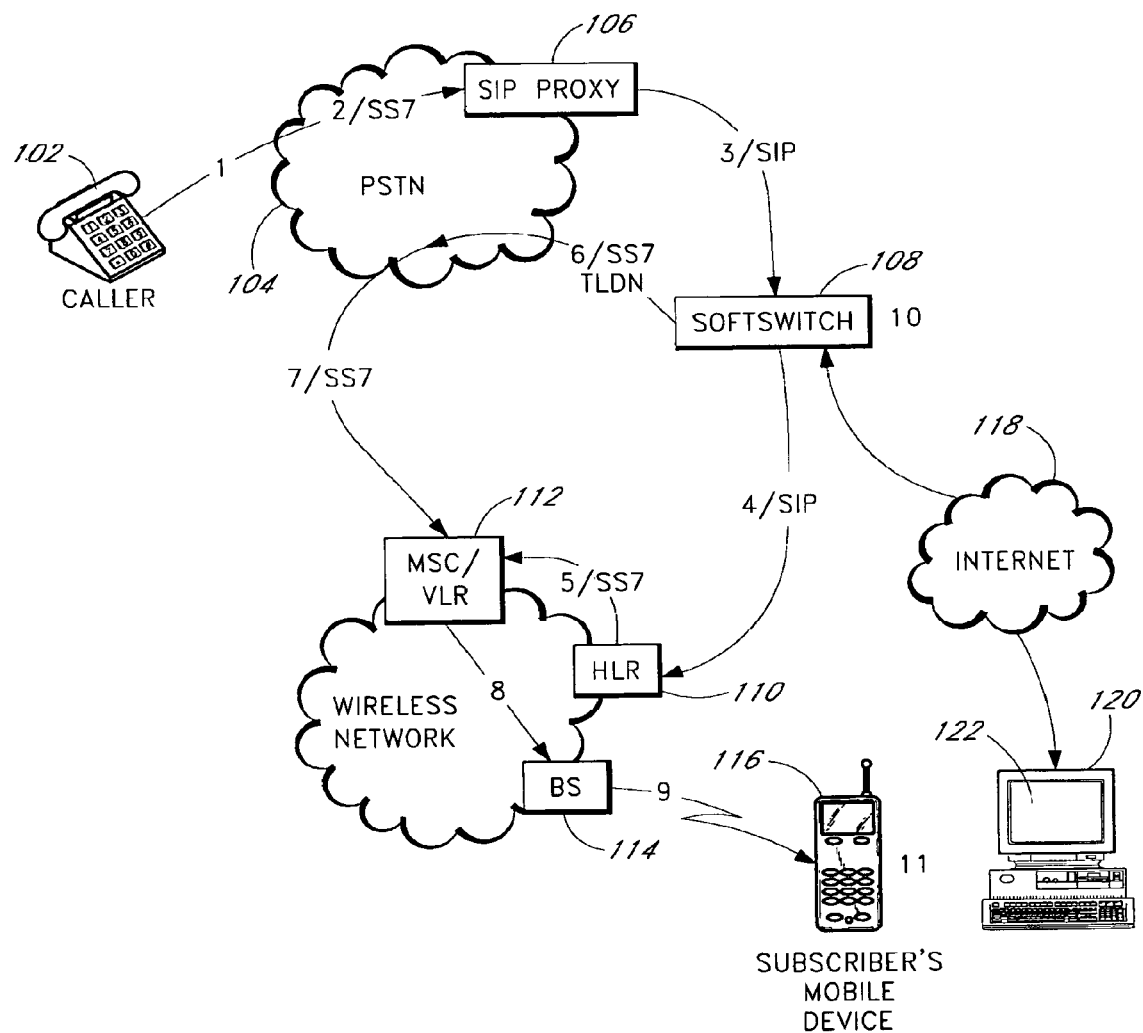
FIG. 1 illustrates an example telecommunications system and an example call handling sequence.

Embodiments described herein enable the provisioning of enhanced call processing services for calls directed to or from a phone address, such as a phone address associated with a mobile telecommunications device, such as a cell phone.

Throughout the following description, the term "Web site" is used to refer to a user-accessible network site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together. Furthermore, while the following description relates to an embodiment utilizing the Internet and related protocols, other networks, such as networked interactive televisions, and other protocols may be used as well. In addition, unless otherwise indicated, the functions described herein are preferably performed by executable code and instructions running on one or more general-purpose computers. However, the present invention can also be implemented using special purpose computers, state machines, and/or hardwired electronic circuits.

With respect to the example processes disclosed herein, not all states need to be reached, and the states do not necessarily need to be performed in the same order as that illustrated. Unless otherwise specified, the term phone number refers generally to a telephonic address, such as, without limitation, a standard POTs telephone number, an E.164 phone number (ITU-T recommendation which defines the international public telecommunication numbering plan and telephone format used in the PSTN and certain data networks), or a VoIP address.

The following is a glossary for certain abbreviations used herein:

BS—Base Station
HLR—Home Location Register
LNP—Local Number Portability
MSC—Mobile Switching Center
MVNE—Mobile Virtual Network Enabler
MVNO—Mobile Virtual Network Operator
SIM—Subscriber Identity Module
SIP—Session Initiation Protocol
TLDN—Temporary Local Directory Number
VLR—Visitor Location Register Optionally, the VoIP processes described herein are performed using the H.323 standardized protocol established by the International Telecommunications Union (ITU). Advantageously, H.323 provides specifications for real-time, interactive videoconferencing, data sharing and audio applications such as IP telephony. The Session Initiation Protocol (SIP), established by the Internet Engineering Task Force (IETF), can optionally be used. SIP is generally more efficient than the H.323 protocol as SIP is specifically intended for IP telephony. Proprietary protocols can also be used.

SIP, by way of example, enables one or more of the following services to be provided, using proxy servers and end user client systems:

1. Call forwarding: call forwarding can be provided in response to one or more of the following conditions: ring-no answer, busy, unconditional call forwarding, address manipulations (such as permanent numbers {e.g. 700 numbers}, free phone numbers {e.g. 800, 866 numbers}, and paid information numbers {e.g. 900 numbers}).
2. Call recipient and calling number identification
3. Personal mobility
4. Caller and call recipient authentication
5. Invitations to a multicast conference
6. Basic Automatic Call Distribution (ACD)

A call may be routed partially over the Internet, using SIP, and partially over a circuit-switched network, such as a PSTN (public switched telephone network). The PSTN may utilize a variety of signaling and other standards, such as the SS7 signaling protocol. Thus, calls disclosed herein (e.g., calls to the softswitch disclosed herein, and outbound calls from the softswitch, including call transfers conferenced calls), can be associated with SS7 signaling, SIP signaling, ISDN-PRI signaling and/or other types of signaling. In addition, calls disclosed herein may originate over the PSTN, a VoIP network, or other network-type.

SIP is a request-response protocol. In one embodiment, SIP can be used for establishing, manipulating and tearing down user sessions, wherein several users can optionally participate in a session. A session can optionally involve multimedia elements including audio, video, instant messaging, and/or other real-time data communications. By way of further example, a session can be an Internet multimedia conference, an Internet telephone call and/or a multimedia distribution session. Optionally, session members can communicate using multicast and/or using a mesh of unicast relations.

SIP can optionally run over UDP (User Datagram Protocol), TCP, IP, ATM, X.25 and/or other protocols. In one embodiment, SIP can work in the Application layer of the Open Systems Interconnection (OSI) communications model.

In one embodiment, SIP invitations are used to create sessions. The invitation can carry session descriptions which enable participants to agree on a set of compatible media types. SIP enables user mobility by providing proxy services and redirecting requests to the user's current location. For example, users can register their current location so that calls can be directed to a telephone or other terminal corresponding to the location.

An example system that can be used to support SIP can include some or all of the following components:

1. An endpoint component, sometimes referred to as a user agent (UA), which can be a hardware and/or software device implementing or compatible with SIP, such as an Internet Protocol (IP) phone or other terminal. The endpoint components can include a client used to initiate calls and a server used to answer calls. By way of further example, a SIP Proxy, a call manager, and a SIP phone, which are discussed herein, can be SIP endpoints.
2. A SIP network server that handles signaling associated with one or more calls. By way of example, in an optional embodiment, the network server provides name resolution and user location. The SIP network server can include one or more additional servers. For example, the SIP server can include a Register server used to receive registration messages from endpoints regarding current user location. Using a mapping database, the Register server can map the SIP addresses with the physical location or locations in the domain where the endpoint is located. The SIP network server can also include a proxy system that transmits call setup and tear down information and optionally forwards SIP messages to multiple proxy servers, creating a search tree, in order for the SIP messages to reach their destination. In addition, a SIP proxy can discover endpoint characteristics of an endpoint by consulting a list of registration templates, including dynamic configuration parameters, for that endpoint. The network server can also include a SIP Redirect server that enables endpoints to locate a desired address by redirecting one or more of the endpoint to another server.

SIP addresses can be the form of uniform resource locators (URL). By way of example, SIP addresses can optionally be embedded in Web pages. In certain applications, a user can click on a SIP address embedded in a Web or other electronic document, and in response, a call can be placed from the user terminal to the SIP address, and the user can then talk to the person or system associated with the SIP address and/or send data files to the person or system associated with the SIP address.

When making a SIP call using a SIP terminal, the SIP terminal locates the appropriate server and then sends a SIP request, such as an invitation that initiates a session. The request may directly reach the intended call recipient, or the request may be redirected or may trigger a chain of new SIP requests by proxies. If a call is to be routed through a number of different proxy servers, a redirect server can be used. When a caller's user agent sends an INVITE request to the redirect server, the redirect server contacts the location server to determine the path to the called party, and then the redirect server sends that information back to the caller. The caller terminal then acknowledges receipt of the information. The caller terminal then sends a request to the device indicated in the redirection information (which could be the call recipient terminal or another server that will forward the request). Once the request reaches the call recipient terminal, the recipient terminal transmits a response and the caller acknowledges the response.

The Real Time Protocol (RTP), Real Time Control Protocol (RTCP), and/or other appropriate protocols can be used to send audio using packets over the Internet to allow the caller and call recipient to verbally communicate. By way of example, the packets can optionally be UDP packets.

Optionally, calls directed to one more selected numbers can be routed by a SIP provider to a call processing system optionally operated by a separate entity than the SIP provider. The call processing system can provide telephone services by integrating with one or more Internet Services Providers (ISP), SIP providers and/or other telephony providers.

A SIP protocol element is optionally provided for returning mobile device status with the TLDN on the SIP Redirect that the MVNE SIP User Agent sends in response to the SIP Invite from a softswitch. The status returned includes the geographic location and whether the device is roaming.

FIG. 1 illustrates an example telecommunications system and an example call handling sequence. In this example, a network enabler, such as a Mobile Virtual Network Enabler (MVNE), interfaces with an enhanced call processing service provider to provide enhanced call processing services to a subscriber such as call screening, call transfer, call conferencing, and/or distinctive ring-back. By way of example, the MVNE may offer billing and backend network elements to other entities that want to offer mobile phone services.

By way of example, the enhanced call processing service provider can be a Mobile Virtual Network Operator (MVNO) or the enhanced call processing service provider and/or an MVNE can offer some or all of the services described herein to MVNO's. By way of further example, an MVNO does not have to own a licensed frequency spectrum, and can resell wireless services under its brand name, using the network of another mobile phone operator.

In the illustrated system, a caller 102 connects to a PSTN 104. The PSTN 104 is in communication with an enhanced call processing service provider's softswitch 108 via a SIP proxy 106 (e.g., associated with a VoIP service provider) and via SS7 signaling protocol. Optionally, a caller's call may be associated with other types of signaling, such as ISDN-PRI. The PSTN 104 is also coupled to a wireless network MSC/VLR 112 using the SS7 signaling protocol. The MSC/VLR 112 is coupled to a base station 114, and the base station 114 wirelessly connects to a mobile phone 116 (e.g., a cellular phone). While the examples described herein refer to a subscriber's mobile or wireless phone, other embodiments utilize a wireline or VoIP communications terminal/phone. The phone address associated with the subscriber may have been number ported to the softswitch 108. The softswitch 108 communicates with an HLR 110 (e.g., optionally associated with an MVNE) using SIP protocol.

Optionally, the subscriber has a terminal 120 (e.g., a personal computer, smart phone, interactive television, etc.) that communicates with the softswitch 108 over a data network 118 (e.g., the Internet). The terminal is optionally equipped with a telecommunications client application 122 that receives and displays call information (e.g., in substantially real-time) regarding calls received for the subscriber at the softswitch 108. The terminal 120 is optionally equipped with a microphone, speaker, and VoIP software and can act as a telephonic device (e.g., a VoIP phone).

Optionally, the softswitch 108 can stream voice messages being left by callers for the subscriber in substantially real time to the client 122. In addition, a call alert, including signaling information associated with a given call, can be transmitted in substantially real time to the client 122. Some or all of the call alert information can be displayed to the user via a terminal display (e.g., a personal computer, wireless phone etc.). Optionally, the call alert notification includes call transition information for a call in substantially real time. Optionally, a sound (e.g., a beep, waves, music, etc.) can be played by the terminal 120 in response to, or under the command of the call alert. Optionally, the subscriber can activate a client control to take the call at the terminal 120, or the subscriber can activate a control to transfer the call to another destination (e.g., another phone/terminal). Optionally, the user can access a call log of calls (e.g., including caller/called party identifiers (e.g., caller name), caller location, phone address, time of call, length of call, etc.) and recorded messages (e.g., recorded and stored on the softswitch). Thus, the client application 122 can be used to screen calls, take calls, and review past calls and associated voice messages. The client application 122 optionally maintains and/or accesses from a remote location the subscriber's contact list, which can be automatically populated from call information.

Presence detection can be performed by the softswitch 108 polling or pinging the subscriber terminal 120 via the telecommunications client application, or by the telecommunications client application transmitting a "Login/I'm alive" message and subsequent periodic "keep alive" messages to the softswitch 108. Optionally, just prior to the normal termination of an online Internet session, the client application 120 sends a "Logout" message to the softswitch 108. Optionally, abnormal Internet session termination conditions are detected by the softswitch 108 timing out the expected Client "Keep alive" message. Thus, the softswitch 108 is aware of the offline/online status of the terminal 120 and client application 122.

FIG. 1 depicts an example call scenario in which a caller initiates a call to a subscriber's destination address answered by the softswitch 108, and the call is routed to the subscriber's mobile device 116 via the softswitch 108 using information from the MVNE HLR 110. The caller's call may have originated over the PSTN or a VoIP network by way of examples. The example call handling sequence is as follows:

1. A caller (via a caller telephonic device) dials a first address (e.g., a phone number) associated with a subscriber's mobile phone 116 (optionally, the first address is associated with the mobile phone 116 by an enhanced call processing service provider associated with the softswitch 108). In another example, the call may have been forwarded to the first address. In this example, the PSTN 104 is informed that that the first address is associated with (e.g., owned by) the VoIP provider discussed above.

2. The first address is recognized in the PSTN (104) as being associated with the VoIP provider and so the call is routed to the VoIP provider switch serving that address.

3. The VoIP provider SIP proxy 106 converts the PSTN call to SIP and informs the softswitch 108 of the call.

4. The softswitch 106 queries the MVNE Home Location Register (HLR) 110 via SIP to obtain the status of the subscriber's mobile device, wherein the softswitch will route/process the call and optionally select a greeting timing using some or all of the information returned by the HLR 110 in response to the query. By way of example, the status can include Ready, Busy with Call Waiting, Busy, Off, No Service, or Available Minutes 5. The MVNE HLR 110 in turn queries the Visitor Location Register 112 of the Mobile Switching Center (MSC) currently serving the mobile device 116. The mobile device 116 in this example is ready to accept a call, and the VLR 112 therefore returns a Temporary Local Directory Number (TLDN) to the HLR 110 for use in routing the call to the device 116. The HLR 110 returns the TLDN and part of the status transmitted to the softswitch 108.

6. The softswitch 108 "dials" the TLDN via SS7, SIP, or other protocol.

7. The PSTN 104 utilizes the TLDN to route the call to the MSC 112 serving the subscriber's mobile device 116 in the given wireless network.

8. The MSC 112 uses the TLDN to consult its VLR for the current location of the mobile device 116 so that it can route the call to the specific base station (BS) 114 serving the device 116.

9. The BS 114 delivers the call to the mobile device 116, and the subscriber answers the call. This causes an Answer indication to be propagated back through the networks to the softswitch 108.

10. When the softswitch 108 receives the Answer indication from the mobile device 116, it opens a channel to a voice mail system within the softswitch 108 and establishes a half-duplex connection. The half-duplex connection enables the subscriber to screen the call while a message from the caller is being recorded by the softswitch (e.g., optionally, the softswitch plays a message, such as a prerecorded message from the subscriber, asking the caller to record a message, and the caller leaves a verbal message). The subscriber can hear a voice message being left by the caller and streamed in substantially real time to the mobile device 116, but the caller cannot hear the called party (e.g., the return talk path is muted). Optionally, the called party can later retrieve the recorded and stored caller message via a telephonic device or a networked computer. Optionally, the voice message is streamed in substantially real time to a networked computer associated with the subscriber and coupled over a network, such as the Internet, to the softswitch 108.

11. The subscriber provides as user input, such as by pressing the 1 key on the mobile device 116 (when key presses are referred to, other appropriate user interfaces, such as other hard or "soft keys, voice commands, etc., can be used as well), to take the call. When the softswitch detects the key press (e.g., detects the corresponding Dual-tone multifrequency (DTMF) tone), optionally, the softswitch stops recording the caller message, and opens up a full-duplex talk path between the caller and the subscriber so that the caller and the subscriber can converse.

While the call is active, the subscriber has the option of providing an instruction (e.g., by keypressing 1) to take the call (end screening), to transfer the call (e.g., by keypressing 2), or to conference in other parties (e.g., by keypressing 3). If the subscriber's mobile device had been turned off or busy, the softswitch 108 would be so informed in response to the HLR query and would act appropriately (e.g., by taking a message or by delivering the call to a different phone/destination used by the subscriber).

Optionally, when the mobile device 116 originates a call, the call does not pass through the softswitch 108 (e.g., the call is routed conventionally and/or using routing mechanisms that are standard at the time the call is routed). Optionally, even if the call is not routed via the softswitch 108, the call detail records for the call are sent to the softswitch operator (e.g., via the MVNE) for use in accounting/billing. For example, the call detail record can contain system usage information, such as the identities of sources, destination/endpoint identities, the duration of each call, the amount billed for each call, the total usage time in the billing period, the total free time remaining in the billing period, and/or the running total charged during the billing period. The mobile device optionally supports data connections to Internet-based services. Optionally, each data session is reported to the softswitch and/or softswitch operator by the MVNE after the session completes so that the usage can be tracked and billed.

A user can subscribe to one or more services and/or purchase/lease a communications device (e.g., a mobile telecommunications device), as described herein, via a website hosted by the softswitch 108 and/or operated by the softswitch operator. For example, the user can register via a web page form, and provides some or all of the following information which is stored in a softswitch subscriber database:

Name
Billing address
Shipping address,
Home phone number
Email address
Billing method selected
Optional credit card number and expiration date
Account preferences An account management interface (e.g., in the form of one or more Web pages) can be accessed by the subscriber. Via the account management interface, subscribers can access account information and make configuration changes. The interface optionally includes one or more of the following sections:

Account Summary—summarizes selected service, phone numbers, and address information
Choose Features—lists features with their current settings and allows subscriber to modify them
Review Billing—lists current outstanding charges and how billing is to occur; for Postpaid service this includes charges per call; it also states any SMS and data connection charges
Get Help—menu of areas in which to get help
Tell Your Friends—opportunity to tell others about the service offered by the softswitch operator.

The softswitch optionally hosts and stores electronic address books for subscribers, wherein a subscriber can update the address book, edit contact records, or add contact records via Web forms hosted by the softswitch.

If the user purchases a mobile device, such as mobile device 116 described herein, the mobile device is optionally shipped to the specified shipping address. Optionally, the user may purchase the mobile device at a "brick and mortar" physical retail location. The mobile device can be configured for and used for some or all of the following: making and receiving calls; composing, sending, and receiving SMS messages; for instant messaging; for sending and receiving emails, etc. The mobile device can comply with one or more wireless network standards (e.g., GSM, CDMA, GPRS, HSCSD, 1xRTT, EDGE, W-CDMA, 1xEV, TD-SCDMA, HSDPA, HSUPA, other protocol, etc.).

Optionally, the mobile device is equipped with a SIM card (e.g., a subscriber identity module which securely stores a mobile phone service subscriber identifier, subscription information, contact lists (e.g., including some or all of the following: names, phone numbers, addresses, email addresses, etc.) preferences, text messages, and/or network state information, such as its current location area identity (LAI)), or the like. The SIM card in the mobile device, and the mobile device itself, are uniquely identified to the wireless network. Optionally, the SIM card and mobile device identities are captured and recorded in the softswitch 108 as part of provisioning prior to shipping the device 116 to the user. Provisioning optionally involves interfacing with the MVNE Business-to-Business (B2B) interface to provision the assigned mobile device in the MVNE HLR 110.

The mobile device 116 optionally includes a display, including icons (which can be turned on and off, change their appearance, and/or change their color) for indicating if there is unheard voice mail, for indicating SMS message status, for indicating if there is unread email, etc. Optionally, the mobile device is configured with a speed dial (e.g., the 1 key) for accessing voice mail. Optionally, the mobile device supports data connections (e.g., has wireless Internet access), is equipped with a browser, has an email client to receive/send emails, and has instant messaging client to receive/send instant messages.

Optionally, the mobile device is configured to synchronize the contact list stored in its SIM card with the subscriber's contact list stored in the softswitch. The synchronization is optionally performed when manually requested by the subscriber from the mobile device or via an account manager user interface. Optionally, the synchronization is automatically performed when an edit has been made to the SIM contact list or the subscriber's softswitch contact data store, if the mobile device is on and connected.

The account provisioned for the subscriber can include some or all of the features/services listed in Table 1, and/or additional or different features/services. The subscriber account record (stored in the subscriber database) can include corresponding settings, with optional defaults.

TABLE 1

| Feature | Description | Default Setting |
| --- | --- | --- |
| Mobile Call Screening | The ability to answer a call and listen while the caller records a message without the caller hearing the subscriber. The subscriber may enable it for all calls and enable/disable it for individual contacts. During a call the subscriber can end screening by keypressing 1. | On |

TABLE 1-continued

| Feature | Description | Default Setting |
|---|---|---|
| Mobile Call Transfer | The ability of a subscriber to transfer a call by providing a corresponding user input (e.g., keypressing 2) during a call. The subscriber may configure the Mobile Call Transfer Number to be used for the transfer. Multiple transfer numbers can be specified if the Mobile Location feature is enabled. | Home phone number |
| Mobile Locator | Knowledge of the geographic location of the mobile device when delivering calls to the subscriber. The package subscribed to determines whether this feature is allowed. If the feature is allowed, the subscriber may enable/disable the feature. With this feature, the subscriber is allowed to specify multiple Mobile Call Transfer Numbers and associate a geographic location with each to assist in determining where to transfer a call. | Depends on service package subscribed to |
| Follow Me Home | Auto-transfer to the Mobile Call Transfer Number when the mobile device is off or out-of-range. The subscriber may enable/disable this feature. | Depends on service package subscribed to |
| Conferencing | The ability of a subscriber to conference in additional parties during a call by providing a corresponding user input (e.g., keypressing 3). Optionally, a limit on the number of participants is set in the package offer and/or a global limit is set. | Depends on service package subscribed to |
| Distinctive Ringback | The subscriber can select from a set of ring tones to be used when playing ringback to the caller. | Standard ringback |
| Private Number Screening | Prompting callers whose caller ID is blocked to reveal/unblock their caller ID in order for the call to be presented to the subscriber. subscriber may enable/disable this feature. | Depends on The service package subscribed to |
| Telemarketer Blocking | Testing a call for telemarketing behavior and if detected, reject the call by returning busy. The subscriber may enable/disable this feature. | Depends on service package subscribed to |
| Spoken Greeting | The greeting that is played to the caller in conjunction with screening or taking a message can be a standard system greeting, a spoken name greeting, or a personal greeting. The subscriber may record a name or personal greeting and may choose whether prompts are to be in a male or female voice. | Standard system greeting in female voice |
| Payment Plan | The payment for mobile service can be, by way of example, Prepaid, Postpaid, or Flat Rate. With Prepaid payment, once the allocated minutes are consumed, limited services are provided until the minutes are recharged (e.g., emergency 911 calls may be allowed, but not other calls). With Postpaid payment, the cost of individual service usage is summarized in the billing section of the user's account which is accessible online (e.g., via a browser or a dedicated client). This feature is configured as per the package subscribed to. | Depends on service package subscribed to |
| Domestic Roaming | The ability of the subscriber to use their mobile device within the US but outside of their local mobile serving area. This feature is enabled or disabled per the package subscription with region-based rates. When this feature is enabled, the softswitch is aware of whether the mobile device is in roaming mode or not when the Softswitch is determining how to handle and incoming call. | Depends on service package subscribed to |

Optionally, some or all of the feature/service/default settings can be adjusted by the subscriber via an account management user interface, optionally hosted by the softswitch 108. By way of example, the subscriber can optionally access the account management user interface as a Web page via a browser, or by phone by calling an automated interactive voice response system and/or a human operated service center.

The phone number assigned to the subscriber for some of the services described herein is sometimes referred to herein, for convenience and not by way of limitation, as a mobile access address. By way of example, the mobile access address can be a United States or foreign phone number assigned directly by the enhanced call processing service provider (e.g., the operator of the softswitch 108), by the enhanced call processing service provider via its VoIP provider partnership, by a third party, or otherwise. Optionally, the initial use of the mobile access address service may be limited to a particular geographical/regional area (e.g., a particular portion of the United States or a foreign country) and not involve both partners.

In an example optional embodiment, where the enhanced call processing service provider and an MVNE are involved in providing some or all of the services described herein, when the mobile access address is assigned to a subscriber, a Business-to-Business (B2B) interface between the enhanced call processing service provider and the MVNE propagates the phone address into the MVNE HLR. This causes the phone address to be directly associated with the mobile device in terms of addressing for voice/data network connections to/from the device.

A subscriber may have additional virtual phone numbers assigned to their account, e.g., a number with an area code of another locality so that family and friends in that locality can make a local call to the subscriber. The subscriber can receive calls on these additional numbers. Optionally, these virtual numbers will not be used as the caller ID in an outgoing call, although optionally the virtual numbers will be used as the caller ID in an outgoing call.

Optionally, the mobile access address/virtual phone number are ported to/from the softswitch or a partner of the softswitch operator via Local Number Portability (LNP).

The call routing processes and controls will now be described in greater detail.

In the example illustrated in FIG. 1, incoming calls to the subscriber's mobile access address route through the softswitch 108. The softswitch handles the incoming call per the subscriber's service/feature settings, examples of which are described in Table 1 above, and the current device status. The status of the subscriber's mobile device is obtained by querying the HLR 110 via the MVNE SIP User Agent. Examples of possible status values returned and the associated action are described in Table 2 below, and additional, fewer, or different status values can be used.

TABLE 2

Mobile Device Status from HLR

| Status | Description | Action |
| --- | --- | --- |
| Ready | Mobile device is ready to accept a call, | Route call to device via supplied TLDN. |
| Busy w/ Call Waiting | Mobile device is servicing a call but has Call Waiting enabled and thus is ready to accept another call | Route call to device via supplied TLDN. |
| Busy | Mobile device is servicing a call or data session and is unable to service another call. | Record a message. |
| Off | Mobile device turned off or out-of-range | Deliver call to Mobile Call Transfer Number if configured; otherwise take a message. |
| No Service | No wireless service on record for this number | This indicates the service is misconfigured. Throw an exception and record a message. |

As part of the status information, the MVNE HLR 110 optionally returns an indication as to whether the mobile device is roaming and/or the geographic coordinates of the mobile device. This information assists in determining where to transfer a call. If the subscriber has prepaid calling, the softswitch optionally also uses the minute balance it maintains to determine how to handle the call.

As previously discussed, the softswitch can determine the online/offline status of the telecommunications client hosted on the subscriber's terminal. If the client is running and the terminal is online, incoming calls are optionally presented via the telecommunications as well as to the mobile device. The subscriber has the option of ignoring the call (in which case the softswitch will optionally record a message from the caller for later retrieval and playback by the subscriber), screening the call (in which case the communication path is in half-duplex mode so that the subscriber can hear the caller leave a message, but the caller cannot hear the subscriber), taking the call (in which case the communication path is in full duplex mode so that the caller and the subscriber can converse and hear each other), or by transferring the call via either the mobile device or the client application to another destination. If a user of the telecommunications client user and a user of the mobile device both choose to take or transfer the call and that action is successful, the users of the client and mobile device are conferenced together with the caller.

Note that for the mobile access address service, in an example embodiment a Gateway MSC is not required since calls to the mobile device do not have to route directly to the wireless network. In such an example embodiment, the softswitch and MVNE HLR perform the gateway function.

Application of the above routing processes and controls is described in more detail below with respect to several example call scenarios. In these example scenarios, the ringback to the caller is controlled by the distinctive ringback feature setting, although a default, standard ring can be used as well.

In this example, the softswitch is configured to deliver a call to the subscriber's mobile device if the subscriber's account is not out of minutes and the device's status is Ready or Busy w/ Call Waiting. To route the call, the softswitch uses the TLDN returned by the MVNE HLR as part of the request for status. The HLR database contains the address of the VLR associated with the MSC currently serving the mobile device and it is from this VLR that it obtains the TLDN.

The softswitch dials the TLDN to deliver the call. The following scenarios may result depending on the feature settings and the subscriber behavior:

Call is not answered, so a message is recorded by the softswitch

Call is answered and screening is disabled, so a full duplex call path is established.

Call is answered with screening enabled and while a message is being recorded, the subscriber provides a user input (e.g., presses key 1) to cause the call path to be changed from half- to full-duplex.

After a call is answered, the subscriber provides a user input (e.g., keypresses 2) to transfer the call to the Mobile Call Transfer Number independent of whether screening is active.

After a call is answered, the subscriber provides a user input (e.g., keypresses 3) to conference in other parties independent of whether screening is active.

Call is answered and the account runs out of minutes before it completes.

In the forgoing scenarios private number screening and telemarketer blocking may be invoked at the beginning of the call depending on the subscriber's feature settings and the type of call.

These call scenarios are described in more detail below. In the example scenarios, where a connection to the mobile device is established, optionally minutes of usage is tracked and deducted from the subscriber's account if prepaid calling is configured.

Figure 2:
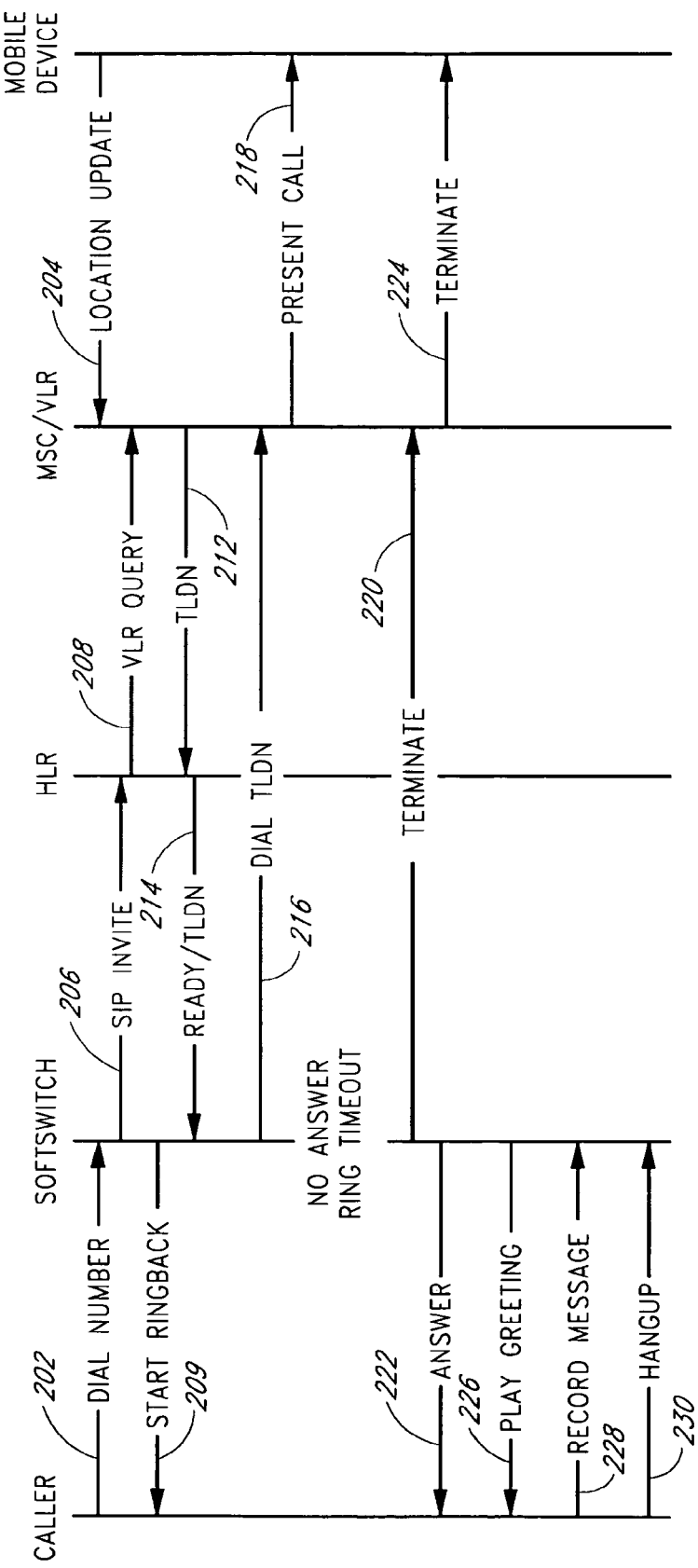
FIG. 2 illustrates an example call process for an unanswered call.

If, during the period between receiving the mobile device status from the HLR and attempting to deliver the call, the status of the mobile device changes (e.g., the subscriber initiates a call from the mobile device, turns the phone off, or goes out of range), the softswitch prompts the caller to record a message similar to the scenario illustrated in FIG. 2.

FIG. 2 illustrates an example call process for an unanswered call. In this example, in the MVNE HLR, forwarding on busy and no answer is disabled for subscribers with the mobile access address service so that the softswitch can handle voice mail for the subscriber.

At state 202, a caller (via a caller telephonic device) dials a mobile access address associated with a subscriber's mobile device and the caller's call reaches a softswitch. At state 204, a location update for the mobile device is performed by the MSC/VLR. At state 206, the softswitch transmits a SIP invite to the HLR. At state 208, the HLR transmits a VLR query to the MSC/VLR. At state 209, the softswitch initiates a ringback to the caller telephone. At state 212, the MSC/VLR returns the TLDN to the HLR for use in routing the call to the mobile device. At state 214, the HLR returns the TLDN and the status of Ready to the softswitch. At state 216, the softswitch "dials" the TLDN via SS7, SIP, or other protocol. The PSTN utilizes the TLDN to route the call to the MSC serving the subscriber's mobile device. The MSC uses the TLDN to consult its VLR for the current location of the mobile device so that it can route the call to the base station serving the mobile device.

At state 218, the base station presents the call to the mobile device. In this example, the wireless device is not answered, and at state 220, after a predetermined amount of time or number of rings, a timeout condition occurs, and the softswitch designates the call unanswered, and at state 224, the call to the mobile device is terminated. At state 222, the softswitch answers the call. At state 226, the softswitch plays a greeting to the caller which prompts the caller to leave a message. At state 228, the caller provides a verbal message which is recorded by the softswitch and stored in voicemail for later retrieval by the subscriber. At state 230, the softswitch terminates the inbound call from the caller.

Figure 3:
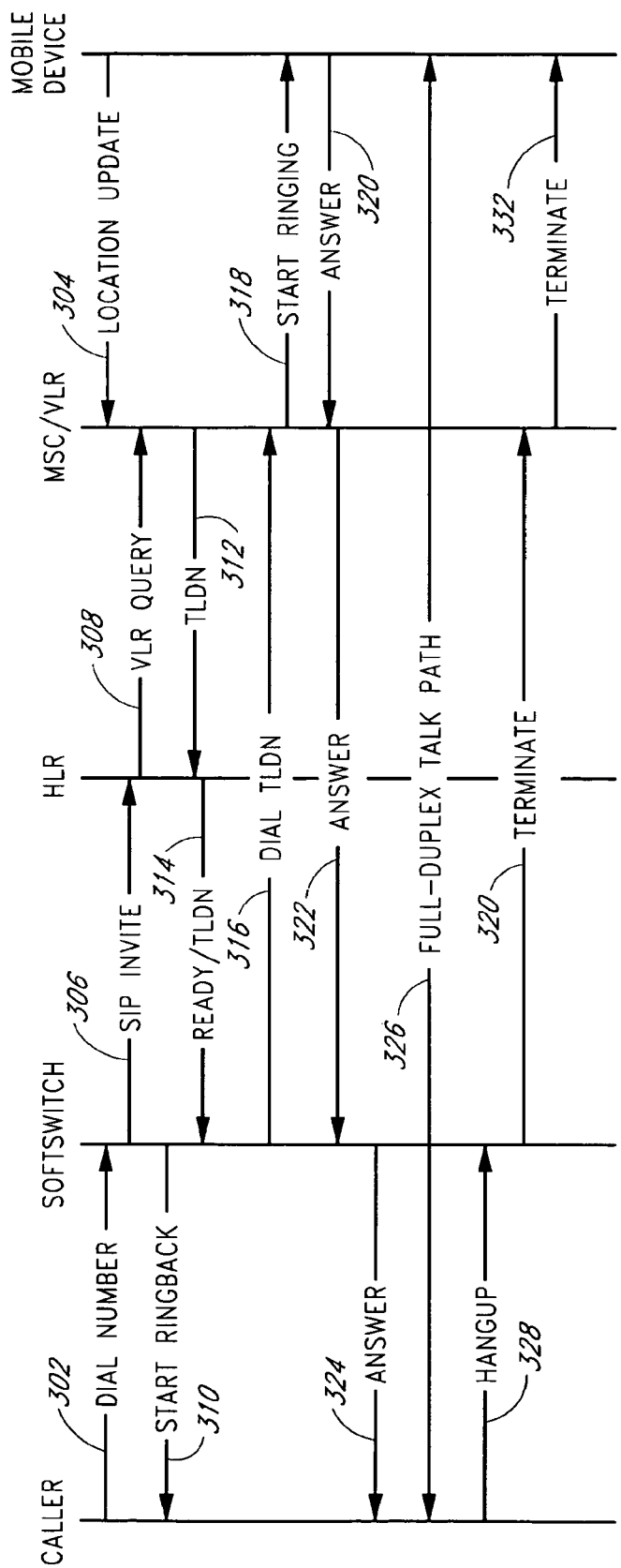
FIG. 3 illustrates an example call process for an answered call.

FIG. 3 illustrates example call handling for the scenario where the mobile device is answered and mobile call screening is disabled. At state 302, a caller (via a caller telephonic device) dials a mobile access address associated with a subscriber's mobile device, and the caller's call reaches a softswitch. At state 304, a location update for the mobile device is performed by the MSC/VLR. At state 306, the softswitch transmits a SIP invite to the HLR. At state 308, the HLR transmits a VLR query to the MSC/VLR. At state 310, the softswitch initiates a ringback to the caller telephone. At state 312, in response to the query, the MSC/VLR returns the TLDN to the HLR for use in routing the call to the mobile device. At state 314, the HLR returns the TLDN and the status of Ready to the softswitch. At state 316, the softswitch "dials" the TLDN via SS7, SIP, ISDN-PRI, or other protocol, to place an outcall to the mobile device. The PSTN utilizes the TLDN to route the call to the MSC serving the subscriber's mobile device. The MSC uses the TLDN to consult its VLR for the current location of the mobile device so that it can route the call to the base station serving the mobile device.

At state 318, the base station associated with the MSC/VLR rings the mobile device. At state 320, the subscriber answers the mobile device. At state 322, an Answer status is returned from the MSC/VLR to the softswitch, and at state 324, the softswitch answers the inbound call from the caller. The caller call and the outcall are bridged, and because call screening is not enabled, at state 326, a full duplex talk path is automatically established between the caller and the wireless device. At state 328, the caller hangs up. At state 330, the softswitch sends a terminate indication to the MSC/VLR, and at state 332 the call is terminated at the mobile device. If the subscriber has Prepaid or Postpaid service, the softswitch updates the subscriber's usage records in its database when the call terminates.

Figure 4:
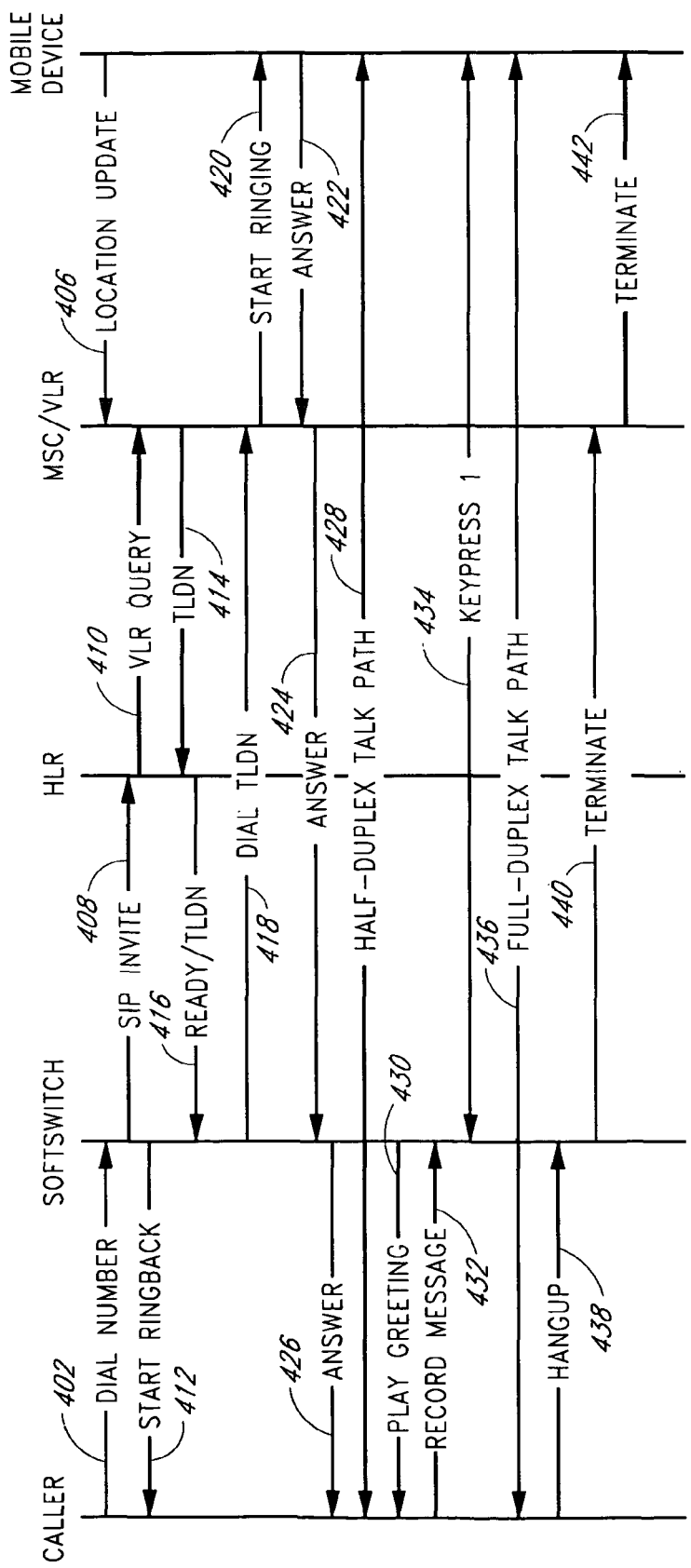
FIG. 4 illustrates an example call screening process.

FIG. 4 illustrates an example call screening process. In this example, the mobile device is answered and mobile call screening is enabled. The subscriber instructs the softswitch to end call screening and to connect the subscriber to the caller in full duplex mode (e.g., by pressing the 1 key to end screening and take the call).

At state 402, a caller (via a caller telephonic device) dials a mobile access address associated with a subscriber's mobile device and the caller's call reaches a softswitch. At state 406, a location update for the mobile device is performed by the MSC/VLR. At state 408, the softswitch transmits a SIP invite to the HLR. At state 410, the HLR transmits a VLR query to the MSC/VLR. At state 412, the softswitch initiates a ringback to the caller telephone. At state 414, the MSC/VLR returns the TLDN to the HLR for use in routing the call to the mobile device. At state 416, the HLR returns the TLDN and the status of Ready to the softswitch. At state 418, the softswitch "dials" the TLDN to place an outcall to the mobile device. The PSTN utilizes the TLDN to route the call to the MSC serving the subscriber's mobile device. The MSC uses the TLDN to consult its VLR for the current location of the mobile device so that it can route the call to the base station serving the mobile device.

At state 420, the base station associated with the MSC/VLR rings the mobile device. At state 422, the subscriber answers the mobile device. At state 424, an Answer status is returned from the MSC/VLR to the softswitch, and at state 426, the softswitch answers the inbound call from the caller. The caller call and the softswitch outcall are bridged. Because call screening is enabled, at state 428, a half duplex talk path is automatically established between the caller and the wireless device so that the subscriber can hear a message left by the caller, and the caller cannot hear the called party.

At state 430, the softswitch plays a message to the caller asking the caller to leave a message. At state 432, the softswitch records a message from the caller. At state 434, the subscriber activates a control (e.g., presses the 1 key on the mobile device) to indicate that the subscriber wants to accept the call. At state 436, the softswitch establishes a full duplex communication path.

At state 438, the caller hangs up. At state 440, the softswitch sends a terminate indication to the MSC/VLR, and at state 442 the call is terminated at the mobile device. If the subscriber has Prepaid or Postpaid service, the softswitch updates the subscriber's usage records in its database when the call terminates.

Figure 5:
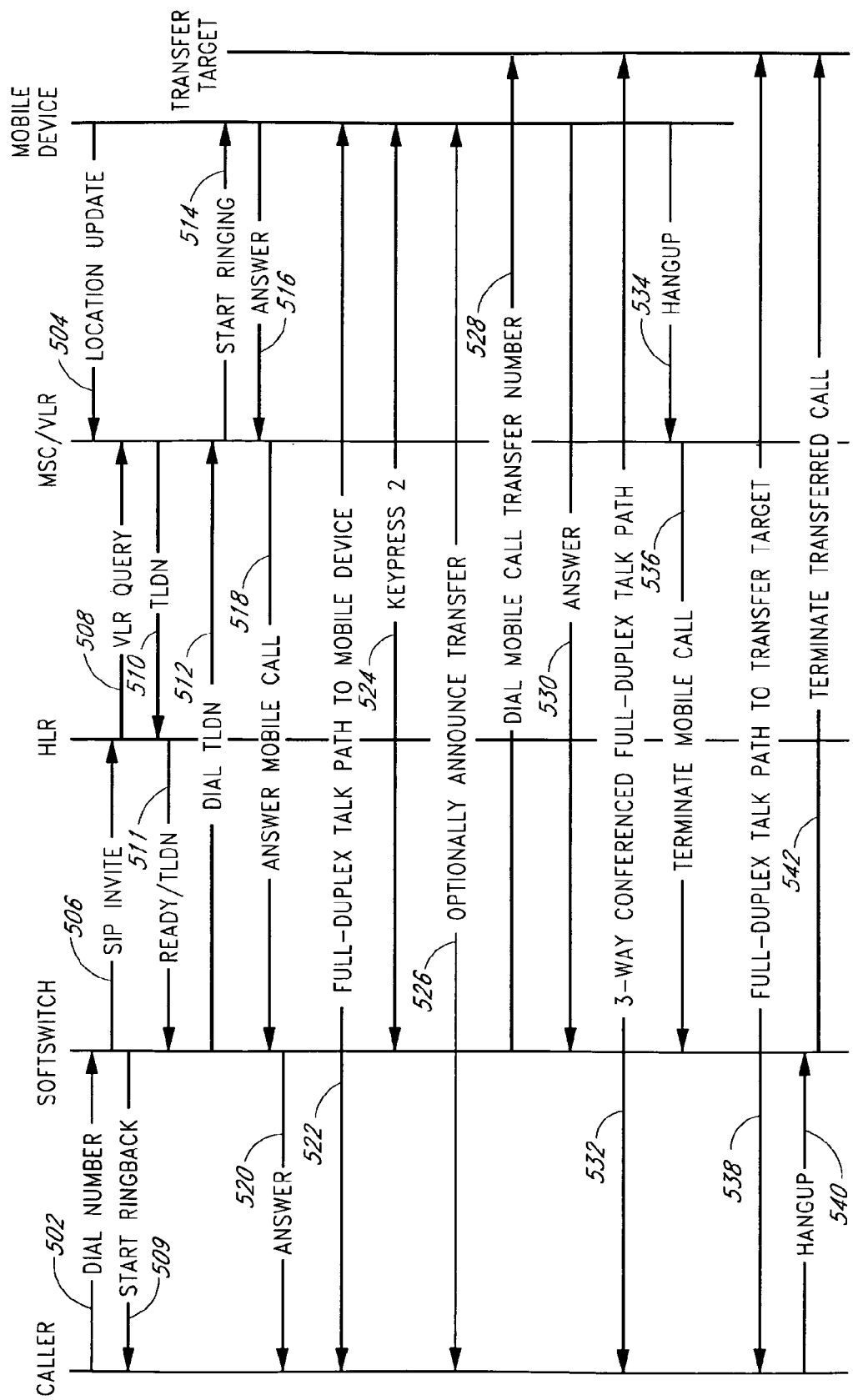
FIG. 5 illustrates an example call transfer process.

FIG. 5 illustrates an example call transfer process. In this example, the mobile device is answered and the subscriber provides a call transfer instruction to transfer the call to a mobile call transfer number, assuming one is configured. The subscriber can hang up the mobile device after providing the transfer instruction, and if that leg of the call is not terminated before the transferred call leg is established, the three call legs are conferenced together. A party associated with the legs can hang up without affecting the communication path between the other two terminals.

If, during a call transfer, the softswitch detects that the called number is busy, not answered, or answered by voice mail or an answering machine, the softswitch optionally announces to the remaining call participants that the transfer failed.

If the Mobile Locator feature is enabled and multiple Mobile Call Transfer Numbers are configured, the geographic location of the subscriber's mobile device, if available, is compared to that of each number to determine whether the device is in its proximity. If there is a match, the call is transferred to that number; otherwise all of the Mobile Call Transfer Numbers are optionally called simultaneously and conferenced together as they are answered.

Referring to FIG. 5, at state 502, a caller (via a caller telephonic device) dials a mobile access address associated with a subscriber's mobile device and the caller's call reaches a softswitch. At state 504, a location update for the mobile device is performed by the MSC/VLR. At state 506, the softswitch transmits a SIP invite to the HLR. At state 508, the HLR transmits a VLR query to the MSC/VLR. At state 509, the softswitch initiates a ringback to the caller telephone. At state 510, the MSC/VLR returns the TLDN to the HLR for use in routing the call to the mobile device. At state 511, the HLR returns the TLDN and the status of Ready to the softswitch. At state 512, the softswitch "dials" the TLDN to place an outcall to the mobile phone. The PSTN utilizes the TLDN to route the call to the MSC serving the subscriber's mobile device. The MSC uses the TLDN to consult its VLR for the current location of the mobile device so that it can route the call to the base station serving the mobile device.

At state 514, the base station associated with the MSC/VLR rings the mobile device. At state 516, the subscriber answers the mobile device. At state 518, an Answer status is returned from the MSC/VLR to the softswitch, and at state 520, the softswitch answers the inbound call from the caller. At state 522, a full duplex talk path is automatically established between the caller and the wireless device. At state 524, the subscriber provides a call transfer instruction (e.g., by pressing the 2 key on the mobile device).

At state 526, the softswitch transmits a voice message to the caller and the subscriber, informing them that a call transfer is about to take place. At state 528, in response to the transfer instruction, the softswitch dials a mobile call transfer number associated with a transfer target device. At state 530, the subscriber answers the device associated with the mobile call transfer number. At state 532, the softswitch establishes a 3-way conferenced full-duplex talk path between the caller, the mobile device, and the transfer target device. At state 534, the subscriber hangs up the mobile device. At state 536, the MSC/VLR sends a call terminate message to the softswitch. At state 538, a full-duplex path between the caller and the transfer target is maintained even though the mobile device has hung up. At state 540, the caller hangs up. At state 542, the softswitch terminates the transferred call to the transfer target device. If the subscriber has Prepaid or Postpaid service, the softswitch updates the subscriber's usage records in its database when the call terminates.

Figure 6:
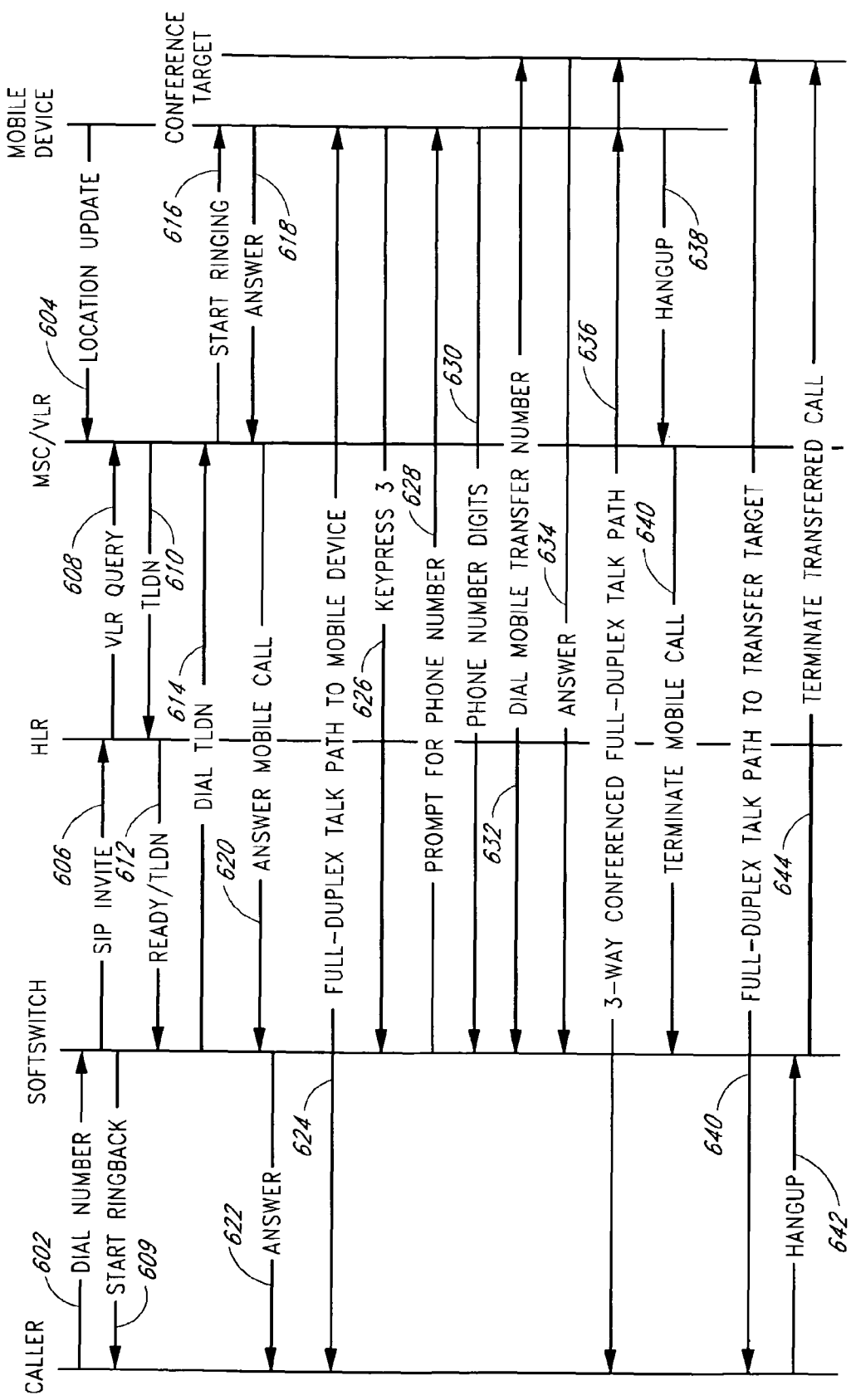
FIG. 6 illustrates an example call conferencing process.

FIG. 6 illustrates an example call conferencing process. In this example, the subscriber answers the mobile device, and instructs the softswitch (e.g., via a key press of 3 on the mobile device key pad) to conference in another party. Optionally, if conferencing is enabled, a maximum number of participants allowed in a conference is controlled in the feature package for the subscriber. Thus, for example, some subscribers may be restricted to a 3-way conference, while some subscribers may be allowed up to a 6-way conference. Optionally, all the subscribers may be limited to a certain number of conference legs (e.g., a 6-way conference).

Optionally, the conference will not terminate just because one member of the conference hangs up. Optionally, the conference will be maintained as long as two participants remain on the call/until only one member remains on the call. Optionally, if the conference initiator/subscriber hangs up, the conference will terminate even if two or more participants still remain.

If during an attempt to add a person to the conference, the softswitch detects that the called number is busy, not answered, or answered by voice mail or an answering machine, the softswitch provides an audible and/or visual announcement to the conference attendees that the requested person is not available.

Referring to FIG. 6, at state 602, a caller (via a caller telephonic device) dials a mobile access address associated with a subscriber's mobile device and the caller's call reaches a softswitch. At state 604, a location update for the mobile device is performed by the MSC/VLR. At state 606, the softswitch transmits a SIP invite to the HLR. At state 608, the HLR transmits a VLR query to the MSC/VLR. At state 609, the softswitch initiates a ringback to the caller telephone. At state 610, the MSC/VLR returns the TLDN to the HLR for use in routing the call to the mobile device. At state 612, the HLR returns the TLDN and the status of Ready to the softswitch. At state 614, the softswitch "dials" the TLDN to place an outcall to the mobile device. The PSTN utilizes the TLDN to route the call to the MSC serving the subscriber's mobile device. The MSC uses the TLDN to consult its VLR for the current location of the mobile device so that it can route the call to the base station serving the mobile device.

At state 616, the base station associated with the MSC/VLR rings the mobile device. At state 618, the subscriber answers the mobile device. At state 620, an Answer status is returned from the MSC/VLR to the softswitch, and at state 622, the softswitch answers the inbound call from the caller. The caller call and the outcall from the softswitch are bridged. At state 624, a full duplex talk path is automatically established between the caller and the wireless device so that the caller and subscriber can converse. At state 626, the subscriber provides a call conference instruction (e.g., by pressing the 3 key on the mobile device).

At state 628, the softswitch transmits a voice prompt to the subscriber asking for the phone address/number to which the third leg of the conference is to be directed. At state 630, the subscriber enters the desired phone number (e.g., by pressing corresponding mobile device key pad keys, by selecting a phone number for a contact database on the mobile device, by speaking the phone number, by speaking an identifier associated with the phone number, such as a name, etc.), such as a mobile transfer number. At state 632, in response to the conference instruction, the softswitch dials the specified phone number. At state 634, the call is answered at the conference target. At state 636, the softswitch establishes a 3-way conferenced full-duplex talk path to enable the three parties to converse, wherein the caller, the mobile device, and the conferenced target are conferenced together. At state 638, the subscriber hangs up the mobile device.

In response, at state 640, the MSC/VLR sends a mobile call terminate message to the softswitch. At state 640, a full-duplex path between the caller and the transfer target is maintained. At state 642, the caller hangs up. At state 644, the softswitch terminates the call to the conference target. If the subscriber has Prepaid or Postpaid service, the softswitch updates the subscriber's usage records in its database when the call terminates.

Figure 7:
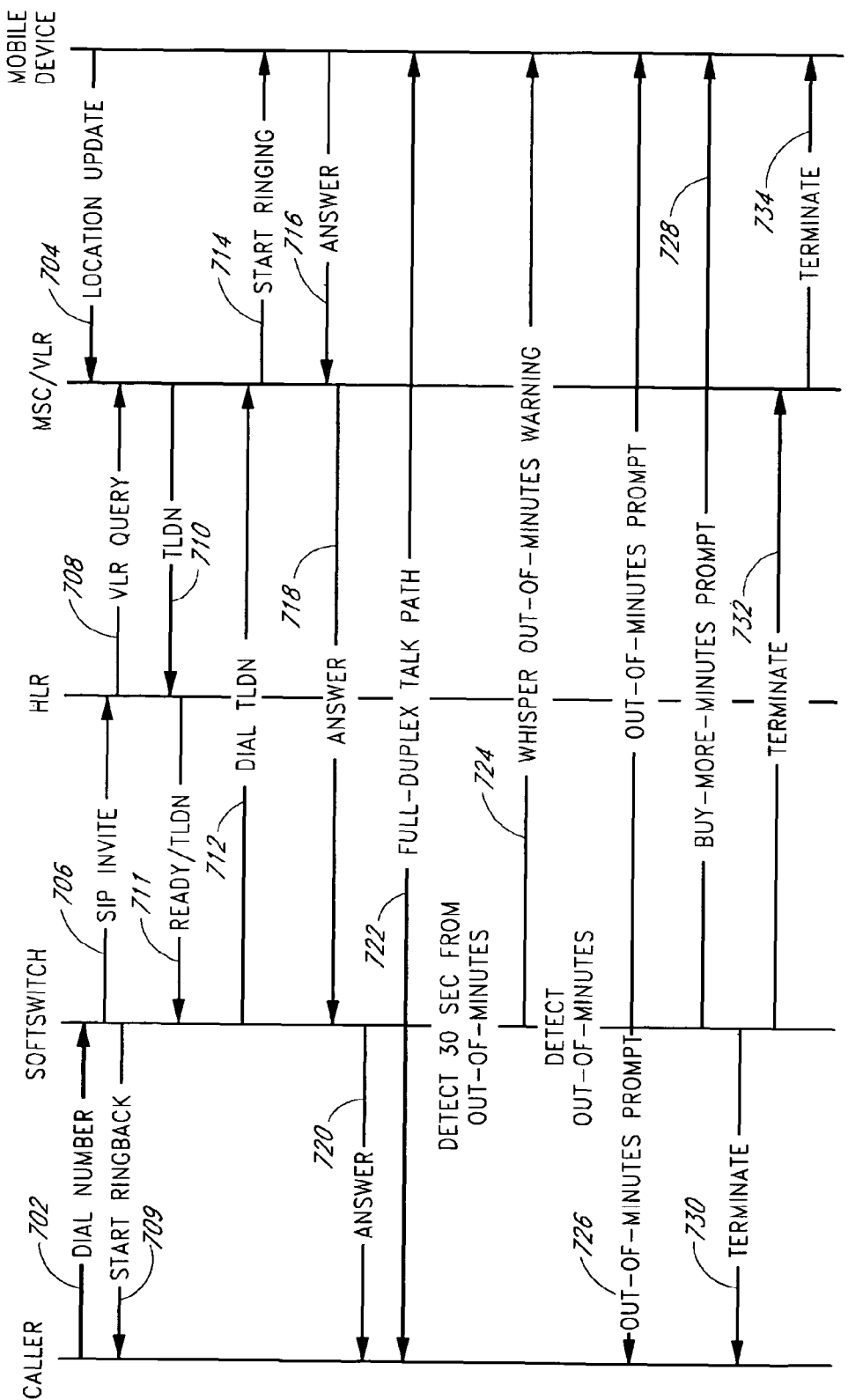
FIG. 7 illustrates an example call process wherein a call participant exhausts the participant's associated call minutes.

FIG. 7 illustrates an example call process wherein a call participant exhausts the participant's associated call minutes (e.g., prepaid call minutes associated with the subscriber's mobile device, a calling card, an access code, etc.). In this example, a warning (e.g., an audible warning, such as a beep or a verbal message that only the subscriber can hear and that the other call participants cannot hear, wherein optionally the warning is played at a relatively lower volume as compared to typical audible message played by the softswitch) when a specified/predetermined amount of call time remains (e.g., 30 seconds, 60 seconds, or other time period). The call is terminated when the minutes/prepaid calling time fully expire, but optionally, first a prompt is played to the call participants indicating that the call is being terminated.

Referring to FIG. 7, at state 702, a caller (via a caller telephonic device) dials a mobile access address associated with a subscriber's mobile device and the caller's call reaches a softswitch. At state 704, a location update for the mobile device is performed by the MSC/VLR. At state 706, the softswitch transmits a SIP invite to the HLR. At state 708, the HLR transmits a VLR query to the MSC/VLR. At state 709, the softswitch initiates a ringback to the caller telephone. At state 710, the MSC/VLR returns the TLDN to the HLR for use in routing the call to the mobile device. At state 711, the HLR returns the TLDN and the status of Ready to the softswitch. At state 712, the softswitch "dials" the TLDN via SS7, SIP, or other protocol to place an outcall to the mobile device. The PSTN utilizes the TLDN to route the call to the MSC serving the subscriber's mobile device. The MSC uses the TLDN to consult its VLR for the current location of the mobile device so that it can route the call to the base station serving the mobile device.

At state 714, the base station associated with the MSC/VLR rings the mobile device. At state 716, the subscriber answers the mobile device. At state 718, an Answer status is returned from the MSC/VLR to the softswitch, and at state 720, the softswitch answers the inbound call from the caller. Because call screening is not enabled, the inbound call and the outcall are bridged at state 722, and a full duplex talk path is automatically established between the caller and the wireless device. During the connection time, a determination is made that a first time threshold (e.g., 30 minutes) has been reached prior to the complete usage of the call time remaining. In response, at state 724, the softswitch plays or whispers (mixes incoming audio signal/called party speech with lower level audio prompt) an out-of-time warning (e.g., "You have only 30 seconds of call time remaining" or a beep tone) via the talk path to the mobile device, wherein the other call participant(s) optionally are prevented from hearing the warning.

At state 726, the softswitch plays an "out of call time" warning prompt, which optionally states that the call time has been used up and/or that the call is about to be terminated. At state 728, the softswitch plays a prompt asking the subscriber if the subscriber wants to purchase additional call time. The message can specify how the subscriber can provide a response (e.g., press 5 on the telephonic device to purchase an additional 1 hour of call time, press 6 to purchase an additional 2 hours of call time, and press 7 to decline to purchase additional call time; or provide a verbal command indicating how much call time the subscriber wants to purchase). Optionally, if the subscriber does not respond to the prompt, the softswitch interprets the lack of response as indicating that the subscriber does not want to purchase additional call time during the present call.

In this example, the subscriber fails to respond to the purchase additional call time prompt within a predetermined window of time (e.g., within 5 seconds after the end of the prompt), and so at state 730, the softswitch terminates the call to the caller. At state 732, the softswitch sends a terminate indication to the MSC/VLR, and at state 734 the call is terminated at the mobile device. The softswitch updates the subscriber's usage records in its database when the call terminates.

Figure 8:
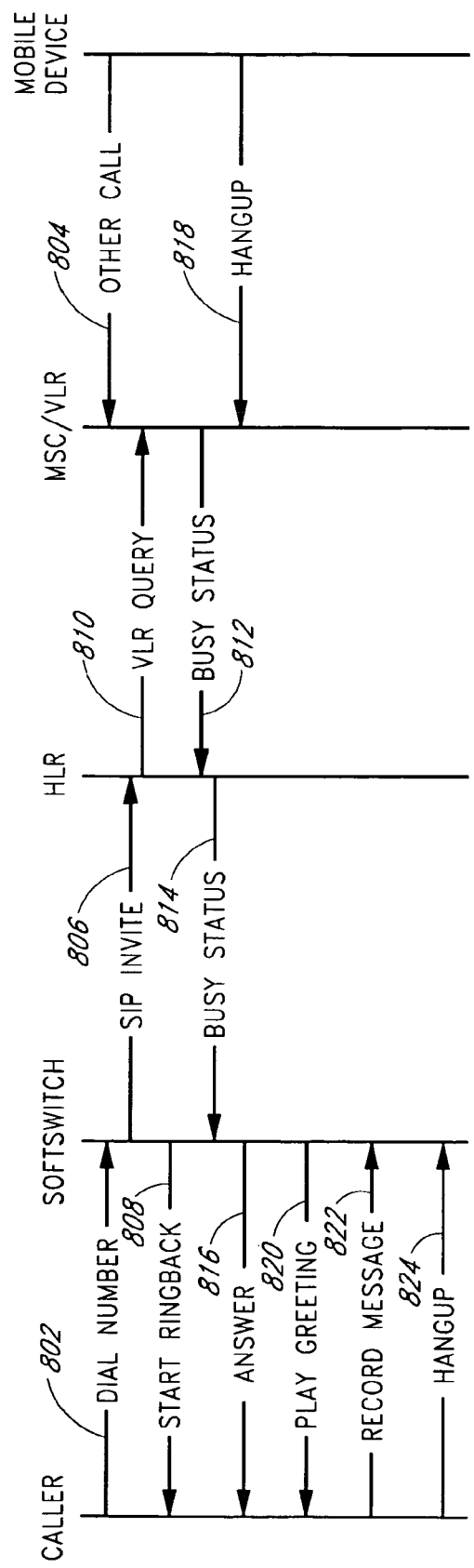
FIG. 8 illustrates an example call busy call handling process.

FIG. 8 illustrates an example call busy call handling process. If the HLR indicates that the mobile device is busy, a message is taken, as illustrated in FIG. 8. However, if Call Waiting is enabled, as is often the case for mobile devices, optionally an attempt is made to deliver the call per the scenario illustrated in FIG. 3, even though another call is in progress. With Call Waiting enabled there are relatively few boundary conditions in which the mobile device is considered "busy", (e.g., a call is being initiated from the mobile device or another call is presented while a call waiting condition is already in progress). In such "busy" conditions, the example call processing scenario illustrated in FIG. 8 is optionally performed.

Referring to FIG. 8, at state 802, a caller (via a caller telephonic device) dials a mobile access address associated with a subscriber's mobile device and the caller's call reaches a softswitch. At state 804, the mobile device is initiating a call (and hence is in a Busy state with respect to an incoming call). At state 806, the softswitch transmits a SIP invite to the HLR. At state 808, the softswitch initiates a ringback to the caller telephone. At state 810, the HLR transmits a VLR query to the MSC/VLR. At state 812, the VLR returns a Busy status to the HLR. At state 814, the HLR transmits the Busy status to the caller.

At state 816, the softswitch answers the inbound call from the caller. At state 818, the other call is terminated at the mobile device (e.g., the subscriber hangs up). At state 820, the softswitch plays a message to the caller asking the caller to leave a message. At state 822, the softswitch records a message from the caller for later retrieval by/transmission to the subscriber. At state 824, the caller hangs up and the caller's call is terminated.

Figure 9:
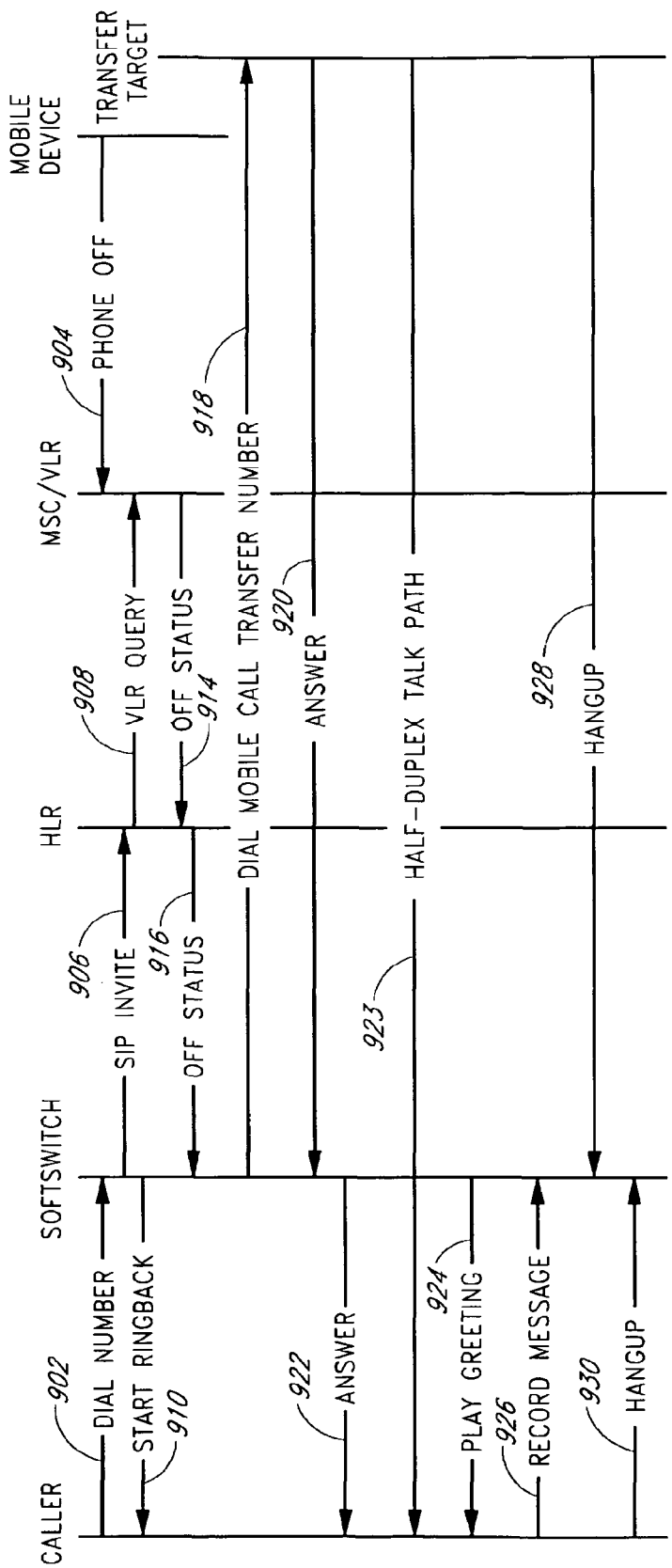
FIG. 9 illustrates an example call handling process where a called terminal is unavailable.

FIG. 9 illustrates an example call handling process where a called terminal is unavailable and call screening is enabled. For example, if the HLR indicates that the mobile device is Off, Out of Range, or otherwise unavailable, optionally an attempt is made to deliver the call to the configured mobile call transfer number (which can be another mobile device, a landline phone, a VoIP, or other destination). If the transfer fails, if it is not answered, or if no mobile call transfer number is configured, a message from the caller is recorded by the softswitch. The subscriber can then later access and playback the message. Optionally, an answer detection process is performed by the softswitch when placing an outcall that includes determining if a machine has answered the call (e.g., answering machine or voice mail), which is also optionally treated as a no answer condition.

Referring to FIG. 9, at state 902, a caller (via a caller telephonic device) dials a mobile access address associated with a subscriber's mobile device and the caller's call reaches a softswitch. At state 904, a determination is by the MSC/VLR that the mobile device is off (or unavailable). At state 906, the softswitch transmits a SIP invite to the HLR. At state 908, the HLR transmits a VLR query to the MSC/VLR. At state 910, the softswitch initiates a ringback to the caller telephone. At state 414, the MSC/VLR returns the Off status to the HLR. At state 916, the HLR returns the status of Off to the softswitch. At state 918, the softswitch "dials" the mobile call transfer number associated with the subscriber to place an outcall to the transfer target. At state 920, the transfer target associated with the transfer number is answered, and at state 922 the call between the caller and the softswitch is answered.

The inbound call and the outbound call are bridged. Because call screening is enabled, at state 923, a half duplex talk path is automatically established between the caller and the transfer target so that the subscriber can hear a message left by the caller, and the caller cannot hear the called party. At state 924, the softswitch plays a message to the caller asking the caller to leave a message. At state 926, the softswitch records a message from the caller. At state 928, the transfer target terminates the call (e.g., hangs up) between the transfer target and the softswitch. At state 930, the caller hangs up.

Figure 10:
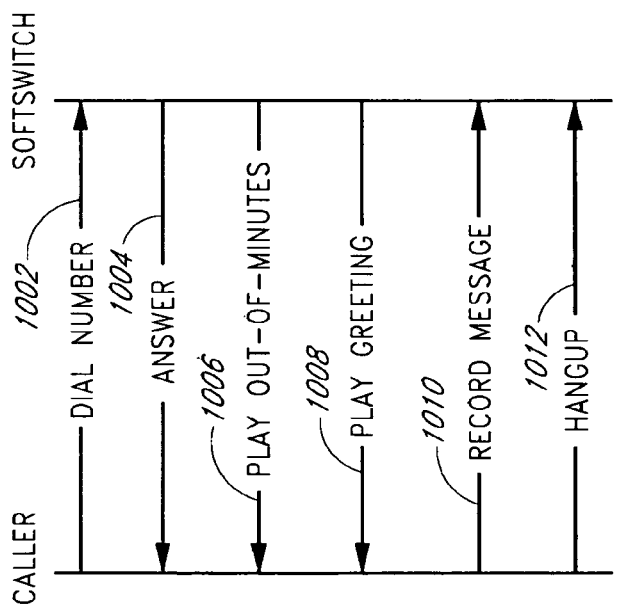
FIG. 10 illustrates another example call process wherein a call participant exhausts the participant's associated call minutes.

FIG. 10 illustrates another example call process wherein a call participant exhausts the participant's associated call minutes. If the subscriber has prepaid calling (e.g., where the subscriber has paid for a certain amount of call time, such as a certain number of minutes, prior to using the paid for call time), and there is less than a configurable predetermined amount of call time remaining in the account (e.g. one minute of call time), the caller is played a prompt informing them of the out-of-minutes condition or otherwise indicating that the call to the subscriber's terminal will not be completed, and a message is recorded as illustrated in FIG. 10.

At state 1002, the caller dials the phone number associated with the subscriber. At state 1004, the softswitch determines that an out of minutes condition is present (where the subscriber has less then a certain amount of prepaid call time remaining), and answers the call. At state 1006, the softswitch plays an "out of minutes" notification to the caller that indicates that the subscriber is out of call time or that indicates that the call to the subscriber's terminal cannot be completed (without giving a reason), and that indicates that the caller will be able to leave a message. At state 1008, the softswitch transmits a greeting to the caller asking the caller to leave a message. At state 1010, the message, if any, being left by the caller is recorded by the softswitch for later access by subscriber. At state 1012, the caller hangs up, and the call is terminated.

With respect to outcalls from the mobile device, when a phone call is placed via the mobile device, the caller ID field associated with that call is optionally populated with the subscriber's mobile access address. As similarly discussed above, in an example embodiment, outgoing calls do not route through the softswitch but optionally the MVNE does forward a call detail record to the softswitch for calls so that call time (e.g., minute) usage can be tracked.

If a subscriber has a prepaid account, the when prepaid call time (e.g., prepaid minutes) is exhausted, the softswitch optionally informs the MVNE HLR so that further outgoing call attempts from the mobile device get rejected (although certain call may still be allowed, such as calls placed to the softswitch or emergency calls to 911). Optionally, there is no announcement of remaining minutes by the softswitch when an outgoing call is initiated from the mobile device, but there is a call rejection announcement when the account is out of minutes. Optionally detecting minute depletion is performed while an outgoing call is in progress.

Figure 11:
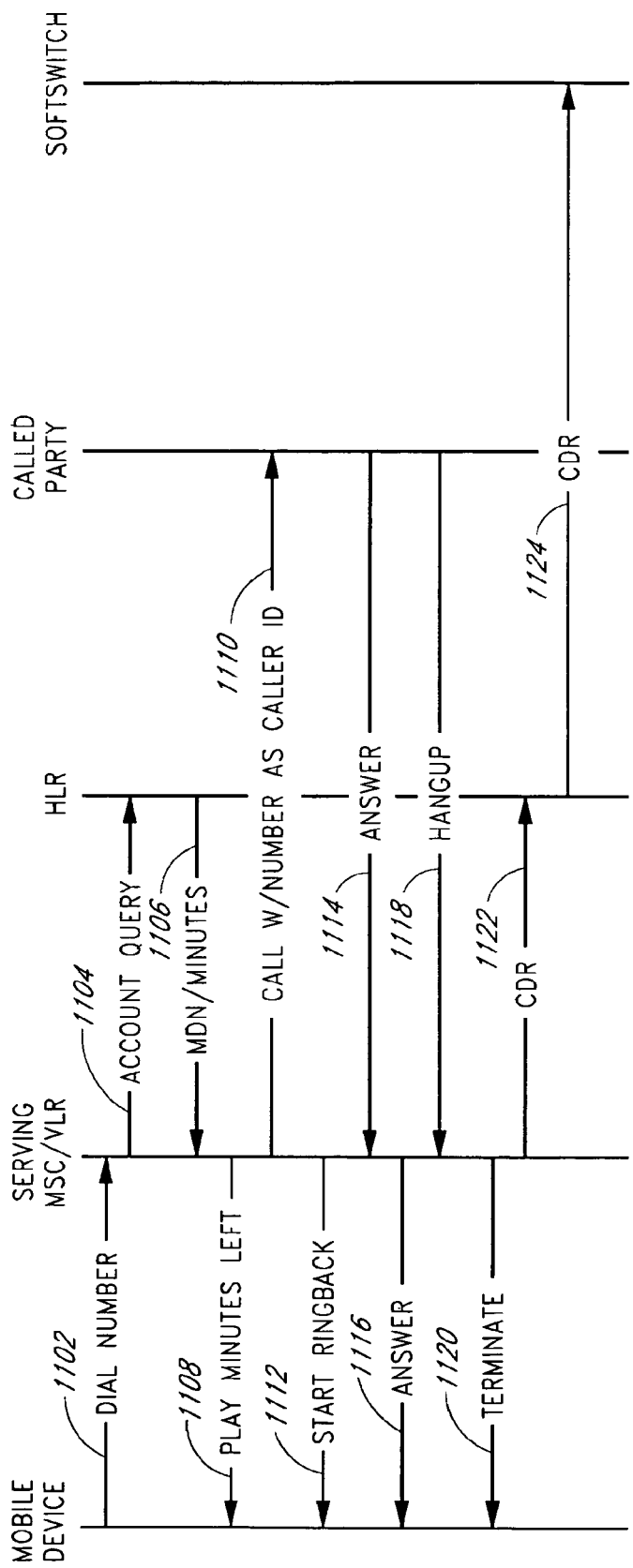
FIG. 11 illustrates an example call handling process where an outgoing call is placed from a prepaid phone terminal.

FIG. 11 illustrates an example call handling process where an outgoing call is placed from a prepaid phone terminal to a called party. At state 1102, the subscriber dials a called party phone number via the mobile device, which is received by the servicing MSC/VLR. At state 1104, the MSC/VLR transmits an account query to the HLR. At state 1106, the MVNE HLR transmits the remaining prepaid call time (e.g., the remaining minutes) to the MSC/VLR. At state 1108, the MSC/VLR informs the subscriber via the mobile device of the remaining call time.

At state 1110, the MSC/VLR provides the mobile access address in the call signaling caller ID field associated with the call to the called party. At state 1112, the MSC/VLR starts the ringback to the mobile device. At state 1114, the called party answers the call via the called party telephonic device. At state 1116, the MSC/VLR causes call completion between mobile device and the caller's telephonic device. At state 1118, the called party hangs up. At state 1120 the call connection to the mobile device is terminated. At state 1122, a call detail record (CDR) associated with the call is transmitted by the MSC/VLR to the HLR. At state 1122, the HLR sends the call detail record to the softswitch.

An outgoing call for a Postpaid or Flat Rate subscriber differs from the above process in that there is no minutes-left announcement.

Previously described are example methods of routing incoming calls to a mobile access address service. These calls route through the softswitch, with handling at least partly determined by feature settings and the current device status. Although an optional embodiment uses HLR integration, there may be situations in which HLR integration is not possible and/or desirable. In this case, features, such as Follow Me Home (wherein an incoming call is automatically transferred to a mobile call transfer number associated with the subscriber when the subscriber's mobile device is off or out-of-range) may optionally still be provided to the subscriber. For example, certain call handling features of the softswitch can be used to provide such functionality.

Figure 12:
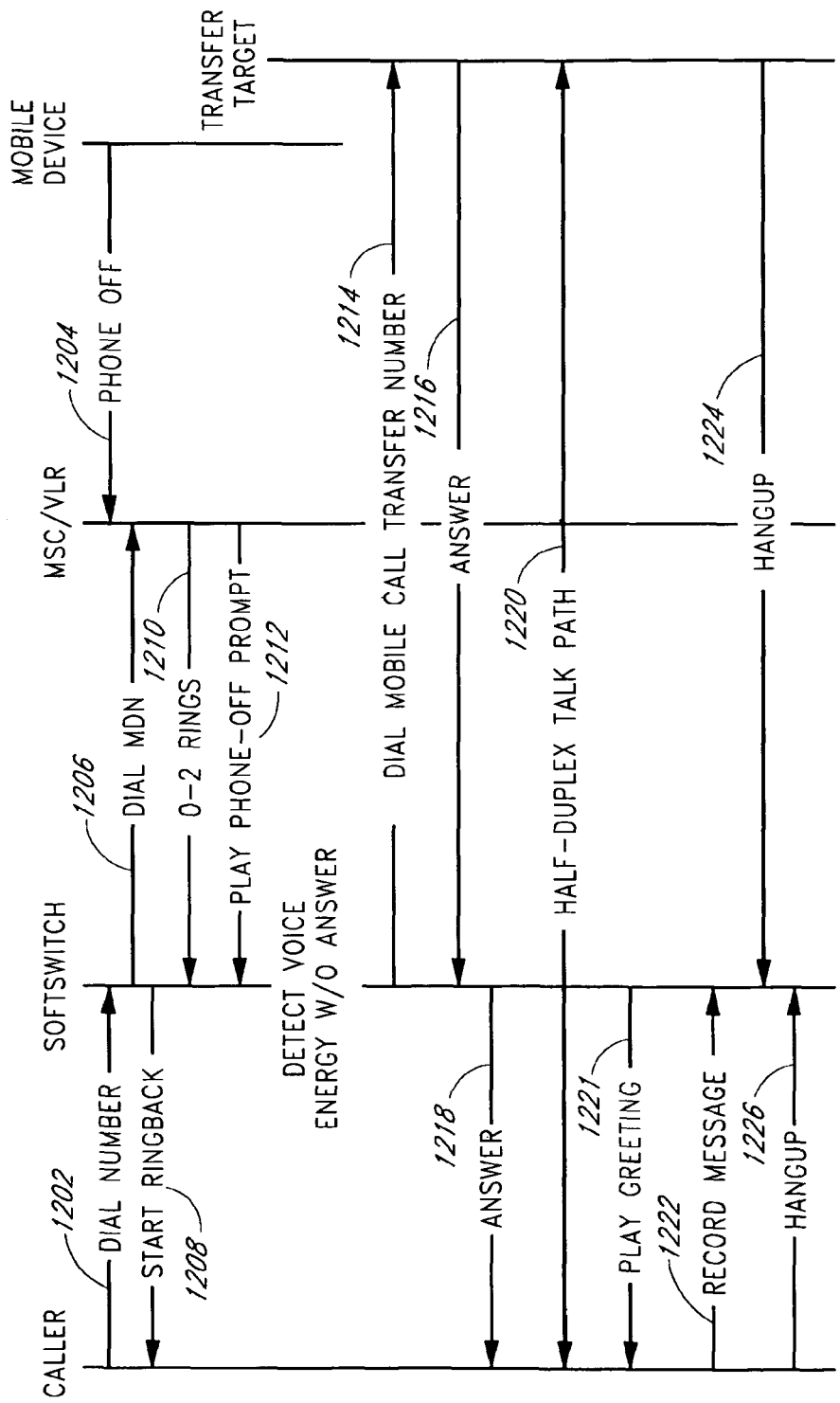
FIG. 12 illustrates another example call handling process where a called terminal is unavailable.

The example call scenario illustrated in FIG. 12 depicts status determination of a mobile device as being off/unavailable without HLR integration. This enables the softswitch to still deliver the call to the mobile call transfer number to provide Follow Me Home functionality. In this example, the mobile device has an assigned mobile access address, by which it is known to callers, and an internal Mobile Device Number (MDN), by which the softswitch connects to it in the wireless network. In this example, the mobile device is configured at the wireless carrier as having no forwarding and no voice mail service.

If the mobile device is off, after the softswitch dials the MDN, it may receive ringback from the MSC and then, without the MSC answering the call, the softswitch detects voice energy as a result of the MSC playing a phone-off prompt (normally to the caller but in this case, to the softswitch and not the caller since the softswitch has not yet connected this call leg to the caller). At this point, the softswitch knows that the mobile device is off or out-of-range, and so the softswitch dials a mobile call transfer number associated with an alternate phone of the subscriber to deliver the call to the alternate phone.

At state 1202, the caller dials the mobile access address. At state 1204, the MSC/VLR receives an indication that the subscriber's mobile device is off/unavailable. At state 1206, the softswitch dials the MDN associated with the mobile device. At state 1208, the softswitch begins the ringback to the caller telephonic device. At state 1210, a certain number of rings (e.g., 0-2) occur. At state 1212, the MSC/VLR provides an audible phone-off status prompt. The softswitch detects the voice energy associated with the prompt and the lack of a status of Answer from the MSC/VLR. At least partly in response, at state 1214, the softswitch dials the mobile call transfer number associated with a transfer target. At state 1216, the transfer target (e.g., another telephonic device) is answered. At state 1218, the call to the transfer target is bridged with the call from the caller. Because call screening is enabled, at state 1220, a half duplex talk path is automatically established between the caller and the transfer target so that the subscriber can hear a message left by the caller, and the caller cannot hear the called party.

At state 1221, the softswitch plays a message to the caller asking the caller to leave a message. At state 1222, the softswitch records a message from the caller. At state 1124, the transfer target hangs up, and at state 1226 the caller hangs up.

With respect to SMS messaging, as previously discuss, an SMS enabled mobile device can receive SMS messages originated from another mobile device. Such messages are optionally addressed directly to the device's mobile access address. A mobile device can also receive SMS messages that originate from the Internet. By way of example, such messages are addressed to <mobile access address>@<domain name>.<top level domain>. Incoming SMS messages (optionally, all SMS messages) for the mobile device route through the corresponding MVNE SMS Gateway. SMS messages (optionally, all SMS messages) originated from the mobile device optionally have the device's mobile access address as the sending address. The MVNE SMS Gateway handles routing for the outgoing SMS messages to other wireless carriers as needed.

For message accounting, the MVNE SMS Gateway optionally informs the softswitch or softswitch operator of each SMS message sent or received so that usage can be tracked for the account.

As discussed above, in certain situations, a caller may be prompted to record a message. Optionally, the prompt used is configured by the subscriber. For example, the subscriber may be provided with the option of selecting from the following prompt-types:

Standard System Greeting—generic system greeting prompt

Spoken Name Greeting—generic system greeting prompt with embedded name recorded by the subscriber Personal Greeting—prompt entirely recorded by the subscriber Optionally, the system prompts used when interacting with the caller can be in either a male or a female voice as configured by the subscriber.

If mobile call screening is enabled for a given call, the subscriber is able to listen to the caller while the message is being recorded. The subscriber can then interrupt the recording at a desired point to take the call. In this case, the message recorded up to that point is optionally stored and noted at the end as having ended because the call was taken.

When a message recording ends, a notification is sent to the locations configured/specified by the subscriber. The subscriber can optionally specify one or more of the notification mechanisms:

Email notification to a specified address, which defaults to the email address for the subscriber's account. The subscriber can also specify that the voice message is to be attached as a file to the email notification.

SMS message to the mobile device.

Voice message icon toggled on mobile device. This icon is toggled off (or other appropriate indication) when there are no un-reviewed messages.

A phone interface (e.g., an IVR) is optionally provided via the softswitch or other system for the subscriber to call in to review messages. The mobile device is optionally configured with a speed dial of 1 (or other designated user interface) for dialing the phone interface. The phone interface is also optionally accessible by directly dialing the mobile access address from the mobile device or from another phone. Optionally, access to recorded message (e.g., for playback to the subscriber) is provided upon entry of an account password associated with the subscriber account. If access is requested from the mobile device, optionally, the subscriber does not need to enter a password to review the recorded messages.

In an example embodiment, message review begins with a count of the number of new messages and then optionally immediately begins reviewing the first new message. Messages are reviewed in first-in-first out order, last-in-last-out order, via random access, or otherwise. After playing back a given message, the subscriber is given the option of deleting or saving the message. After the subscriber has reviewed new messages, the subscriber can elect to review saved messages.

Before, during, or after message review, the subscriber can elect to perform administrative functions, including some or all of the following:

Recording spoken name

Recording greeting

Setting Mobile Call Transfer Number

As similarly discussed above, a client application executing on a subscriber computer can be used to receive, edit, and display call log data from the softswitch (e.g., a list of calls placed to/received by the subscriber, or placed by the subscriber, including phone numbers, caller or called party names, date/time of the call, an indication as to whether a call was an outbound/inbound call, the city/state of the caller/called party, type of call (e.g., voice or fax), etc.), and call alert data (e.g., for an active call, listing the caller phone number, name, city/state, and/or call status (e.g., ringing, playing greeting, recording caller message, terminating call, forwarding call, conferencing call, displaying fax)). Optionally, when a call is received, the client application plays an audible signal, such as a ring tone. The client application can display a log of recorded messages from callers, and can provide playback controls (e.g., play, fast forward, rewind) for playing back or displaying the recorded message (e.g., a voice message, a video message, a fax message, etc.) via the client computer terminal. As previously discussed, the client optionally can also be used to screen calls (e.g., wherein the softswitch streams a message being left by a caller to the client so that the called party can listen to the message in substantially real time) and to instruct the softswitch to accept calls on the host computer terminal, forward calls, refuse calls, initiate call conferencing, and to otherwise provide call handling instructions.

For example, as similarly discussed above, when a call alert message is received by the client, as part of call presentation, a ringing sound is optionally played via the client host speakers. Optionally, the incoming call is displayed in a call alert user interface for a first amount of time (e.g., a set time, such as 5 seconds, or for a user configurable period of time), and then the call appears in the associated call log.

It should be understood that certain variations and modifications of this invention would suggest themselves to one of ordinary skill in the art. The scope of the present invention is not to be limited by the illustrations or the foregoing descriptions thereof.

What is claimed is:

1. A method of connecting calls, the method comprising:
enabling a software program to be installed on a plurality of communication devices, including:
a communication device associated with a first user wherein the first user is a user of a first communication service, and
a communication device associated with a second user wherein the second user is a user of the first communication service;
facilitating, by a networked computing system, a first call connection between a caller and the first user, wherein the caller and the first user can communicate over a voice path, or a video path, or both a voice path and a video path of the first call connection;
during the first call connection, determining an availability of the second user,
wherein the availability of the second user is determined at least in part on detection of an online presence of the communication device associated with the second user having the software program installed thereon, and
wherein a contact record correlated with the second user is stored on the communication device associated with the first user;
based at least in part on a determination that the second user is unavailable, causing, at least in part, a user interface of the software program to be displayed by the communication device associated with the first user, the user interface comprising an indication that the second user is not available;
based at least in part on a determination that the second user is available, facilitating, by the networked computing system, the caller, the first user, and the second user to communicate via a bridged call connection, determining the second user has not answered the bridged call connection, and based at least in part on a no answer determination of the second user, causing, at least in part, the communication device associated with the first user to display a second user no answer condition indication.

2. The method as defined in claim 1, wherein the networked computing system comprises a softswitch.

3. The method as defined in claim 1, the method further comprising providing the first user with account details of an account of the first user with the communication service.

4. The method as defined in claim 1, wherein the plurality of communication devices comprise smart phones.

5. The method as defined in claim 1, wherein the plurality of communication devices comprises mobile devices.

6. A system comprising:

one or more computing devices including a network-based server computing device;

a network interface;

non-transitory computer readable memory that stores instructions that, when executed by the one or more processing devices, cause the system to perform operations comprising:

enabling a software program to be installed on a plurality of communication devices, including:

a communication device associated with a first user wherein the first user is a user of a first communication service;

a communication device associated with a second user wherein the second user is a user of the first communication service;

facilitating a first call connection between a caller and the first user wherein the caller and the first user can communicate over a voice path, or a video path, or both a voice path and a video path of the first call connection;

during the first call connection, determining an availability of the second user, wherein the availability of the second user is determined at least in part on detection of an online presence of the communication device associated with the second user having the software program installed thereon, and wherein a contact record correlated with the second user is stored on the communication device associated with the first user;

based at least in part on a determination that the second user is unavailable, causing, at least in part, a user interface of the software program to be displayed by the communication device associated with the first user, the user interface comprising an indication that the second user is not available; and based at least in part on a determination that the second user is available, enabling the caller, the first user, and the second user to communicate via a bridged call connection, determining the second user has not answered the bridged call connection, and based at least in part on a no answer determination of the second user, causing, at least in part, the communication device associated with the first user to display a second user no answer condition indication.

7. The system as defined in claim 6, wherein the software program comprises a telecommunication client application.

8. The system as defined in claim 6, wherein the caller is a user of the first communication service.

9. The system as defined in claim 6, wherein the second user is a plurality of users.

10. The system as defined in claim 6, wherein the number of users which can be bridged by the first user is limited.

11. The system as defined in claim 6, the operations further comprising recording the first user's connection usage subsequent to a termination of the first user's connection.

12. The system as defined in claim 6, the operations further comprising providing the first user with account details of an account of the first user with the communication service.

13. The system as defined in claim 6, wherein the plurality of communication devices comprises mobile devices.

14. A system comprising:

one or more computing devices including a network-based server computing device;

a network interface;

non-transitory computer readable memory that stores instructions that, when executed by the one or more processing devices, cause the system to perform operations comprising:

providing a software program for a communication device associated with a first user wherein the first user is a user of a first communication service;

facilitating a first call connection between a caller and the first user wherein the caller and the first user can communicate over a voice path, or a video path, or both a voice path and a video path of the first call connection;

during the first call connection, receiving an instruction from the first user to conference a second user via a selection of a contact in a contact data store of the software program on the communication device associated with the first user, wherein the second user is a user of the first communication service;

originating an outbound call connection to an address associated with the first user selected contact;

bridging the outbound call connection with the first call connection; and enabling the caller, the first user, and the second user to communicate via the bridged call connection, determining the second user has not answered the bridged call connection, and based at least in part on a no answer determination of the second user, causing, at least in part, the communication device associated with the first user to display a second user no answer condition indication.

15. The system as defined in claim 14, wherein the selection of the contact comprises a voice selection.

16. The system as defined in claim 14, wherein the selection of the contact comprises a visual display of the contact via a first user interface of the software program.

17. The system as defined in claim 14, wherein the software program comprises a telecommunication client application.

18. The system as defined in claim 14, wherein the caller is a user of the first communication service.

19. The system as defined in claim 14, wherein the second user is a plurality of users.

20. The system as defined in claim 14, wherein the number of users which can be bridged by the first user is limited.

21. The system as defined in claim 14, the operations further comprising recording the first user's connection usage subsequent to a termination of the first user's connection.

22. The system as defined in claim 14, the operations further comprising providing the first user with accounts details of an account of the first user with the communication service.

23. The system as defined in claim 14, wherein the communication device associated with the first user comprises a mobile device.

* * * * *